(12) United States Patent
Fitzpatrick

(10) Patent No.: US 6,613,366 B1
(45) Date of Patent: Sep. 2, 2003

(54) ENZYME-RICH SPROUTED FOOD PRODUCTS WITH LIMITED PH DROP AND METHODS OF MAKING SAME

(75) Inventor: Michael Fitzpatrick, Uniondale, NY (US)

(73) Assignee: The Harvest Festival Ltd., Uniondale, NY (US)

( * ) Notice: Subject to any disclaimer, the term of this patent is extended or adjusted under 35 U.S.C. 154(b) by 0 days.

(21) Appl. No.: 10/096,886

(22) Filed: Mar. 13, 2002

Related U.S. Application Data

(63) Continuation-in-part of application No. 09/487,669, filed on Jan. 19, 2000, now abandoned, which is a continuation-in-part of application No. 08/535,360, filed on Sep. 28, 1995, now abandoned, which is a continuation-in-part of application No. 08/314,453, filed on Sep. 28, 1994, now abandoned, which is a continuation-in-part of application No. 08/108, 176, filed on Aug. 17, 1993, now abandoned, which is a continuation-in-part of application No. 07/806,580, filed on Dec. 12, 1991, now abandoned, which is a continuation-in-part of application No. 07/481,579, filed on Feb. 16, 1990, now abandoned, and a continuation-in-part of application No. 08/307,384, filed on Sep. 14, 1994, now abandoned, which is a continuation-in-part of application No. 08/087, 109, filed on Jul. 2, 1993, now abandoned, which is a continuation-in-part of application No. 07/559,100, filed on Jul. 30, 1990, now abandoned.

(51) Int. Cl.$^7$ ............................................. A23L 1/28
(52) U.S. Cl. ........................... 426/61; 426/18; 426/459; 426/460; 426/615; 426/618; 426/629; 426/634
(58) Field of Search .............................. 426/18, 19, 28, 426/31, 61, 64, 615, 618, 622, 629, 634, 640, 443, 452, 455, 459, 460

(56) References Cited

U.S. PATENT DOCUMENTS

| | | |
|---|---|---|
| 4,004,034 A | 1/1977 | Delhaye et al. ................ 426/29 |
| 4,233,405 A | 11/1980 | Neubeck ..................... 435/187 |
| RE32,416 E | 5/1987 | Long ............................. 426/19 |
| 4,673,578 A | 6/1987 | Becker et al. ................. 426/93 |
| 4,859,486 A | 8/1989 | Douglass ..................... 426/629 |

OTHER PUBLICATIONS

Dr. Edward Howell, "The Status of Food Enzymes in Digestion and Metabolism", 1946 (Republished in 1980 as AF.).
Dr. Edward Howell, "Food Enzymes for Health and Longevity", 1980, p. xv, 107–124, Pub. by Omangod Press, Woodstock Valley, CT.
Dr. Edward Howell, "Enzyme Nutrition, The Food Enzyme Concept", 1985, pps. 72, 123–4, Pub. by Avery Publishing Group, Inc. Wayne,NJ.
Edmond B. Szekely, trans., "The Essene Gospel of Peace", 1928 pp. 40–41, Pub. by International Biogenic Soc., B.C., Canada.
Edmond B. Szekely, "The Book of Living Foods", 1977, p. 14 Pub. by International Biogenic Soc., B.C., Canada.
Dr. and Mrs. Elton Baker, "The Uncook Book", 1980, pps. 106–108 112, 116, 177, Pub. by Communication Creativity, Sauguache, CO.
Leslie and Suzannah Kenton, "Raw Energy", 1984, p. 265, Published by Warner Books, New York, NY.
Steve Meyerowitz, "Sprout Bread", 1989, pp. 8–12, 14, 25, Published by The Sprout House, Great Barrington, MA.
Steve Meyerowitz, "Sprout Bread" cassette tape, produced by The Sprout House, Great Barrington, MA, no date.
Steve Meyerowitz, "The Sprout House Newsletter", Sep. and Nov. issues, Pub. by The Sprout House, Great Barrington, MA, no date.
Frazier and Westhoff, Food Microbiology, 3rd ed., 1978, pp. 107, 164–165, 187, Pub. By McGraw–Hill Book Company, New York.
Advertisements for Nature's Path's Manna Bread$^R$ Sprout Breads & Sprouted Organic Flakes, Nature's Path Foods Inc, Delta, Canada, no date.
Article entitled "Green Barley", No. 1, 1988, Published by Immune Group, Bero Beach, FL.
Product Wrappers from Various Sprouted Grain Products, No date.
Elizabeth and Dr. Elton Baker, The UNcook Book, 1980, pps. 111–115 125, 154, 167, 175–117, Communication Creativity, Saguache, CO.
"History of the Manufacture and Sale of Unsweetened NP Class Crackers Having Sesame or Carrots as One of Their Ingredients" by Michael Fitzpatrick (Nov. 15, 1994).
"Revised History of the Manufacture and Sale of Unsweetened NP Class Crackers Having Sesame Seed or Carrots as One of Their Ingredients" by Michael Fitzpatrick (Jan. 19, 2000).
Copy of Ceral Box Cover from Sprouts7 Breakfast Cereal, Produced by Health Valley Foods, 700 Union St., Montebello, CA, no date.
Copy of Box Cover from Manna Millet Rice Flakes and 3 varieties of Manna Flakes, Nature's Path Foods Inc., Delta, B.C., Canada, no date.
Copy of Box Cover for "Fiber7 Flakes", Health Valley Foods, Inc Irwindale, CA 91076–7811, no date.
Frazier and Westhoff, Food Microbiology, 4th ed., 1988, pp. 5, 10, 24, Published by McGraw–Hill Book Company, New York.

*Primary Examiner*—Leslie Wong

(57) ABSTRACT

A class of food products whose nutrients have not been damaged by heat during the preparation process. These products are prepared with methods to limit souring thus permitting these food products to be prepared at a temperature low enough to minimize damage to vital nutrients (especially enzymes) without the objectionable excessive sourness and bitterness of similar products prepared without such methods. The result is a new class of delicious and nutrient rich health food products with many health benefits. Also disclosed is a Wet Grain Press for quickly and easily compressing very wet sprouts.

31 Claims, 5 Drawing Sheets

ENZYME-RICH SPROUTED FOOD
PRODUCTS WITH LIMITED PH DROP AND
METHODS OF MAKING SAME

1.0 RELATED APPLICATION

This application is a continuation-in-part of a previous application filed in the United States Patent and Trademark Office by Michael Fitzpatrick on Jan. 19, 2000 titled "Enzyme-rich Sprouted Food Products with Limited pH Drop and Apparatus and Methods of Making Same" and assigned Ser. No. 09/487,669, now abandoned, which was a continuation-in-part of a previous application filed in the United States Patent and Trademark Office by Michael Fitzpatrick on Sep. 28, 1995 titled "Enzyme-rich Sprouted Food Products with Limited Souring and Apparatus and Methods of Making Same" and assigned Ser. No. 08/535,360, (abandoned) which was a continuation-in-part of each of two previous applications filed in the United States Patent and Trademark Office by Michael Fitzpatrick.

The first such previous application, filed on Sep. 28, 1994, and titled "Enzyme-rich Sprouted Food Products with Limited Souring and Apparatus and Methods for Making Same" and assigned Ser. No. 08/314,453, (abandoned), was a continuation-in-part of U.S. Application Ser. No. 08/108,176 filed on Aug. 17, 1993, (abandoned), which was a continuation-in-part of U.S. application Ser. No. 07/806,580, filed Dec. 12, 1991 (abandoned), which was a continuation-in-part of U.S. application Ser. No. 07/481,579, filed Feb. 16, 1990 (abandoned).

The second such previous application, filed on Sep. 14, 1994, and titled "Shelf-stable Enzyme-rich Sprouted Seed Products and Apparatus and Methods for Making Same" and assigned Ser. No. 08/307,384, (abandoned), was a continuation-in-part of U.S. application Ser. No. 08/087,109 filed on Jul. 2, 1993 (abandoned), which was a continuation-in-part of U.S. application Ser. No. 07/559,100, filed Jul. 30, 1990 (abandoned).

2.0 TECHNICAL FIELD

This invention relates in general to food products one of whose ingredients is edible sprouts, and more particularly to such food products which are prepared with methods to limit bacterial souring thus permitting these food products to be prepared at a temperature low enough to minimize damage to vital nutrients (especially enzymes) without the objectionable sour and bitter taste of background art products prepared without such methods. These methods do not involve either cooking or the use of chemical preservatives both of which are strongly objected to by those who have switched to an all-raw food diet.

This invention also relates to such food products which are prepared using low temperature water activity reduction methods to prevent souring and fungal growth. Being low temperature methods, heat damage to vital nutrients is minimized, and the shelf-stable food products thus produced are rich in health benefits. The methods and associated apparatus for producing these products are suitable for processing those sprouted seeds which require processing to modify their structure in order to make them suitable for human consumption. The types of structure modification contemplated herein include compression or flattening, weakening of the internal structure through prolonged soaking, and fracturing the internal structure through freezing.

3.0 BACKGROUND OF THE INVENTION

Ever since the publication of Dr. Edward Howell's book *The Status of Food Enzymes in Digestion and Metabolism* in 1946 (published by the National Enzyme Company, Forsyth, Mo. and republished by Omangod Press, Woodstock Valley, Conn. in 1980 under the title *Food Enzymes for Health and Longevity*), increasing numbers of health-conscious consumers in the organic foods movement have sought to follow an all raw food diet. In this book, Dr. Howell, through numerous references to research reports and studies conducted by himself and many others at hospitals, universities, and laboratories both here and abroad, attempts to prove the following points:

(1) Every living organism is born with a limited store of enzyme energy, and, as this store of enzyme energy is exhausted, various kinds of degenerative diseases begin to overwhelm the organism.

(2) Our digestive system was designed to utilize the enzymes present in raw food to begin the digestion of that food.

(3) When raw food is heated to a temperature in excess of 118° F. (48° C.), the enzymes present in that food begin to be destroyed. On page 72 of his book *Enzyme Nutrition, The Food Enzyme Concept* (Avery Publishing Group Inc., Wayne, N.J., 1985), Dr. Edward Howell writes of his work to determine the temperature at which enzymes are destroyed: "When I was in active medical practice, I developed a special electrothermotherapy immersion apparatus to apply high temperature treatment to specific parts of the body to stimulate local enzyme activity. This activity increases two to three times for every 10° F. increase in local temperature. I modified some of this apparatus to permit experiments to determine the thermal death point of protoplasm (living matter), and found that immersion in water at 118° F. (48° C.) destroyed enzymes in a half-hour. The temperature of 118° F. (48° C.) also blistered the skin, and prevented subsequent germination of seeds when they were immersed for a half-hour." Subsequent research has shown that the destruction of many enzymes begins at a temperature of about 118° F. (48° C.), albeit at a slow rate. This destruction proceeds at an increasingly rapid rate as the temperature climbs past 118° F. (48° C.). And the longer that the enzymes are exposed to such elevated temperatures, the higher is the percentage of them that are destroyed. For example, the following table shows the activity of crystalline soybean beta-amylase enzyme after holding in a pH 5.5 acetate buffer for 30 minutes at various temperatures, and is fairly typical of the effects of heat on the activity of the enzymes in food. (J. Fukumoto and Y. Tsujisaka, *Kagaku to Kogyo* (Osaka) 28, 282 (1954); 29, 124 (1955).)

| Temperature (C.) | Temperature (F.) | % Relative Activity |
|---|---|---|
| 40° | 104° | 100 |
| 45° | 113° | 100 |
| 50° | 122° | 91 |
| 55° | 131° | 80 |
| 60° | 140° | 69 |
| 65° | 149° | 48 |
| 70° | 158° | 2 |

(4) When we eat enzyme deficient food, our bodies are forced to draw upon their own limited store of enzyme energy to begin the digestion of this food thus depleting it and hastening the onset of degenerative diseases.

(5) Raw unsprouted grains, seeds, and nuts contain large amounts of enzyme inhibitors which also deplete the body's limited store of enzyme energy when consumed.

(6) Therefore it is wise to consume as much of our food as possible in the raw form and to avoid consuming grains, seeds, and nuts (unless they have first been sprouted), in order to conserve and, to a small extent, replenish our store of enzyme energy thus postponing the onset of degenerative diseases. (It has been found, however, that the negative effect of the enzyme inhibitors in raw unsprouted seeds is more than overcome by the enzymes in an equal amount of raw sprouted seeds if they are consumed at the same time.)

Similar conclusions have been taught by such prominent health authors and researchers of the past and present as Dr. Max Bircher-Benner, Dr. Max Gerson, Dr. Kristine Nolfi, Dr. Norman W. Walker, Dr. Weston A. Price, Dr. Francis M. Pottenger, Professor Henning Karstrom, John H. Tobe, Linda Clark, Stephen Blauer, Paul and Patricia Bragg, Bob Johnson, T. C. Fry, Humbart Santillo, Viktoras Kulvinskas, Dr. Elton Baker, Leslie Kenton, Dr. Malcolm Carruthers, and Ann Wigmore. Whether or not the points which Dr. Howell seeks to prove are true, many health conscious consumers have been influenced by these teachings and have switched to an all raw or mostly all raw food diet.

Unfortunately, consumers who switch to a raw food diet have difficulty finding substitutes for cooked grain, nut, and seed-based products which are raw, rich in enzymes and vitamins, lacking in enzyme inhibitors, prepared without chemical preservatives, and yet have good taste and a long shelf life.

One of the important dietary staples in the diet of many health conscious consumers is bread and cracker-like products. Hitherto their choices in this category have been very limited:

(1) The commercial semi-raw sprouted grain breads. These breads are customarily prepared without preservatives at temperatures ranging from 130–180° F. (54–82° C.) and, if not frozen, have a shelf life of less than three weeks in the refrigerator. Unfortunately with such a high preparation temperature (necessary to inhibit the bacterial and fungal growths which would result in an unacceptable product), it is doubtful if more than a small fraction of the enzymes retain activity in the final product. As will be demonstrated, both DV, the Percentage Destruction of Viability Due to Heat, and DG, the Percentage Decrease in Growth Potential Due to Heat, of such products exceeds 95%.

Further, since these breads must be kept frozen during and after interstate shipment, they no longer contain appreciable amounts of Vitamin E, this vitamin being largely destroyed at freezing temperature. (*Good Health with Vitamins and Minerals*, John Gallagher, Summit Books, New York, N.Y., 1990, p. 70.)

(2) Homemade raw sprouted grain bread. Many recipes are available to enable the health-conscious consumer to make these breads in his kitchen. The main disadvantages of such homemade raw breads is that they taste somewhat sour and bitter due to the hitherto excessive and unavoidable action of lactic acid bacteria during the preparation process. According to page 52 of the 4th edition of *Food Microbiology* (McGraw Hill Book Company, 1988) which is incorporated by reference, "The most important characteristic of the lactic acid bacteria is their ability to ferment sugars to lactic acid. This may be desirable in making products such as sauerkraut and cheese but undesirable in terms of spoilage of wines. Because they form acid rapidly and commonly in considerable amounts, they usually eliminate for the time being much of the competition from other microorganisms. The major genera include Leuconostoc, Lactobacillus, Streptococcus, and Pediococcus." In the discussion of these bacteria on pages 45–51 of *Food Microbiology*, the habitat of each of these genera is given:

| Genera | Habitat |
| --- | --- |
| Leuconostoc | the surface of plants |
| Lactobacillus | plant surfaces, manure, dairy products |
| Streptococcus | raw milk, manure, green plants, feeds, silage |
| Pediococcus | vegetables |

As sprouted grain is crushed, the lactic acid bacteria which were on the surface of the grain sprouts, are now in the ground sprout batter where they begin a fermenting action which will eventually convert large amounts of the sugars in the ground sprouts to lactic acid. Initially, the pH of these ground sprouts is about 6.0. Dehydration is then used to lower the water activity of the ground sprouts to a level where the resultant product will be shelf-stable. (The term "water activity" ($a_w$) is used herein in its usual context to mean the ratio of the fugacity of water in the system being studied (f) to the fugacity of pure water ($f_o$) at the same temperature. Hence the water activity of pure water is 1.00. The water activity of the products and compositions herein can be measured using well-known physical chemical techniques and commercially available instruments.) But, before the dehydration process reduces the water activity of the ground sprouts to a level where such fermenting activity can no longer continue, a sufficient amount of sugar will have been converted to lactic acid to lower the pH of the drying batter to about 4.6, a drop in pH of 1.4. This pH drop of 1.4 is due solely to the formation of lactic acid in the batter as it dries, and this lactic acid imparts a very sour taste to the product. We expect sauerkraut and pickles to taste sour but even the most avid health enthusiasts find it difficult to enjoy sour tasting bread. (Please see §3.1 for the method by which the pH drop due to lactic acid formation in a product, $\delta pH_{LA}$, is to be determined. The LA in $\delta pH_{LA}$ stands for Lactic Acid.)

One of the earliest references to raw sprouted bread is found in the third century manuscript *The Essene Gospel of Peace* which was translated into English in 1928 by Edmond Bordeaux Szekely (International Biogenic Society, B.C., Canada (1981)). The method for making raw sprouted bread taught by this manuscript (pages 40–41 of the English translation) is as follows:

(1) Sprout wheat for about 12 hours.

(2) Crush the sprouted wheat to paste consistency.

(3) Make thin wafers out of this sprout paste.

(4) Set these wafers in the sun to dry.

The great disadvantage of this method is that while these wafers are drying, the bacteria which were on the surface of the wheat sprouts are now in the raw sprout paste, fermenting it and imparting a sour taste to it. The pH drop due to lactic acid souring, $\delta pH_{LA}$, for crackers made from this sprout paste, determined as outlined in §3.1, is about 1.4. This 1.4 pH drop is due to lactic acid formation in the sprout paste as it dried. Furthermore, due to the thinness of the batter, large drying surfaces are required to produce an appreciable amount of these sprout wafers. (Due to its high gluten content, the resultant crackers are very hard and tend to cut up the inside of one's mouth as they are chewed due to their sharp, hard edges. If, on the other hand, the drying is stopped before the water activity of the crackers drops below 0.60 in order to yield softer crackers, they have a tendency to mold, and their shelf life is only about a week in the refrigerator.)

In 1932, realizing the great value of a raw form of high grade protein and fat, Dr. Edward Howell, as recorded on page 123 of his recent book *Enzyme Nutrition, The Food Enzyme Concept* (Avery Publishing Group Inc., Wayne, N.J. 1985) sought to develop germinated cereal grains and nuts in raw, palatable form. At that time he thought it might take several years to develop such products but, after years of work on this problem, he admitted that none of the products produced were very palatable, and as his book went to press, he still had not succeeded. In a 1980 interview (found on page xv of his 1980 edition of *Food Enzymes for Health and Longevity*), Dr. Howell stated that "there is a billion dollars waiting for the man who will go through the prolonged, tedious research to accomplish this, and I will be his first customer."

A recipe for raw sprouted bread is given on page 14 of *The Book of Living Foods by Edmond Bordeaux Szekely* (International Biogenic Society (1977)) but since it is essentially the same as that found in *The Essene Gospel of Peace*, it will not be discussed further here.

Starting on page 106 of *The UNcook Book* by Elizabeth and Dr. Elton Baker (Communication Creativity, Saguache, Colo. (1980)), methods are taught for making raw breads, crackers, and pastry. None of the breads are dehydrated, and, therefore, have a high moisture content. Except for the Rye Bread which can be kept for up to ten days in the refrigerator, these breads will keep for only about three days in the refrigerator. After about the third day, these breads will tend to mold. Presumably these breads are not very tasty inasmuch as the statement is made on page 107 that "because the fermenting action in these breads is still present, they should be refrigerated and eaten within three days." The recipes for Raisin Carrot Bread (page 108), Sweet Rice Wafers (page 112), and Carrot Cake (page 116) all teach that honey should be added after the sprouts are ground. (Honey is the preferred water activity depressant in Applicant's invention.) Since the methods to limit souring of this application are not used, excessive fermentation will occur resulting in products which taste sour. Such products typically experience a drop in pH value from 6.0 to about 4.6 during the preparation process. ($\delta pH_{LA}$, the pH drop due to lactic acid formation during the production of the product can be determined as described in §3.1.) The crackers on pages 111 to 113, however, are dehydrated, but since the methods of this invention are not used, they will have a very sour taste after being dehydrated. Such crackers, typically have a $\delta pH_{LA}$ of about 1.4.

Of the remaining methods in this section which utilize sprouted seeds, only the "Frito" Corn Curls; the Pastry for Pies, Tarts, and Pizzas; and the Pizza Crust are dehydrated. Again, since the methods to limit souring of this application are not used, excessive fermentation will occur resulting in products which taste sour. These products, as well, typically experience a drop in pH value from 6.0 to about 4.6 during the preparation process. On page 177, a method is taught for making granola breakfast cereal in which honey is one of the ingredients. Since, in this method the moist sprouted grains are ground and then dehydrated without utilizing the methods to limit souring of this application, again excessive bacterial souring will occur resulting in an unmarketable product. The remaining recipes in this section do not have honey as one of the ingredients and will not be discussed here, the methods thereof being essentially similar to the method for making raw sprout bread taught by *The Essene Gospel of Peace*.

Products containing both sprouted seeds and sesame seeds are disclosed on pages 115, 125, 154, and 167 of *The UNcook Book* by Elizabeth and Dr. Elton Baker (Communication Creativity, Saguache, Colo. (1980)). Of these, only the "Sesame-Raisin Circles" on page 167 have whole sesame seeds. Following is the method for making Sesame-Raisin Circles:

| Ingredients | Method |
| --- | --- |
| 2 cups raisins, ground<br>2 cups brown sesame seed meal<br>2 cups finely ground sprouted oats (or wheat, buckwheat, rye, rice, millet or barley)<br>1 tablespoon honey | Mix and knead until smooth and firm. Make into small balls or circles, roll in whole sesame seeds, arrange on oiled cookie sheet and set aside for 24 hours. Store in cookie jar in a cool place or in refrigerator. |

As can be observed from this method, after the balls or circles of ground raisins, sesame seed meal, and ground sprouts have been formed, these balls or circles are rolled in whole sesame seeds, and are not dehydrated. The whole sesame seeds are not inside these balls or circles but only coat the outside of these balls or circles. Since the methods for limiting souring of this application are not used, and the balls or circles are not further dehydrated, they must be consumed within a day or so. After a day, this product will develop an unacceptable sour taste due to the unchecked action of lactic acid bacteria. After another day, this product may develop mold or fungal growths due to its high water activity. (Ground sprouts typically have a water activity in excess of 0.95.)

A product containing sprouted millet and whole poppy seeds is disclosed on page 113 of *The UNcook Book*. The method for making Millet Crackers follows:

| Ingredients | Method |
| --- | --- |
| ¾ cup millet<br>¼ cup flaxseed<br>¾ cup lukewarm water<br>½ teaspoon salt (optional)<br>2 teaspoons poppy seed | Sprout millet 48 hours. Sprout flaxseed in the ¾ cup lukewarm water for 12 hours. Do not drain. Store in refrigerator until millet is sprouted. Grind together or mix in blender, adding only enough water to blend well. Add salt and poppy seed. Pour out in thin layer on wax paper or oiled or flour-dusted cookie pan and dehydrate. Mark in triangles when half dry. Break into triangles when crisp and store in cool, dry place. |

As can be observed from this method, after the millet and flaxseed have been ground, salt and poppy seed are added. Regrettably, no instructions are given as to what to do after adding the salt and poppy seeds. I presume that they should be thoroughly mixed with the ground sprouts. (Ground flaxseed acts as an agglutinant to hold these crackers together.) Then the resultant batter is dehydrated. As will be shown shortly, the whole poppy seeds are not in a sufficient amount with respect to the water in the batter to significantly affect $\delta pH_{LA}$. Here the poppy seeds only serve as a spice to impart flavor. (As will be shown below, practicing the above method yields 6.92 ounces of millet crackers, of which less than 0.175 ounces or 2.5% by weight are poppy seeds. In Applicant's modified version of the above method, he used 4 teaspoons of poppy seed instead of 2 teaspoons which is 5% by weight of the resultant crackers.)

To determine the properties of these millet crackers, Applicant slightly modified the above method to specify more precisely the amount of each ingredient used and the conditions of temperature and relative humidity maintained in order that this method can be repeated by researchers who wish to check Applicant's results:

1. Soak ¾ cup (=4.9 ounces) of millet seed for 8 hours in distilled water.
2. Sprout millet for 48 hours.
3. Sprout (soak) ¼ cup (=1.6 ounces) flaxseed in ¾ cup (=6 ounces) lukewarm distilled water for 12 hours. Do not drain. Store in refrigerator until the millet has sprouted.
4. Grind together the sprouted millet seed and the soaked flax seed, adding only enough water to blend well. (The ground flaxseed acts as an agglutinant to hold these crackers together.) Add ½ teaspoon of salt (=0.07 ounces), and stir into the batter.
5. Remove 2 ounces of batter. Determine the pH value, $pH_o$, of a 2:1 slurry of this batter by the method given in §3.1. Measure the water activity of this batter.
6. Add 4 teaspoons (=0.35 ounces) of poppy seeds, and mix well with the ground sprouts. (Please note that Baker's method only called for 2 teaspoons of poppy seeds.)
7. In a room with room temperature of 80° F. and 50% relative humidity, pour out the batter in a thin layer on an oiled or flour dusted cookie pan and dehydrate.
8. Mark the batter into triangles when half dry.
9. After the batter has been dehydrated to a water activity of 0.45, break the batter into triangles, and measure the pH of a 2:1 slurry prepared from the batter by the method given in §3.1. This pH value is called $pH_f$. Then $\delta pH_{LA}=pH_o-pH_f$.

Applicant followed this 9 step method (except that the batter was poured onto a dehydrator sheet rather than onto a cookie pan, and neither oil nor flour was applied to the dehydrator sheet). After the 4.9 ounces of millet was sprouted for 48 hours, the result was 9.675 ounces of millet sprouts. These millet sprouts can be considered as consisting of approximately 4.9 ounces of millet sprout solids and 4.775 ounces water. At step 3, when the soaked flaxseed was removed from the refrigerator, its pH value was measured and found to be 5.2. Apparently the flaxseed soured due to being soaked in water for 56 hours. At step 4, no additional water needed to be added to facilitate the grinding of the mixture of millet sprouts and soaked flax seeds. At step 5, the result was 17.345 ounces of batter. The pH value of a 2:1 slurry of this batter was determined as follows: The 17.345 ounces of batter consists of 4.9 ounces of millet sprout solids, 1.6 ounces of flaxseed solids, 0.07 ounces of salt, 4.775 ounces of water associated with the millet sprouts, and 6 ounces of water associated with the flaxseed. Or, in other words, 6.57 ounces of solids and 10.775 ounces water. Therefore, 2 ounces of this batter consists of 0.75 ounces of solids and 1.25 ounces of water. 0.25 ounces of neutral pH water (water with a pH of 7) was added to the 2 ounces of batter. Its composition, was now 1.5 ounces water and 0.75 ounces of solids (i.e., a 2:1 slurry). The pH of this 2:1 slurry was measured and found to be 5.22 (most likely due to the aforementioned souring of the flaxseed as it soaked in the refrigerator). This measured pH of the 2:1 slurry was called $pH_o$. The $a_w$ of the batter at this point was measured and found to be 0.94. At step 10, $pH_f$ was found to be 4.79. Therefore $\delta pH_{LA}=pH_o-pH_f=5.22-4.79=0.43$. But, of course, the situation here is much worse than indicated by this calculation inasmuch as soaking the flaxseed in the refrigerator for 56 hours allowed its pH to drop from about 6.5 to 5.2, introducing such a degree of souring in the product as to render it unmarketable. The true $\delta pH_{LA}$, therefore, of this product is more like 6.5−4.79=1.71.

After dehydration, the resultant product weighed 4.92 ounces. (It would have weighed 6.92 ounces if 2 ounces of batter had not been removed for the pH measurement at step 5.) Please note that the amount of poppy seeds stirred into the batter at step 6 was double that specified by Baker's Method or 5% by weight of a final product of 6.92 ounces.

In conclusion, since the methods for limiting souring of this application were not used, the resultant Millet Crackers developed an unacceptable sour taste due to the unchecked action of lactic acid bacteria.

There is a short section on breads and wafers starting at page of the book *Raw Energy* by Leslie and Susannah Kenton (Warner Books, New York, N.Y. 1984). The only raw sprout bread recipe that mentions honey, teaches that the honey should be blended with the already ground up sprouts, but then suggests that this is really not necessary because the "wheat sprouts have quite a sweet taste of their own" which, of course, is true before the ground up sprouts are dried. After drying, however, they will have the sour taste common to all raw sprouted breads prepared without the methods to limit bacterial souring of this application.

A fully detailed method for making raw sprout bread is taught by steps One through Three on pages 8 through 12 and by the second paragraph on page 14 of *Sprout Bread* by Steve Meyerowitz (The Sprout House, Great Barrington, Mass. (1989)). This method being essentially similar to the method for raw sprout bread taught by *The Essene Gospel of Peace* and having all the disadvantages thereof, it will not be further discussed here. Page 25 of the same book teaches a method for making sprout nuts, sprout flour, and sprout pie crust. The method for making sprout pie crust which appears as steps 1–5 in the following seven-step recipe bears a superficial resemblance to one of Applicant's preferred methods for making raw sprout crackers:

(1) Sprout soft wheat berries for 3 or 4 days.
(2) Dry the sprouts in a dehydrator at 125–145° F. (52–63° C.)
(3) Grind up the dried sprouts in a blender or small seed mill to obtain sprout flour.
(4) Blend 3 tablespoons of lecithin with ¼ cup apple juice.
(5) Stir 1 cup of sprout flour into the mixture of apple juice and lecithin until a thick paste is formed.
(6) Pat this thick paste down on a pie pan.
(7) Using the recipe on page 26 of *Sprout Bread* make Phil's Raw Banana Filbert Pie and put it into the pie crust and smooth it off. Cooking is not required.

To determine the properties of this pie crust, Applicant slightly modified the above method to specify more precisely the amount of each ingredient used and the conditions of temperature and relative humidity maintained in order that this method can be repeated by researchers who wish to check Applicant's results:

(1) Sprout soft wheat berries for 3 days.
(2) Dry the sprouts in a dehydrator at 125° F. (52° C.)
(3) Reduce the relative humidity of the atmosphere in the Preparation Room (the closed room or area in which product preparation activities take place) to less than 50%.

(4) Mill 1 cup of dried wheat sprouts (=5.0 ounces) to flour.

(5) Blend 3 tablespoons (=0.6 ounces) of lecithin into ¼ cup (=2 ounces) of apple juice, thus obtaining a mixture of lecithin and apple juice.

(6) Thoroughly stir the milled wheat sprouts into the mixture of step 5. Continue to stir until a thick paste is formed.

(7) Measure the water activity of this thick paste.

Applicant then attempted to follow this modified seven-step method, but ran into difficulty at step 6. It would take considerably more of the apple juice and lecithin mixture than that produced by this method to wet the five ounces of sprout flour. The sprout flour was only partially wet with the apple juice and lecithin mixture even after vigorous stirring. The resultant product did not hold together and was unsuitable for either a pie crust or a snack food. Through trial and error, however, Applicant determined that the 0.6 ounces of lecithin would have to be blended with at least 3.5 ounces of apple juice to obtain enough mixture to wet the 5 ounces of milled wheat sprouts sufficiently to form a thick paste therefrom. Although the resultant product could possibly be used for a pie-crust, it would be considered too damp to satisfy any but the most ardent health enthusiast. At any rate when the above seven-step method (slightly modified as indicated) was followed, the water activity of the "pie-crust" obtained was 0.91. The water activity of the pie-crust obtained after the just mentioned trial and error modifications were made was 0.945. Both of these water activity levels will not only support significant lactic acid bacterial activity, but also yeast and mold growth as well.

Since the methods to limit souring of this application are not used in the preceding method, the pie crust must be consumed immediately as any delay will allow bacteria to begin a souring, fermenting action in the pie crust. Also since the pie crust is not further dried in a dehydrator, it is soft and can not be used as a snack food. A pie crust should be crisp and dry. The pie crust made by the method given in Meyerowitz's *Sprout Bread* booklet is damp and does not hold together. Even after the above mentioned trial and error modifications, although the resultant pie crust held together, it was damp and gooey, and still would not appeal to many people. By the time either pie crust were shipped to market, they would be sour, bitter and possibly harmful to one's health. (Harmful microorganisms will make their appearance if water activity has not been reduced below 0.60 by about the 48th hour of drying.) Finally since the sprouts at step 2 above were dried at a temperature of 125° F. (52° C.), it is doubtful if more than a small fraction of the original enzymes are retained in the final product. As will be demonstrated, both DV, the Percentage Destruction of Viability Due to Heat, and DG, the Percentage Decrease in Growth Potential Due to Heat, of this product exceed 95%.

It is interesting to note in this connection, that on his *Sprout Bread* cassette tape, Steve Meyerowitz makes the following comments about raw sprout bread:

If you make Essene raw bread (instead of baked bread) you are sacrificing a lot of good taste. The Essene bread or the bread which has been dehydrated at 125° F. has a very raw taste and it is not very appealing. It is just not a wonderful tasting food. You may love it because you love the concept of having a raw food but most people won't and you couldn't pawn it off on your grandparents when they came over for dinner telling them this is a wonderful food. They would probably just say 'Yukk' and spit it out. But if you gave them baked sprout bread, they would probably love it because most people just love baked sprout bread. It is chewy, nourishing, fulfilling . . .

Thus Steve Meyerowitz teaches away from raw sprout bread, discouraging further research therein, and advocates baked sprout bread as a far superior product. (As founder and CEO of The Sprout House, Steve Meyerowitz is widely known as "Sproutman" and is considered to be an expert in the field of sprouting. He is the author of several books, and his writings have appeared in many magazines including Prevention Magazine and Vegetarian Times.)

On the last page of the November 1989 issue of The Sprout House Newsletter (edited by Steve Meyerowitz), Mr. Meyerowitz makes the following comment about raw sprout bread: " . . . as a raw sprout, it should only be consumed in modest amounts because, again, it is only partially predigested . . . . It can take up to 24 hours to dry this 'bread' and in that time, a slight souring may occur, giving it a sourdough taste. The 'modern' day sprout bread that we make . . . involves higher temperatures and an actual baking process takes place. This bread can be consumed in larger, dinner-size portions since the grain is cooked and digestion is easier."

Another of the important dietary staples in the diet of many health conscious consumers is breakfast cereals. And one of the important and popular categories of breakfast cereals is shelf-stable ready-to-eat sprouted grain breakfast cereals.

These cereals must be shelf stable (i.e. must have long shelf life due to not readily supporting enzymatic and microbial activity), and they must not taste sour—it is expected that breakfast cereals taste sweet or at least have a neutral taste (i.e. neither sour nor sweet).

There are two basic categories of shelf-stable ready-to-eat sprouted grain breakfast cereals: pasteurized and nonpasteurized. But the methods used during product preparation to prevent the bacterial souring and fungal growths which would otherwise ruin their taste (and appearance) and negatively impact their shelf-life differ greatly. In the first or pasteurized category, bacterial souring and fungal growths are prevented by using a sufficiently high temperature for a sufficiently long duration of time to destroy bacteria and fungi. In the second or nonpasteurized category, bacterial souring and fungal growths are prevented by reducing the water activity of the sprouts below the point at which any bacterial or fungal activity can occur.

Examples of breakfast cereals in the pasteurized category are Health Valley Foods' Sprouts7 and Fiber7 Breakfast Cereals and Nature's Paths Foods' Manna Flakes. The background art does not show any breakfast cereals in the second or nonpasteurized category. The closest background art to this category is the breakfast cereal made by the method found on page 25 of Steve Meyerowitz's book "Sprout Bread—A Complete Guide to Making Bread With Sprouts" (The Sprout House, Great Barrington, Mass., 1984).

Breakfast cereals in the first or pasteurized category are made by sprouting the grain, feeding the sprouted grain along with any other desired ingredients into a cooker extruder which mixes the ingredients into a uniform dough and subjects the mix to temperatures which increase from the input end of the extruder barrel, commencing at about 130° F. (54° C.) adjacent the input and increasing to about 300° F. (149° C.) at the output end of the barrel, where the resultant product is extruded and sliced into pellets. The pellets in turn are passed between flaking rollers which flake these pellets, thus producing breakfast flakes.

A big deficiency of these breakfast flakes is that they no longer contain an appreciable amount of enzymes due to the fact that they were heated to a temperature well above the temperature at which enzymes can survive for a sufficiently long duration of time to destroy the enzymes and damage or destroy other nutrients as well.

A second disadvantage of these breakfast flakes is that during the dough forming process in the cooker extruder, the entire inner portion of the sprouted grain is exposed to the air causing the loss of some of their vital nutrients due to oxidation.

The method taught on page 25 of Steve Meyerowitz's booklet "Sprout Bread—A Complete Guide to Making Bread With Sprouts", produces the closest background art breakfast cereal to a second (nonpasteurized) category breakfast cereal. If a temperature of less than 118° F. (48° C.) had been specified, the breakfast cereal made by this method would have belonged to the second (nonpasteurized) category. But as it is taught, the method for making this cereal places it in the first (pasteurized) category of breakfast cereals given above. The method for making this breakfast cereal is as follows:

1. Sprout soft wheat grain for 3 or 4 days.
2. Dry the sprouts in a dehydrator at 125–145° F. (52–63° C.).
3. Using a small seed mill, grind the dried sprouts coarse, like grits.

The disadvantages of this breakfast cereal are as follows:

1. Using a temperature of 125° F. (52° C.) to dehydrate the sprouts for the 8–10 hours required to dry them will destroy most of their enzymes.
2. Grinding the dried sprouts even coarsely as taught above exposes most of the inner portion of the grain to the air causing the loss of some of the vital nutrients therein to oxidation.
3. There is a considerable buildup of heat as the dry sprouts are being ground, and, unless means are used to control this heat buildup, additional nutrients will be destroyed.
4. It is difficult to control the coarseness of the grind with a seed mill, and unless the sprouts are ground finely, there is the possibility that someone might chip a tooth on a hard dried sprout fragment.
5. Coarsely ground sprouts do not have the organoleptic properties of crispness and crunchiness that one usually associates with a cold breakfast cereal. People tend to prefer breakfast cereals that are crisp and crunchy.

Another dietary staple in the diet of many health conscious consumers is granola bars, a snack food with a cereal grain base. These dietary staples are popular because unlike the breakfast cereals, they can be carried on one's person and consumed anywhere. Hitherto, most such granola bars have been made from cereal grains which have been cooked, thus destroying many vital nutrients. Occasionally a granola bar can be found containing raw seeds, but the detrimental enzyme inhibitors in raw seeds are inactivated only by cooking or sprouting. Therefore it is not wise to consume any quantity of such granola bars. (It has been found, however, that the negative effect of the enzyme inhibitors in raw unsprouted seeds is more than overcome by the enzymes in an equal amount of raw sprouted seeds if they are consumed at the same time.)

U.S. Pat. No. 4,004,034 to Delhaye et al. (1977), shows wort suitable for making beer made by sprouting barley, rolling the sprouted barley, dehydrating the rolled sprouted barley, grinding the rolled and dehydrated sprouted barley, and extracting the malt. Since the sprouted barley only has "part of its husks" removed before being sprouted—if all of the husk were removed the barley would no longer sprout—and is only compressed to the degree required to "alter its shape slightly", not only would it be too thick to be used as a breakfast cereal, barley being a tough and very fibrous grain, but also the presence of the remaining portions of the husks would render it inedible by humans. If, however, the sprouted barley is dehydrated before being rolled, there will be significant fracturing of the dehydrated sprouts when they are rolled with the formation of such an amount of sprout flour which, with the unremoved portions of the husks, would further contribute to its unattractiveness as a food for humans. At any rate, the end product of the Delhaye patent is malt, not a breakfast cereal.

All the products made by the above methods share the following disadvantages:

(1) With the exception of the commercial sprout breads and sprouted grain breakfast cereals which have been cooked to prevent souring, they have a sour taste and are somewhat unpalatable. $\delta pH_{LA}$, the drop in the pH value of these products due to the formation of lactic acid in them during the preparation process is typically about 1.4.

(2) Because of their extremely short shelf life, their commercial potential is limited.

(3) The commercial products mentioned above are probably lacking significant enzyme activity due to the high processing temperature used and are deficient in vitamin E because they must be kept frozen. As will be demonstrated, both DV, the Percentage Destruction of Viability Due to Heat, and DG, the Percentage Decrease in Growth Potential Due to Heat, of such products are in excess of 95%.

(4) Unless proper precautions are taken, pathogenic microbes may appear in these products. (The proper precautions to take are as follows:
  (a) Preventing the relative humidity of the atmosphere about the drying product from rising above 60%.
  (b) Maintaining a good circulation of drying air around the product as it dries.
  (c) Reducing the water activity of the product below 0.60 before about the 48th hour of drying has elapsed.)

(5) Only modest amounts of truly raw sprouted seed products can be made due to the large drying surfaces required to make the wafer-thin crackers. If one tried to make inch thick crackers using only the methods of the background art, it would take over a week for the cracker batter to dry, and the batter would be quite moldy long before then. Hitherto, there has been no way to avoid this.

All the products made by the above methods except the sprout nuts which were used to make the sprout pie crust have the following further disadvantage: Once the sprouts have grown to full size they should immediately be ground up and made into bread; if they are refrigerated, they will develop a stale taste in a few days which will result in products of inferior quality.

U.S. Pat. No. 4,859,486 to Douglass (1989) teaches a method for preparing an uncooked sunflower seed foodstuff from sprouted sunflower seeds. Bacterial souring is limited to a small extent by utilizing a dehydration temperature of 110° F. (43° C.) to dehydrate the still moist sunflower seed sprouts after they were ground and formed into a very thin dough. Due to the thinness of the batter (which limits souring to some extent), large drying surfaces are required, and only small amounts can be made. (The larger the drying surfaces required, the more work it is to form the wafers, and place them on the drying surfaces, and the more work it is to keep the drying surfaces clean.) The average thickness of the final product is about ⅛ inch.

Applicant purchased "Sweets", "Protein Gems", and "Tangy Life's Bread", the commercially available raw sprouted sunflower seed products made by the methods of the Douglass Patent (U.S. Pat. No. 4,859,486). Inasmuch as these products all contain raisins, Applicant also purchased organic raisins, in order to measure their pH value and to determine to what degree raisins affect the pH of these products. Following the method taught in this patent, Applicant prepared a batter from ground sunflower seed sprouts and water such as is used to prepare the products of this patent. The pH value of this batter was measured and found to be 6.45. Two ounces of each of the purchased products were milled and mixed with 4 ounces of neutral pH water. The pH values of these mixtures were measured. The results are as follows:

| Product | pH Value | Comment |
| --- | --- | --- |
| Minced dried raisins | 3.80 | Although raisins have a sweet taste, they exhibit a low pH when minced and mixed with water. |
| Sweets | 4.82 | The high percentage of raisins in the product results in a sweeter taste and lower pH than either Protein Gems or Tangy Life's Bread. |
| Protein Gems | 5.10 | The lower percentage of raisins results in reduced sweetness and a higher pH. |
| Tangy Life's Bread | 5.05 | This product has few raisins and tastes somewhat sour, possibly because the batter was allowed to ferment for a while before being dehydrated. |

Although it is not known what percentage of each product is raisins, we can surmise, at least for Protein Gems (with few raisins) and Tangy Life's Bread (with hardly any raisins), that the drop in pH value due to lactic acid formation in these products during preparation is at least 1.3. In Applicant's search of the background art, he did not find any patent or published work which discloses methods for limiting bacterial souring during the preparation of uncooked sprout based products.

3.1 Determination of pH Drop Due to Lactic Acid Souring $\delta pH_{LA}$, the pH drop in any product due to lactic acid bacteria converting the sugars of the product to lactic acid during the preparation process can be determined as follows:

1. Cracker batter can be considered as consisting of a certain percentage by weight water and 100 minus that percentage by weight, solids. Based upon the percentages of the various ingredients used, the amount of water which each ingredient contains, and the amount of any additional water added to the batter, calculate the weight percentage of the batter that is water and the weight percentage that is solids. Applicant has determined the weight percentage of water in the following ingredients:

| Batter Ingredient | Weight Percentage Water |
| --- | --- |
| 18 hour sprouted wheat | 47.0 |
| Dehydrated Wheat Sprouts | <3 |
| Sesame Seeds | <3 |

Thus, for example, with respect to the 18 hour sprouted wheat, one ounce of wheat sprouts can be considered as consisting of 0.47 ounces of water and 0.53 ounces of wheat sprout solids.

Now I list the syrups that I have analyzed for water content. Water content was determined by dehydrating 2 ounces of the syrup to a water activity of 0.40 and then reweighing the syrup. I call the loss of water from the syrup due to dehydration, $Loss_{aw=0.40}$. A given amount of syrup therefore will contribute a syrup portion and a water portion:

| Batter Ingredient | Weight Percentage Water |
| --- | --- |
| Sage Honey | 12.0 |
| Maple Syrup | 31.5 |
| Barley Malt | 16.5 |
| Rice Syrup | 15.0 |
| Molasses | 19.5 |
| Bernard Jensen's Grape Concentrate | 36.0 |

Please note that if carbonated distilled water is used in preparing the batter (as is the case in the methods for preparing three varieties of Applicant's NP CLASS Crackers), it is to first be diluted with distilled water until its pH value is 4.0. (I use the term "carbonated distilled water" to refer to distilled water which has been subjected to carbonation.)

2. Using the above percentages, take 1 ounce of the batter from which the product is to be made, and add sufficient distilled water to make a slurry which is one part solids and two parts water. For example, if it is determined that the one ounce of batter is "w" percent water, and therefore "100−w" percent solids, it is necessary to add $[2(100-w)-w]/100=(2-0.03 w)$ ounces of distilled water to the one ounce of batter to form a 2:1 slurry.

3. Measure the pH of this slurry. Call it $pH_o$.

4. Dehydrate the batter to a water activity of 0.45.

5. Take one ounce of the final product, mill it to flour, and stir it into 2 ounces of distilled water to form a 2:1 slurry.* (Please note that if carbonated distilled water was used to make the batter from which the product is to be made, then a certain portion of the "w" percent water is carbonated distilled water which has a pH value of 4.0. If "c" percent of the distilled water of the batter is carbonated distilled water, then the two ounces of water to be used in this step to make the 2:1 slurry must have the following composition:

$$\text{carbonated water: } C = \frac{(c/100) * (w/100)}{1 - (w/100)} \text{ ounces}$$

$$\text{distilled water: } D = 2 - C \text{ ounces}$$

where the carbonated distilled water used here was first diluted with distilled water until its pH was 4.0.)

6. Measure the pH of this 2:1 slurry. Call it $pH_f$.

7. Then $\delta pH_{LA} = pH_o - pH_f$, and is, therefore, a positive number which reflects the pH drop due to lactic acid formation in the product as it dried.

As used throughout this specification, the term "2:1 slurry" refers to a slurry consisting of 1 part the solids of the batter or the product made from the batter and two parts distilled water. In the case of a 2:1 slurry made from a batter, the water inherent in the batter plus added water would be twice the weight of the solids in the batter. In the case of a dehydrated end product, the product is considered as having no inherent water, and the water which is added is twice the weight of the portion of the product from which the slurry is to be made.

\* 2:1 slurries were prepared from earlier batches of crackers using 2 ounces of neutral pH water (water with a pH of 7) instead of 2 ounces of distilled water. Since all batters are now prepared with carbonated distilled water, it is more accurate to prepare 2:1 slurries with carbonated distilled water (Sprout Flour Based NP CLASS Crackers) or a mixture of distilled water and carbonated distilled water (Liquefied Sprout Based NP CLASS Crackers). But since distilled water is very weakly ionized (due to some dissolved carbon dioxide), this is not a significant factor.

4.0 SUMMARY OF INVENTION, OBJECTS AND ADVANTAGES

4.1 Description of Invention

To overcome the disadvantages of the background art products described in the previous section, I present as my invention NonPasteurized, Controlled Lactic Acid Souring Sprouted Food Products, hereinafter referred to as "NP CLASS" Food Products. NP CLASS Food Products has two species. The first species is referred to as NP CLASS Crackers. These crackers are prepared with methods to inhibit mold and limit bacterial souring, thus permitting these crackers to be prepared at a temperature low enough to minimize damage to vital nutrients (especially enzymes) thus producing tasty food products with many health benefits. The second species is referred to as Raw Unsoured Shelf-stable Testae Intact Converted Sprouted Seed Products, hereinafter referred to as "RUSTIC Sprouted Seed Products". Also presented is the RUSTIC Press, a special device used to produce an exceptionally thin compressed sprouted seed product. RUSTIC Sprouted Seed Products are prepared without cooking or preservatives from seeds utilizing sprouting techniques and low temperature water activity reduction methods to prevent bacterial souring and fungal growths thus minimizing damage to vital nutrients (especially enzymes) and thus producing tasty shelf-stable food products with many health benefits.

Section 4.2 will provide the summary of the NP CLASS Crackers, their objects and advantages, and Section 4.3 will provide the summary of RUSTIC Sprouted Seed Products, their objects and advantages.

4.2 Summary of NP Class Crackers, Objects and Advantages

The NP CLASS Cracker is an essentially raw, crisp, agglutinated, unleavened cracker made from raw edible sprouts; pieces of absorbent vegetal matter; and whatever additional agglutinant that is required to agglutinate the product. For best results, the product should contain more than $P_{avm}$ percent by weight pieces of absorbent vegetable matter where $P_{avm} = (2.4/AC)$. $P_{avm}$ stands for Percentage of Absorbent Vegetal Matter. AC stands for Absorbent Capacity. AC is the amount of water in ounces that 1 ounce of the absorbent vegetal matter can absorb. The absorbent vegetable matter contemplated by this invention includes:

soft and mild tasting seeds selected from the group consisting of whole sesame seeds, whole hulled sesame seeds, whole poppy seeds, hulled sunflower seeds, steel cut hulled oats, and teff seeds; (Steel cut oats are oats in which each oat grain has been sliced into several pieces. Whole hulled oats are rather tough to chew; slicing the oats makes them much easier to chew.) Hereinafter the term "soft seeds" shall be used to mean one or more types of seeds selected from the aforementioned group. All of these seeds are mild tasting and either very tiny or soft enough to be easily masticated by humans. Following are some of the characteristics of the seeds in this group:

| Seed | Suitability | Amount of Water 1 Oz. Can Absorb | Shelf-Life at 0° C. |
|---|---|---|---|
| Whole Sesame Seeds | Fair | N/A | indefinitely |
| Hulled Sesame Seeds | Excellent | 0.39 | indefinitely |
| Whole Poppy Seeds | Fair | 0.49 | indefinitely |
| Hulled Sunflower Seeds | Fair to Good | 0.19 | indefinitely |
| Steel Cut Hulled Oats | Fair to Good | 0.20 | indefinitely |
| Teff Seeds | Fair | not available | indefinitely |

This group of seeds shall hereinafter be referred to as "The Preferred Group of Soft Seeds".

small chunks of dried fruit. Preferred are those fruits which have a water content before drying of at least 75% and have a shelf life of at least one year after drying. Fruits which initially have a larger percentage of water, when dehydrated, tend to absorb more water from the cracker batter into which they are stirred. In other words they are more efficient for the purposes of this invention. The following fruits are useful for the purposes of this invention:

| Fruit | Suitability | Water Content Before Drying | Amount of Water 1 Oz. Can Absorb | Shelf-Life at 0° C. After Drying |
|---|---|---|---|---|
| Apples | Excellent | 84% | 5.3 | 18–24 months |
| Apricots | Excellent | 85% | 5.7 | 24–30 months |
| Blueberries | Good | 83% | 4.9 | 18–24 months |
| Cherries | Excellent | 80–84% | 4.0–5.3 | 18–24 months |
| Black Currants | Good | 81% | 4.3 | 24–30 months |
| Figs | Excellent | 78% | 3.5 | 18–24 months |
| Grapes | Excellent | 81% | 4.3 | 18–24 months |
| Nectarines | Excellent | 82% | 4.6 | 18–24 months |
| Cured Olives | Excellent | 80% | 4.0 | 24–30 months Prob. |
| Papayas | Good | 89% | 8.1 | 18–24 months |
| Peaches | Good | 89% | 8.1 | 18–24 months |
| Pears | Excellent | 83% | 4.9 | 18–24 months |
| Pineapples | Excellent | 86% | 6.1 | 24–30 months |
| Plums | Good | 81–87% | 4.3–6.7 | 24–30 months |
| Prune Plums | Excellent | 79% | 3.8 | 30–48 months |
| Strawberries | Excellent | 90% | 9.0 | 18–24 months |

This group of fruit shall hereinafter be referred to as "The Preferred Group of Fruits".

small chunks of dried vegetables. Preferred are those vegetables which have a water content before drying of at least 75% and have a shelf life of at least one year after drying. Vegetables which initially have a larger percentage of water, when dehydrated, tend to absorb more water from the cracker batter into which they are stirred. In other words they are more efficient for the purposes of this invention. The following vegetables are useful for the purposes of this invention:

| Vegetable | Suitability | Water Content Before Drying | Amount of Water 1 Oz. Can Absorb | Shelf-Life at 0° C. After Drying |
|---|---|---|---|---|
| Carrots | Good | 88% | 7.3 | 18–24 months |
| Parsley | Good | 85% | 5.7 | 12–15 months |
| Parsnips | Good | 79% | 3.8 | 1 to 2 years |
| Peppers, Green and Red | Good | 93% | 13.3 | 24–30 months |
| Peppers, Chili | Excellent | 93% | 13.3 | 24–30 months |

This group of vegetables shall hereinafter be referred to as "The Preferred Group of Vegetables".

The amount of water that a given amount of one of the above fruits or vegetables can absorb after being fully dehydrated is very closely related to its water content before being dried. For example, fresh strawberries are approximately 90% water. Thus, one ounce of dehydrated strawberries can absorb approximately nine ounces of water.

The book, *How To Dry Foods*, by Deanna DeLong (Published by HPBooks, A division of Price Stern Sloan, Inc., 360 N. La Cienega Boulevard, Los Angeles, Calif. 90048, 1979) gives detailed instructions for the pretreatments required for each of the above fruits and vegetables before they are dehydrated so that a successful outcome may be obtained.

The NP CLASS Cracker is related to, but much improved over, the raw Essene breads or crackers which were made in the Essene community shortly before the birth of Jesus Christ. There are two subspecies of NP CLASS Crackers: "Sprout Flour Based NP CLASS Crackers" and "Liquefied Sprouts Based NP CLASS Crackers".

The first and preferred subspecies, Sprout Flour Based NP CLASS Crackers, is made from milled (i.e. ground to flour) dehydrated sprouts and more than $P_{avm}$ percent by weight pieces of absorbent vegetal matter. There are two varieties: "Sweet" and "Cheesy" (i.e. with a cheese-like taste). The Sweet Variety is prepared with a water activity depressant (defined later) to inhibit bacterial souring with its concomitant lactic acid formation. Since lactic acid formation is suppressed, this cracker has a sweet taste. The Cheesy Variety is not prepared with a water activity depressant and has a taste which resembles that of a cheese cracker.

The second and nonpreferred subspecies, Liquefied Sprouts Based NP CLASS Crackers, is made from liquefied nondehydrated (i.e. moist and still growing) sprouts and more than $P_{avm}$ percent by weight pieces of absorbent vegetal matter. Again there are two varieties: "Sweet" and "Cheesy" (i.e. with a cheese-like taste). The Sweet Variety is prepared with a water activity depressant (defined later) to inhibit bacterial souring with its concomitant lactic acid formation. Since lactic acid formation is suppressed, this cracker has a sweet taste. The Cheesy Variety is not prepared with a water activity depressant and has a taste which resembles that of a cheese cracker. Due to the difference in preparation methods, Liquefied Sprouts Based NP CLASS Crackers have a somewhat different taste than Sprout Flour Based NP CLASS Crackers.

Both subspecies of NP CLASS Crackers share the following characteristics:

No discernible mold or fungal growths. This is the sine qua non of cracker manufacturing, for moldy crackers have no commercial value regardless of their other properties, no matter how beneficial they may be. By limiting the relative humidity of the atmosphere about the cracker batter to less than 45% while dehydrating the cracker batter, maintaining good air circulation at the surface of the drying batter, and reducing the water activity of the cracker batter below 0.60 before about 48 hours have elapsed, it is virtually assured that there will be no mold or fungal growths on the final product.

Nonpasteurized. This characteristic is the main attraction for the raw health food enthusiast. Because these products have been prepared at a temperature well below the temperature at which food enzymes are destroyed, NP CLASS Crackers contain most, if not all, of the enzymatic activity of the living sprouts from which they were made. As will be disclosed, laboratory analyses show that NP CLASS Crackers retain more than 90% of the diastatic activity of the sprouts from which they were made.

Contain minimal or no lactic acid. As was mentioned earlier, raw sprouted grain crackers which are more than about ⅛ inch thick prepared by the methods of the background art develop a considerable amount of lactic acid which causes the resultant product to taste unacceptably sour and bitter. Using the methods disclosed herein to make NP CLASS Crackers, $\delta pH_{LA}$, the pH drop due to lactic acid formation during the dehydration of the cracker batter is less than 1.15 for crackers up to an inch thick, as compared with a $\delta pH_{LA}$ of 1.3 or greater during the preparation of background art products which are more than ⅛ inch thick. The small amount of lactic acid souring which causes a pH drop of no larger than about 1.15 in the cheesy varieties of NP CLASS Crackers imparts a pleasant cheesy taste to the crackers. When the drop in pH due to lactic acid formation is greater than about 1.3, the cracker develops a sour and bitter taste which renders it virtually unmarketable.

Water Activity of less than 0.50. Due to its low water activity this product is shelf-stable, and will keep for many months without noticeable deterioration.

No pH gradient from the lower to the upper surface of the cracker. All background art products are prepared upon a solid drying surface which leads the upper surface of the drying batter to dry more quickly than the lower surface which is not exposed to drying air. Consequently there will be considerable formation of lactic acid along the lower surface of the batter and gradually diminishing amounts of lactic acid formation in those regions of the batter which are successively closer to the upper surface of the batter. This pH gradient is one of the reasons why background art products have an unacceptable sourness and bitterness. NP CLASS Crackers, on the other hand, are prepared on dehydrator screens. Therefore, both the upper and lower surfaces of the spread batter dry simultaneously, and there is no pH gradient from the lower to the upper batter surfaces. (Suitable screen material would have a hole size of about 0.12 inches by 0.14 inches, and a strand thickness of about 0.05 inches. The screen material provides a perforated surface which gives drying air access to the lower drying surface of the cracker batter.) The type of drying surface provided by a supported screen, mesh, perforated surface or other functionally equivalent surface which gives drying air access to both the upper and lower surfaces of the drying batter simultaneously shall be called a "double-access drying surface". The upper surface of the double-access drying surface which contacts the lower surface of the drying batter shall be referred to as "the upper surface of the double-access drying surface".

NP CLASS Crackers can be made considerably thicker (up to 1 inch or more) than background art products which results in a larger cracker yield from a given drying surface. The result is reduced preparation time (with concomitant reduced energy cost), reduced materials cost (not as many drying surfaces required), and reduced clean-up time, there not being as many drying surfaces to clean.

Substantially uniform appearance of the upper and lower surfaces of the cracker. When the cracker batter is dried on screens rather than on solid drying surfaces, drying air has access to both upper and lower batter surfaces, leading to a substantially uniform appearance for both surfaces. When a solid drying surface is used, the lower drying surface develops a much lighter color and smoother appearance than the upper drying surface.

Moderating the hardness of the cracker. NP CLASS Crackers consisting of equal amounts of sprouted wheat and pieces of absorbent vegetal matter are almost too hard for human consumption due to the high gluten content of wheat. The hardness of the cracker can be moderated either by using a considerably larger proportion of absorbent vegetal matter or by incorporating a sufficient percentage of nongluten-containing sprouts in the cracker batter. (When a cracker batter containing only sprouted wheat is fully dehydrated, the resultant product is hard enough to scratch soft wood and break a tooth of one who attempts to consume it.) Due to its high oil content, the preferred absorbent vegetal matter for moderating hardness is cured olives. Even when the last trace of moisture is removed from cured olives via dehydration, the dried olives are still quite soft and flexible due to their high oil content.

Additionally either subspecies may be prepared with an added amount of a water activity depressant. A water activity depressant is any edible substance which can be added to the cracker batter to lower its water activity. If a sufficient amount of water activity depressant is added to the cracker batter to lower its water activity below 0.91, the growth of souring microorganisms is suppressed, thus inhibiting lactic acid formation during the preparation of the product. (When using salt as the water activity depressant, however, enough salt must be added to the cracker batter to lower its water activity below 0.75—halophilic ("salt tolerant") bacteria thrive in environments with water activities all the way down to 0.75.)

In the manufacture of Sprout Flour Based NP CLASS Crackers, milled dried sprouts and pieces of absorbent vegetal matter are stirred into carbonated water to form the cracker batter. It has been found that if the water activity of the water into which the sprout flour and the pieces of absorbent vegetal matter are to be stirred is reduced to less than 0.91 (to less than 0.75 when salt is used) by adding a sufficient amount of a water activity depressant to this water, souring of the resultant batter will be suppressed, but the mixture of water and the water activity depressant is still thin enough that the milled dried sprouts and other ingredients can easily be stirred into it. Then if the water activity of this resulting batter is quickly reduced to less than 0.60 (the point below which no microbial activity of any kind can occur) before the slower growing molds and yeasts make their appearance, all microbial activity is effectively suppressed.

It should be noted that if enough of a syrupy type water activity depressant is added to the water into which the sprout flour and the pieces of absorbent vegetal matter are to be stirred to lower its water activity to less than 0.60, thus suppressing all microbial activity, the resultant liquid is too thick for the other ingredients to be stirred into it.

In the manufacture of Liquefied Sprouts Based NP CLASS Crackers, a mixture of undehydrated sprouts and some additional water is liquefied in a food processor. Similarly in this case, it has been found that if a sufficient amount of a water activity depressant is added to these sprouts before liquefying them, such that the resultant sprout batter will have a water activity of less than 0.91 (less than 0.75 when salt is used), again souring of the batter is suppressed, and the batter is still thin enough that other ingredients can easily be stirred into it. Then if the water activity of this batter is quickly reduced to less than 0.60 (the point below which no microbial activity of any kind can occur) before the slower growing molds and yeasts make their appearance, all microbial activity again is effectively suppressed.

It should again be noted that if enough of a syrupy type water activity depressant is admixed with undehydrated sprouts before liquefying them to lower the water activity of the resultant batter below 0.60, thus suppressing all microbial activity, the resultant liquid is again too thick to stir any other ingredients into it.

Some substances which have been found effective in lowering water activity are: honey, fruit syrups, grain syrups, molasses, maple syrup, sugars, carob powder (due to its high sugar content), salts, and salt-water seaweeds such as kelp and dulse (due to their high salt content).

Applicant has determined the water activity of the following aqueous solutions and mixtures:

| Type of Solution | Water Activity |
| --- | --- |
| 25% strength aqueous fructose solution | 0.875 |
| 33% strength aqueous fructose solution | 0.86 |
| 44% strength aqueous fructose solution | 0.83 |
| 33.3% aqueous carob mixture | 0.92 |
| 10% strength aqueous salt solution | 0.86 |
| 12.5% strength aqueous salt solution | 0.84 |
| 25% strength aqueous salt solution | 0.766 |

(In the case where salt alone is used as the water activity depressant, it is required to use at least a 25% strength solution in order that the water activity of this solution be low enough to suppress the growth of halophilic bacteria with its concomitant souring activity.)

Agglutinated. A food product can be said to be agglutinated if at least one of its ingredients contains free agglutinant. If the agglutinant resides in the seeds or seed sprouts which the product contains, the seeds or seed sprouts would then, of necessity, have to be liquefied or milled so that the agglutinant therein might be released to fulfill its desired role as an agglutinant. If the seeds are gluten-free, then one of the other ingredients of the product would have to have or be an agglutinant. Whenever a thick syrupy water activity depressant such as honey, a fruit concentrate, an aqueous sugar solution, a grain syrup, molasses, or a tree sap (i.e. maple syrup) is used, the natural agglutinating property of the syrup will give such sufficient hardness to the resultant product that little, if any, extra agglutinant need be added to the batter from which the product is to be made. Applicant, in fact, has found that when a sufficient amount of honey, an aqueous sugar solution, or a heavy fruit or grain syrup is used as the water activity depressant, no extra agglutinant need be added, and, further, when a sufficient amount of such a water activity depressant is used, a more acceptable product is obtained if the seed sprouts used are gluten-free. If the seed sprouts are not gluten-free, the end product may be unacceptably hard if the water activity is reduced much below 0.45. Applicant has also found that the use of either honey or sugar as the water activity depressant results in a somewhat softer cracker than when fruit, grain, or other kinds of sweet syrups are used as the water activity depressant.

What is meant therefore when it is said that one of the steps in preparing the product batter is "adding, if necessary, a sufficient amount of agglutinant to agglutinate the product" is that if the batter does not contain sufficient agglutinant in it to cause the resultant dried product to hold together, then sufficient additional agglutinant must be added to the batter to cause the resultant dried product to hold together. (A little trial and error may be required to determine how much added agglutinant is necessary to cause the resultant dried product to hold together.)

NP CLASS Crackers of the Liquefied Sprouts Based Species have the following additional characteristic: They have a taste reminiscent of the taste of the Essene sprouted grain breads produced by Shiloh Farms and Nature's Path Foods Inc. Other than this slight difference in taste, there is no known physical difference between the two species. The two subspecies differ only as to the manner of production. Applicant believes, however, that the sprout flour based subspecies is more finely ground than the liquefied sprouts based subspecies. As will be shown by the comparison made between these two subspecies in §4.2, the sprout flour based subspecies is the preferred embodiment of NP CLASS Crackers.

The methods used to limit souring in the manufacture of NP CLASS Crackers are given below.

First of all I present skeleton outlines of the methods for making the two species of NP CLASS Crackers so that the various aspects of the invention can be more clearly followed:

A. Species 1. Sprout Flour Based NP CLASS Crackers
  1. Sprout the plant seeds.
  2. Dehydrate the sprouts.
  3. Mill the dehydrated sprouts.
  4. Mix the milled dehydrated sprouts with water (and with an agglutinant, if the sprouts do not contain sufficient gluten to agglutinate the product) to form a batter.
  5. Thoroughly mix the above batter with pieces of absorbent vegetal matter.
  6. Spread the batter onto the drying surface (preferably a double-access drying surface such as dehydrator screens).
  7. Dehydrate the batter until the water activity thereof has been reduced below 0.45.

B. Species 2. Liquefied Sprouts Based NP CLASS Crackers
  1. Sprout the plant seeds.
  2. Using a food processor, blend at high speed a mixture of the sprouts, any added water, and any agglutinant required to sufficiently agglutinate the final product such that it holds together. (This operation "liquefies" the sprouts.)
  3. Thoroughly mix the above batter with pieces of absorbent vegetal matter.
  4. Spread the batter onto the drying surface (preferably a double-access drying surface such as dehydrator screens).
  5. Dehydrate the batter until the water activity thereof has been reduced below 0.45.

Methods for Reducing Lactic Acid Formation in Raw Sprouted Seed Products:

(1) Maintaining the relative humidity of the atmosphere about the drying batter below 45%, and preferably even lower. The lower the relative humidity of the atmosphere about the drying batter, the quicker will dehydration of the batter proceed, thus giving the lactic acid bacteria in the batter a much shorter time in which to produce lactic acid before the water activity of the drying batter drops below 0.91. (0.91 is the minimum water activity level required to support bacterial growth. However, if salt is the water activity depressant, halophilic bacteria can thrive at water activities all the way down to 0.75.) Further, the relative humidity of the atmosphere about the drying batter must be prevented from rising above 100% times the desired water activity of the final product. For example, if the desired water activity of the product is 0.35, the relative humidity of the atmosphere about the drying batter should be maintained below 35%. Keeping the relative humidity below 45% greatly reduces drying time, thus reducing bacterial souring, and preventing mold. If, at any time, the relative humidity is allowed to climb above 70%, molding is encouraged. This method is absolutely essential to product success. Without this method, product success is unlikely regardless of what other methods are used.

It is preferred that the operations of dehydrating the sprouts, preparing the cracker batter, and dehydrating the cracker batter be performed in a closed room or area in order that the temperature and relative humidity of the atmosphere about the drying products can be carefully controlled. Throughout this specification, the term "Preparation Room" will be used to refer to the closed room or area in which product preparation activities which involve dehydration take place. It is preferred that the temperature in the Preparation Room be maintained in the range of 90° to 104° F., and that the relative humidity of the air (atmosphere) in the Preparation Room be maintained below 45%.

According to pages 5 and 124 of the fourth edition of *Food Microbiology:*

"Microorganisms have an absolute demand for water, for without water no growth can occur. As might be expected, the exact amount of water needed for growth of microorganisms varies. This water requirement is best expressed in terms of available water or water activity $a_w$, the vapor pressure of the solution (of solutes in water in most foods) divided by the vapor pressure of the solvent (usually water). The $a_w$ for pure water would be 1.00, and for a 1.0 m solution of the ideal solute the $a_w$ would be 0.9823. The $a_w$ (×100) would be in equilibrium with the relative humidity (RH) of the atmosphere about the food. In other words, $a_w \times 100$=equilibrium relative humidity (ERH) (%), or (ERH÷100)=$a_w$. A relative humidity about a food corresponding to an $a_w$ lower than that of the food would tend to dry the surface of the food; conversely, if the relative humidity were higher than that corresponding to the $a_w$, the latter would be increased at the surface of the food."

"Too high a relative humidity favors the growth of spoilage micro-organisms. The highest humidity, near saturation, is required for most bacterial growth on the surface of foods; less moisture is needed by yeasts, about 90 to 92 percent, and still less by molds, which can grow in a relative humidity of 85 to 90 percent."

(2) Mixing the product batter with pieces of absorbent vegetal matter equal to at least $P_{avm}$ percent of the weight of the final dehydrated product. The absorbent vegetal matter is selected from the group consisting of dried fruit, dried vegetables and soft seeds. If soft seeds are used, it is preferable that these seeds be pre-soaked but not sprouted and then dried. (Soaking the seeds for twelve hours deactivates the majority of the enzyme inhibitors in the seeds. It has been found, however, that the negative effect of the enzyme inhibitors in raw unsprouted seeds is more than overcome if an equal amount of raw sprouted seeds is eaten at the same time.) The following mild-tasting, soft seeds have been found to result in an acceptable product: whole hulled sesame seeds, whole poppy seeds, hulled sunflower seeds, unhulled teff grain (which, although not really soft, is very small (1/150th the size of a wheat grain), and thus presents no difficulty to mastication) and steel cut oats (the oats are fractured for easier mastication). Although not tried, whole unhulled sesame seeds should also yield an acceptable product. Each of these seeds is relatively soft (or, in the case of teff seeds, very small) when compared to such hard seeds as wheat, triticale, rye, barley, and rice. Further each of these seeds has a relatively mild taste when compared with such strong tasting soft seeds as caraway, dill, anise, cumin, coriander, and celery. (Small amounts of these stronger tasting seeds can be added for flavor, and then they serve a double function in the batter.) Using seeds which are soft (or very small) greatly facilitates mastication of the resultant product. For reasons of taste, softness, availability, and cost, the preferred soft seeds are whole hulled sesame seeds (with whole poppy seeds running a distant second).

Adding pieces of absorbent vegetal matter to the product batter gives rise to four unexpected results:

1. If a sufficient amount of absorbent vegetal matter is added to the product batter, the batter becomes thick enough (due to the absorption of the liquid of the mixture by the dry pieces of absorbent vegetal matter) to be spread upon dehydrator screens instead of solid sheets without significant leakage through the screen apertures. The inventive trick here is to add all the ingredients except the pieces of absorbent vegetal matter to the batter, and stir the batter well. The batter is still easy to stir and the ingredients of the batter can be thoroughly mixed together. Then after the batter is thoroughly mixed, the pieces of absorbent vegetal matter are stirred in last. The amount of water in the batter and the amount of pieces of absorbent vegetal matter now being added can be so proportioned that a very thick batter is formed which can now be poured on dehydrator screens without significant leakage through the screen openings. However, this mixture is very difficult to stir and, unless stirred well, the pieces of absorbent vegetal matter will not be evenly dispersed or distributed throughout the batter. The batter, being very stiff, is also difficult to spread evenly on the screens, and some of the batter will be forced into the screen openings making the dehydrated product somewhat difficult to remove from the screens.

At the expense of a slight increase in bacterial souring, somewhat more water can be added to the batter, such that the mixture is easier to stir and the pieces of absorbent vegetal matter can be more easily and evenly dispersed throughout the batter. Then, following preparation of the batter, the batter can be allowed to set for about 30 minutes or so, during which time, the pieces of absorbent vegetal matter therein will absorb sufficient water from the rest of the batter to make it thick enough so that it can now be spread on dehydrator screens without significant leakage through the screen openings. But now, again, the batter being very stiff is difficult to spread evenly on the dehydrator screens, and some batter will again be forced into the screen openings making the dehydrated product somewhat difficult to remove from the screens.

Therefore, the most preferable way to prepare and spread the batter is as follows: After having prepared the batter with somewhat more water as just described, spread the batter on a flat surface in portions just smaller than the screens on which the batter will later be placed. Since somewhat more water was used, the batter is fairly easy to so spread. Now the spread batter portions can be allowed to set for about 30 minutes or so as above, during which time the pieces of absorbent vegetal matter in the batter absorb liquid from the batter thus making it thicker. After this time, the batter should be sturdy enough to be sliced and lifted off the flat surface and placed on dehydrator screens without breaking apart or leaking through the screens. Since no pressure need be applied to place these batter portions on the dehydrator screens, little, if any, of the batter will seep through the screen openings, and, at the end of the dehydration process, the dried batter can be easily removed from the screens. After the batter portions have been placed upon screens, the batter or mixture on each screen is dehydrated until the water activity thereof has been reduced below 0.60. The use of double-access drying surfaces such as dehydrator screens instead of solid sheets allows the drying air of a dehydrator to dry both the upper and lower surfaces of the drying batter simultaneously. This speeds up drying time and greatly reduces bacterial souring.

2. The second unexpected result is that the addition of pieces of absorbent vegetal matter to the batter results in a less soured product. Without wishing to be bound by theory, it is believed that the addition of pieces of absorbent vegetal matter to the batter results in a less soured product because the pieces of absorbent vegetal matter absorb some of the water from the batter during the early hours of dehydration, thus making it unavailable for microbial growth. It should be mentioned here that if the pieces of absorbent vegetal matter are soft seeds, sprouting and dehydrating the seeds instead of merely soaking and dehydrating the seeds, causes the seeds to lose most of their water absorbing ability, making them virtually useless for their intended purpose in this invention. (By sprouting, it is meant that after the seeds have been soaked, they are exposed to the air for more than about four hours, toward the end of which time a small shoot appears.)

3. In the case where the pieces of absorbent vegetal matter are soft seeds, it has been found that even after the soft seeds are dehydrated, they are still soft, and make the resultant cracker somewhat softer and easier to chew. Thicker crackers can now be made. Crackers made of sprouted wheat alone, for example, have very sharp edges when they are thoroughly dried.

4. In the case where the pieces of absorbent vegetal matter are shredded dried cured olives, the resultant cracker is chewy and moist due to the high oil content of dried olives. Many taste-conscious people consider that NP CLASS Crackers prepared without either dried shredded cured olives or a syrupy type of water activity depressant (see 3A below) are too dry to be palatable.

(3A) For the Sprout Flour Based Crackers, adding a water activity depressant to the liquid into which the milled dried sprouts are to be stirred. The following table from page 10 of the fourth edition of *Food Microbiology* by Frazier and Westhoff (McGraw-Hill Book Company, 1988) shows the lowest water activity values permitting growth of spoilage organisms:

| Group of Microorganisms | Minimal $a_w$ value |
|---|---|
| Many bacteria | 0.91 |
| Many yeasts | 0.88 |
| Many molds | 0.80 |
| Halophilic ("salt tolerant") bacteria | 0.75 |
| Xerophilic ("drought tolerant") fungi | 0.65 |
| Osmophilic ("high osmotic pressure tolerant") yeasts | 0.60 |

According to this table, the minimal water activity required to support the growth of many bacteria is 0.91. Only those bacteria which require or thrive on a high level of salt can grow at a lower activity than 0.91.

If, however, an amount of a syrupy type of water activity depressant were added to the liquid into which the sprouts and pieces of absorbent vegetal matter are to be stirred sufficient to lower the water activity of that liquid below 0.60, so as to suppress all microbial activity, the liquid becomes too thick to have stirred into it the milled dried sprouts and pieces of absorbent vegetal matter. And even if it were possible to disperse the sprouts and pieces of absorbent vegetal matter evenly throughout the liquid, it would be too sweet (if a sweet water activity depressant were used) or too salty (if a salt were used for the water activity depressant) to be considered a healthy or appetizing food for humans. Furthermore the resultant batter would be too thick and too gooey to be successfully spread on the dehydrator screens.

Applicant has discovered that it is sufficient to add just enough of a water activity depressant to the liquid to lower the water activity of that liquid below 0.91 for sugar based water activity depressants and below 0.75 for salt based water activity depressants. A water activity lower than 0.91 (or 0.75 if salt is used) suppresses the growth of lactic acid bacteria. Now when the sprouts and pieces of absorbent vegetal matter are stirred in, the water activity of the resultant batter drops a bit further. Now that the growth of lactic acid bacteria has been suppressed, the other methods of this invention are used to quickly lower the water activity of the cracker batter below 0.60 before the much slower growing yeasts and molds have a chance to make their appearance. Thus not only is the growth of all microorganisms effectively suppressed, but this minimal addition of a water activity depressant to the liquid into which the sprouts and pieces of absorbent vegetal matter are to be stirred, leaves this liquid still thin enough that the sprouts and pieces of absorbent vegetal matter can easily be stirred into and evenly dispersed throughout the liquid thus leading to a very successful product.

It should also be pointed out that the more water activity depressant that is used in the liquid into which the sprouts and pieces of absorbent vegetal matter are to be stirred, the higher will be the osmotic pressure of the liquid, and the less able will the pieces of absorbent vegetal matter be to absorb water from the batter to thicken it before the batter is spread on dehydrator screens. (Osmotic pressure is the force created across a semipermeable membrane—in this case, the cell walls of the pieces of absorbent vegetal matter—separating two solutions of different concentrations. It results in the passage of water from the region of its greater concentration to a region of its lesser concentration.) Thus the use of this method causes method 2 to lose some of its effectiveness. In fact, if enough water activity depressant is used to lower the water activity of the liquid below 0.60, the pieces of absorbent vegetal matter will absorb no water from the batter, and it will not be possible to spread the batter on dehydrator screens; the batter will leak through the screen apertures making quite a mess. Hence, the less water activity depressant that is added, the easier the batter will be to handle.

(3B) For the Liquefied Sprouts Based Crackers, mixing the sprouts with a water activity depressant prior to liquefying them in a food processor. Here, however, if one wished to add a sufficient amount of a water depressant to the sprouts before liquefying them to ensure that the resultant batter would have a water activity below 0.60, so as to suppress all microbial activity, the amount of water activity depressant which would have to be added would be enormous since nondehydrated sprouts are more than 40% water. Such a batter could not yield desirable results.

So, here, again, it is sufficient to add just enough of a water activity depressant to the sprouts to lower the water activity of the resultant liquefied sprouts/water activity depressant mixture below 0.91 (below 0.75 if salt is used). And again, dehydration is used to quickly lower the water activity below 0.60 before the much slower growing yeasts and molds have a chance to make their appearance. Thus again not only is the growth of all microorganisms effectively suppressed, but this minimal addition of a water activity depressant to the sprouts before liquefying them, leaves the resultant liquefied batter still thin enough that the pieces of absorbent vegetal matter can easily be stirred into and evenly dispersed throughout the batter thus leading to a very successful product.

And again, it should also be pointed out that the more the amount of water activity depressant that is added to the sprouts that are to be liquefied, the higher will be the osmotic pressure of the resultant liquefied batter, and the less able will the pieces of absorbent vegetal matter which are stirred into this batter be to absorb water from the batter to thicken it before the batter is spread on dehydrator screens. Thus the use of this method again causes method 2 to lose some of its effectiveness. Here again, the less water activity depressant that is added to the sprouts before liquefying them, the easier the resultant batter will be to handle.

(4) For the Sprout Flour Based Crackers, when a syrupy type water activity depressant is used, utilizing as little water as possible in the liquid into which the sprouts and pieces of absorbent vegetal matter are to be stirred, so that liquids with a water activity in excess of 0.91 can be used. While, for example, a solution with a water activity of 0.92 is somewhat retarding bacterial souring, dehydration is so quickly carrying the water activity below 0.91, that bacterial souring never really has a chance to get started. The advantage in using as little water as possible, and, hence, as little of a syrupy type water activity depressant as possible, is that a softer more easily chewed cracker is obtained. The more of a syrupy type water activity depressant that is used, the harder the end product will be, making mastication difficult. Furthermore, the less water that is used, the less water activity depressant need be used to maintain the water activity of the liquid at a level required to prevent bacterial souring. Since all of the sweet syrup type water activity depressants contain sugar, the less that is used, the better inasmuch as large amounts of sugar have not been found to be conducive to good health. In addition, if only minimal amounts of water are used, dehydration proceeds much more quickly. This can add up to quite an energy saving.

(5) Having spread a very thick batter onto double-access drying surfaces (such as dehydrator screens), slicing the batter periodically (every half hour or so) into small square or rectangular slices. Due to the semi-liquid nature of the drying batter just below its surface, it tends to ooze back into the slice marks, and it is therefore necessary to reslice the batter every half hour or so until it no longer oozes back into the slice marks. By slicing the batter into very small squares or rectangles, the batter just below the surface and all the way down to the dehydrator screen is exposed to the drying air, (even if, initially, for only a minute or so) thus greatly speeding up the drying process and eliminating any possibility of fungal or mold growth. Further, with the larger batch sizes now possible, commercial production of these products is now feasible. Further, the smaller the size of the square or rectangular slices into which the batter is sliced, the shorter the time it will take to dry, and the less time the fermentative bacteria will have to ferment the batter from which the crackers are made. And the greater the energy saving will be. (It should also be noted that spreading the batter as thick as possible results in a tremendous cost savings: the more batter that is spread on each screen, the fewer the number of screens required to spread a given batch of batter and thus, the fewer the number of trays which must be purchased. There is also a labor savings as well: fewer screens and trays need be cleaned afterward.)

(6) Preparing the cracker batter with carbonated rather than with plain water. Using carbonated water results in a somewhat more porous product and a slightly faster drying time. Consequently there is somewhat less souring in the product, and the resultant product is somewhat easier to chew. According to page 1010 of Volume 16 of the Encyclopaedia Britannica, carbon dioxide gas gives carbonated beverages their sparkle and tangy taste and prevents spoilage. The amount of gas which water will absorb increases as the pressure is increased and the temperature is decreased.

(7) Maintaining the temperature of the atmosphere about the drying batter between 90° and 104° F. Lower temperatures unduly lengthen drying time, thus giving fermentative organisms more time to produce lactic acid.

(8) Heating the cracker batter to a temperature of 104° F. before stirring in the pieces of absorbent vegetal matter and then maintaining the cracker batter at a temperature of 104° F. until it is spread on dehydrator screens. Heating the batter to 104° F., results in a slightly less viscous batter which makes it somewhat easier to stir in the pieces of absorbent vegetal matter. Furthermore, due to the lower viscosity of the batter, less water need be used to make the batter, thus resulting in a shortened dehydration time and lower energy costs. In addition, when the batter is maintained at a temperature of 104° F., the batter dries faster thus giving fermentative organisms less time for their souring activity, and thus yielding a better tasting product with a somewhat higher pH value.

(9) Dehydrating the cracker batter at a temperature in excess of 104° F. (but less than 118° F.). Lower temperatures unduly lengthen the dehydration process giving fermentative bacteria the opportunity to produce more lactic acid. In addition a longer dehydration time increases the chances of mold and fungal growths. (But it is imperative that the dehydration temperature be kept below 118° F. as higher temperatures destroy food enzymes.) Dehydration has three parameters: temperature, the relative humidity of the atmosphere about the drying product, and air flow velocity over the surfaces of the product. The time to dehydrate a given mass of cracker batter varies inversely with temperature and air flow velocity and varies directly with humidity. Therefore, most preferredly, the temperature will be maintained at about 104° F., humidity will be maintained below 45 percent and as much lower than that as is feasible, and the velocity of air flow over the drying surfaces of the batter shall be made as high as possible without being so strong that the cracker batter is blown about.

(10) Using as little water as possible in the cracker batter. The less water used in the cracker batter in proportion to the other ingredients, the shorter will be the dehydration time and the greater will be the energy savings.

(11) Each of these methods contributes somewhat to reducing $\delta pH_{LA}$, the pH drop due to lactic acid souring in the batter as it dries. For example, Methods 1 and 8 done without Methods 2 and 5 does not result in a sufficiently reduced pH drop to yield an acceptable product. For a commercially acceptable product, at least methods 1, 2, 5, 7, and 9 should be used.

4.2.1 Advantages of Sprout Flour Based Products Over Liquefield Sprouts Based Products:

Thus this invention has two embodiments, Sprout Flour Based NP CLASS Crackers and Liquefied Sprouts Based NP CLASS Crackers. The Sprout Flour Based NP CLASS Crackers Subspecies is the preferred embodiment of this invention for the following reasons:

(1) Convenient Division of the Task of Cracker Production into a Sprouting Phase and a Cracker Making Phase. Both the Method for Liquefied Sprouts Based NP CLASS Crackers and the Method for Sprout Flour Based NP CLASS Crackers specify that after the seeds to be sprouted have been soaked in water for the requisite length of time, they should then be sprouted for 18 hours or more. It is at the point where the sprouts have grown to maturity that the two methods diverge. The method for Liquefied Sprouts Based NP CLASS Crackers teaches that the mature sprouts should be immediately liquefied in a food processor in order to stop the growth of the sprouts. (The sprouts can be refrigerated which will considerably slow their growth, but after a few days in the refrigerator, they will begin to deteriorate, developing an off flavor and yielding an inferior product.) For various reasons, however, it may not be convenient to immediately liquefy the sprouts: Personnel or facilities may not be available to immediately process liquefied sprouts which begin to sour almost immediately.

It may not be known which crackers customers may demand in the following week. Due to this, seeds usually will be sprouted only as crackers are ordered. Since the soak/sprout cycle requires 28 or more hours, it will not be possible to be as responsive to customers' demands as would be the case if the sprouts were immediately available for cracker making. For example, three different orders during a week would mean 3 extra sprouting sessions, each with its attendant care and cleanup afterward. Not being able to respond immediately to customers' demands results in unhappy customers and lost business.

For these reasons, it would be advantageous if the amount of sprouts which will be required in the near future could be sprouted at one time and then used to make crackers as needed. The method for the Sprout Flour Based NP CLASS Crackers teaches that the mature sprouts should be dehydrated and then refrigerated until needed to make crackers—thus sprouts are always available for making crackers. Therefore a whole month's requirement for sprouts can be sprouted at one time, dehydrated, and then stored under refrigeration until needed. Dehydrated sprouts will keep well under refrigeration for well over a year. No longer is it necessary to sprout small batches of seeds as required to fulfill customers' orders. Dehydrated sprouts under refrigeration are just as fresh after months in the refrigerator as they were when they reached maturity. Then when an order comes in for a given type of crackers, one need take only the required amount of dehydrated sprouts from the refrigerator, mill these sprouts, add other ingredients, and make the crackers. If only the method for making the Liquefied Sprouts Based Crackers were known, every time a customer ordered these crackers, he would have to wait an extra 28 or more hours longer to receive his order than would be the case if the method for making Sprout Flour Based NP CLASS Crackers were used. This is because in the Sprout Flour Based Method, a whole month's required supply of sprouts could have been previously grown, dehydrated, and would now be in the refrigerator ready to be used. One need only go the refrigerator, obtain the required amount of dehydrated sprouts for this order, mill them, and use the resultant sprout flour to make the crackers. With the Liquefied Sprouts Based Method, however, one must first soak the seeds for the requisite length of time (about 10 hours), and sprout the seeds (18 or more hours), before the sprouts can be used to make crackers.

If one only knows the method for making Liquefied Sprouts Based NP CLASS Crackers, one cannot grow and refrigerate a whole month's supply of sprouts at one time for they do not keep well under refrigeration—one must sprout the seeds in small batches as needed—whereas the dehydrated sprouts made in the method for making Sprout Flour Based NP CLASS Crackers keep well under refrigeration for a year or more.

(2) Reduced clean-up. When dried sprouts are milled, there is no cleanup required for the grain mill inasmuch as it is self-cleaning. But when a food processor is used to liquefy wet and growing sprouts and especially those containing gluten, cleanup is messy (the glutinous liquefied wheat sprouts adhering tenaciously to the interior surfaces of the food processor) and time consuming, and this cleanup must be repeated for each customer's order. (The reason why cleanup is especially difficult is that gluten is not only sticky but also insoluble in water as well.) Consequently, crackers made by this method are not even advertised in my catalog; the extra time, nuisance, and expense involved makes it commercially unrewarding.

(3) Milling is a continuous process, whereas liquefying in a food processor is not. Thus milling sprouts is much faster than liquefying sprouts. Sprouts can be milled continuously, whereas the bowl of a food processor needs to be filled and then emptied after each portion is liquefied. Unless the food processor is cleaned after about every two hours of use, remains of earlier liquefied sprouts in the food processor bowl will begin to sour thus yielding progressively inferior batches of crackers. (Hence, a food processor must be cleaned often; the grain mill which Applicant uses to make Sprout Flour Based NP CLASS Crackers never needs to be cleaned. Please see §5.2 for a description of the grain mill used by Applicant.)

(4) More finely ground. It is easy to control the fineness of the grind when using a grain mill and next to impossible to control the fineness of the grind when using a food processor. With the flour produced by a grain mill, one can determine the particle size of the flour by measuring the percentage by weight of the flour which passes through a series of screens with graded U.S. sieve numbers. With the liquefied sprouts produced by a food processor, no corresponding measure is currently available.

(5) Easier to mix with further ingredients. Liquefied sprouts are more difficult to evenly disperse in water than milled sprout flour. And it is much easier to disperse other ingredients into a sprout flour slurry than into a liquefied sprout slurry.

(6) In order to obtain a liquefied sprout batter which is equivalent to the sprout flour based batter which was prepared with carbonated distilled water, it is necessary to add carbonated distilled water. But due to the high water content of wet growing sprouts, it will not be possible to use as much carbonated water in the cracker batter as would be the case with the Sprout Flour Based NP CLASS Crackers. The water in the growing sprouts contributes to the amount of water in the batter when the sprouts are liquefied. This water, of course, is not carbonated.

Applicant is not aware of any advantage that Liquefied Sprouts Based NP CLASS Crackers possess over the Sprout Flour Based NP CLASS Crackers (although, due to variations in taste preferences, it is conceivable that some people may prefer the taste of Liquefied Sprouts Based NP CLASS Crackers).

Please note that these methods do not involve either cooking or the use of chemical preservatives both of which are strongly objected to by those who have switched to an all-raw or mostly all-raw food diet.

4.2.2 Terminology of Invention

NP CLASS Crackers are uncooked; i.e. they are not subjected to such times and temperatures which would denature the proteins thereof. Further, these products are nonpasteurized. According to the fourth edition of *Food Microbiology*, "Pasteurization is a heat treatment that kills part but not all of the microorganisms present and usually involves the application of temperatures below 100 C. . . . Times and temperatures used in the pasteurizing process depend on the method employed and the product treated. The high-temperature-short-time (HTST) method employs a comparatively high temperature for a short time, whereas the low-temperature-long-time, or holding (LTH), method uses a lower temperature for a longer time. Some examples follow of pasteurizing treatments given various types of foods. The minimal heat treatment of market milk is at 62.8 C for 30 minutes in the holding method; at 71.7 C for at least 15 seconds in the HTST method; and at 137.8 C for at least 2 seconds in the ultrapasteurized method. . . . Dried fruits usually are pasteurized in the package at 65.6 to 85 C for 30 to 90 minutes, the treatment varying with the kind of fruit and the size of the package." (pages 24–25) All of these pasteurization methods destroy most of a food's enzyme activity. In fact, according to page 98 of the fourth edition of *Food Microbiology*, bovine phosphatase enzyme is monitored in the pasteurization of milk. Detection of this enzyme in processed milk indicates that the milk was not properly pasteurized. What is meant, therefore, when it is stated that the NP CLASS Crackers are nonpasteurized, is that they were not subjected to such temperatures and durations of time which would be required to destroy most of the bacterial and fungal activity which ordinarily takes place in sprouts when their seed coats are broken. Such temperatures and times also destroy most of the enzyme activity as well. Further, NP CLASS Crackers are never heated to a temperature higher than 104° F. (40° C.), a temperature well below that required to destroy any of the known nutrients in seed sprouts.

By "means for breaking seed coats" is meant any process and its associated equipment which can be used to break all the seed coats of a sprout-based product so that human beings can masticate it without difficulty. The methods for making NP CLASS Crackers specify two means for breaking the seed coats of the sprouted seeds:

1. Means for milling: This means is used to grind the dried seed sprouts to a fine flour or powder. A grain mill uses means for milling.
2. Means for liquefying: This means is used to liquefy moist sprouts to paste consistency. All of the seed coats of the sprouts are broken by this means. A food processor uses means for liquefying.

Whichever of these means is used for breaking seed coats, every seed's seed coat is broken.

By "water activity reduction" is meant any process and its associated equipment which can be used to reduce the amount of water in a product which is available for the growth of microorganisms. Each group of microorganisms has a different minimum water requirement to support growth. The purpose of water activity reduction methods is to reduce the amount of water in a product which is available to microorganisms below the lowest of these minimum requirements so that the product will be shelf-stable. If microorganisms are sufficiently deprived of water, they will no longer grow. According to page 6 of the 4th edition of *Food Microbiology* (McGraw Hill Book Company, 1988), "Water is made unavailable in various ways:

1 Solutes and ions tie up water in solution. Therefore, an increase in the concentration of dissolved substances such as sugars and salts is in effect a drying of the material. Not only is water tied up by solutes, but water tends to leave the microbial cells by osmosis if there is a higher concentration of solute outside the cells than inside.
2 Hydrophilic colloids (gels) make water unavailable. . . .
3 Water of crystallization or hydration is usually unavailable to microorganisms. . . ."

By "means for drying" is meant utilizing any process and its associated equipment which can be used to remove water from the product thus reducing the moisture content of the product. Means for drying includes dehydration, use of a high speed fan or a wind tunnel, vacuum drying, using a blotter to remove moisture, etc.

By "limiting souring" is meant utilizing the souring limitation methods of this invention in such a way that $\delta pH_{LA}$, the pH drop due to lactic acid formation during the production of NP CLASS Crackers will be less than 1.15 for the cheesy varieties of NP CLASS Crackers, and will be less than 0.2 for those products prepared with sufficient amounts of water activity depressant to lower the water activity of their batters to less than 0.91 (less than 0.75 if salt is used as the water activity depressant).

By "mixing" is meant any operation in which two or more distinct materials are brought by the application of force to a substantially homogeneous dispersion.

By "rehydrating milled sprouts" is meant mixing an aqueous liquid with the milled sprouts such that the milled sprouts absorb some of this liquid.

Adequately agglutinated: A food product can be said to be adequately agglutinated if it holds together under normal conditions of shipping and use. Since wheat is very high in the agglutinant gluten, food products containing even as little as about 20% wheat or wheat sprouts by weight will most likely be adequately agglutinated. It should be noted, however, that the longer wheat is sprouted, the more is the gluten therein degraded, and the less is its agglutinating power. Other grains such as barley, oats, and rye contain lesser amounts of gluten than wheat, and crackers in which these grains predominate may need additional amounts of an agglutinant if they are to hold together under normal conditions of handling and use. Many seeds such as millet, corn, and alfalfa contain no gluten whatsoever and added amounts of an agglutinant will be required in crackers in which these seeds predominate if the cracker is to hold together. Therefore, crackers, in which gluten containing grains predominate may not require additional agglutinant as one of the ingredients whereas crackers made from low gluten or gluten free seeds will require an added agglutinant.

It should be mentioned that one of the constituents of NP CLASS Crackers must be or contain an agglutinant, or these crackers will not hold together. If the sprouted seeds contain sufficient gluten and a sufficient proportion of the product consists of these seeds, then the product will hold together. If the sprouted seeds used contain little or no gluten, or too small a proportion of gluten-containing seeds is used, then it will be necessary to add gluten, a grain containing gluten, or a substance with gluten-like characteristics (the agglutinant) such as honey, sugar, a fruit syrup, a grain syrup, molasses, or a tree syrup to the batter used to make the final product. If the sprouted seeds in NP CLASS Crackers contain gluten, and a high enough proportion of them is used, then no further agglutinant is necessary to hold these crackers together. If, on the other hand, the sprouted seeds of this product do not contain gluten, then an agglutinant (such as one of the previously mentioned agglutinants) must be added or this product will not hold together. In other words an agglutinant needs to be added to the product batter only if the sprouted seeds from which the batter is made do not contain sufficient gluten to hold the resultant dried product together. Therefore, one of the components or ingredients which this sprouted food product comprises must either be or contain an agglutinant. This is what I mean when I say that the product is, or must be, agglutinated.

4.2.3 Limitation of Souring in NP Class Crackers

The sweet varieties of both the preferred and nonpreferred species of NP CLASS Crackers use a water activity depressant such as honey or a fruit, grain, or tree syrup to retard bacterial souring until water activity has been reduced below the level at which microbial activity can take place. Except for those individuals who should severely limit their sugar intake, the moderate use of honey, fruit, grain, and tree syrups is acceptable to most health conscious consumers. NP CLASS Crackers do not require a preservative to prevent mold growth and rope development since the water activity of the crackers is reduced well below the level required to support such growths long before such slowly growing microbes can make their appearance. (Mold and fungal growths will only make an appearance in broken seed coat sprouted seed products if the water activity of these products has not been reduced below 0.60 by about the 48th hour of drying, or if the relative humidity of the atmosphere about the drying product is allowed to exceed about 70%.)

Finally, although the dried seed sprouts in NP CLASS Crackers are raw, they do not taste unpleasantly sour, having experienced a pH drop due to lactic acid formation of less than 1.15 (for the Cheesy Varieties) and less than 0.2 (for the Sweet Varieties) during the dehydration process which resulted in the final product. The sour taste which is found in raw sprouted seed products which were not processed using special methods to limit souring, is due to the excessive action of lactic acid bacteria on the moist exposed interior portion of the sprouted seeds before dehydration is complete. Such products typically have a pH drop due to lactic acid formation of greater than 1.3.

According to page 52 of the 4th edition of *Food Microbiology* (McGraw Hill Book Company, 1988), "The most important characteristic of the lactic acid bacteria is their ability to ferment sugars to lactic acid. This may be desirable in making products such as sauerkraut and cheese but undesirable in terms of spoilage of wines. Because they form acid rapidly and commonly in considerable amounts, they usually eliminate for the time being much of the competition from other microorganisms. The major genera include Leuconostoc, Lactobacillus, Streptococcus, and Pediococcus."

As the lactic acid bacteria ferment the sugars of the sprouts to lactic acid (an edible organic acid), the acid build up in the product lowers the pH of the product thus resulting in the sour taste. According to page 388 of the 4th edition of *Food Microbiology* (McGraw Hill Book Company, 1988), "A simplified equation for the production of lactic acid from glucose by such organisms is

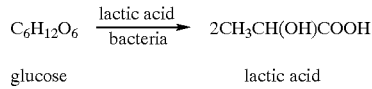

$$C_6H_{12}O_6 \xrightarrow[\text{bacteria}]{\text{lactic acid}} 2CH_3CH(OH)COOH$$

glucose    lactic acid

Actually a series of steps is involved, and small amounts of other products are produced."

According to the article on "Human Sensory Reception" on page 552 of Volume 16 of *The New Encyclopaedia Britannica* (Encyclopaedia Britannica, Inc., 15th Edition, 1982), "No simple relation has been found between chemical composition of stimuli and the quality of gustatory experience except in the case of acids. . . . The hydrogen ions of acids (e.g., hydrochloric acid, HCl) are largely responsible for the sour taste; but although a stimulus grows more sour as its hydrogen ion (H+) concentration increases, this factor alone does not determine sourness. Weak organic acids (e.g., the acetic acid in vinegar) taste more sour than would be predicted from their hydrogen ion concentration alone; apparently the rest of the acid molecule affects the efficiency with which the hydrogen ions stimulate." This explains why raw sprouted grain crackers in which sufficient lactic acid souring has occurred to lower the pH of the crackers to 4.6 taste much more sour than honey which has a pH of about 4.0 and grape concentrate with a pH of 2.4. The lactic acid molecule stimulates those taste receptors in our taste buds which are sensitive to sour and bitter much more vigorously than do the acidic molecules in honey and grape concentrate.

Therefore, by measuring pH at various stages of the production process, it can be demonstrated that bacterial souring has been limited. As will be shown, those varieties of NP CLASS Crackers prepared without a water activity depressant experience a pH drop of less than 1.15 during the course of processing, and those varieties prepared with a water activity depressant experience a pH drop of less than 0.2 during processing.

As will be seen, the essence of this invention is that the souring of the processed sprouts which would otherwise ruin the taste of NP CLASS Crackers is limited by low temperature methods (which spare enzymes) rather than by cooking (which destroys enzymes) or by chemical preservatives (which may be harmful). While souring is being suppressed, water activity reduction methods are quickly reducing the water activity of these products below the level required to support microbial growth.

Lactic acid bacteria are normally present on the surface of sprouts. When the seed coats of the sprouts are broken, lactic acid bacteria enter. If there is sufficient warmth and moisture, these bacteria grow and begin fermenting the sugars of the sprouts to lactic acid thus lowering the pH thereof and ruining the taste. The use of methods to limit souring in the making of the cheesy varieties of NP CLASS Crackers coupled with water activity reduction effectively stops this bacterial souring at the peak of taste perfection resulting in products with a very pleasant cheesy taste. The use of these methods to practically eliminate souring in the making of the sweet varieties of NP CLASS Crackers (along with the incorporation of a suitable amount of a water activity depressant in the product batter) yields products with a very pleasant sweet taste.

As was indicated by the table on page 10 of the fourth edition of *Food Microbiology*, no microbiological activity takes place if the water activity of a food product falls below 0.60. Further, according to that table, the minimal water activity required to support the growth of many bacteria is 0.91. Only those bacteria which require or thrive on a high level of salt can grow at a lower activity than 0.91.

Therefore the methods used in making NP CLASS Crackers limit bacterial growth until the water activity of the product is reduced below 0.60. (Freeze drying can not be used because freezing foods destroys most of their vitamin E, vitamin E being the only vitamin damaged by freezing temperature.)

4.2.4 Product Metrics

In order to define my invention more specifically, it is necessary to describe the type of circular solid dehydrator sheets and screens which come with the Harvest Maid FD 1000 Food Dehydrator I use to dehydrate my products.

A circular dehydrator solid sheet has a diameter of 13.5 inches. In the center of the sheet there is a 2.5 inches diameter hole. Therefore the surface area of this sheet is 3.14159*((13.5/2)2−(2.5/2)2)=138.23 square inches.

A circular dehydrator screen has a diameter of 13.625 inches. In the center of the screen there is a 2.5 inches diameter hole. Therefore the surface area of this screen is $3.14159*((13.625/2)2-(2.5/2)2)=140.89$ square inches.

For each product prepared on a drying surface (either circular dehydrator solid sheets or on circular dehydrator screens), I compute the following Product Metrics:

| Metric Name | Symbol | Description |
|---|---|---|
| Sprout Solids to Water Ratio | $SS/H_2O$ | The weight in ounces of the sprout solids in the product batter divided by the weight in ounces of water in the batter. |
| Ounces of Water per Square Inch | $H_2O/In^2$ | The weight of water in ounces in the product batter divided by the surface area of the drying surface in square inches. |
| Resultant Ounces of Product per Square Inch | $PRD/In^2$ | The weight of the final dried product in ounces divided by the surface area of the drying surface in square inches. |
| Dried Product Thickness | DPT | The approximate average depth in inches of the final dried product on the drying surface. |

4.2.5 Comparison of Methods With Those of the Closet Prior Art

In order to better illustrate the product and some of the methods that Applicant claims as his invention, Applicant will show below a side by side comparison of Applicant's method and Baker's method for producing Millet Crackers (page 113 of *The UNcook Book* by Elizabeth and Dr. Elton Baker), the closest known background art.

As mentioned in the discussion of the background art, Applicant weighed each of the ingredients listed in Baker's recipe for Millet Crackers, so that this recipe could be exactly duplicated at any time. Below is a comparison of Baker's Method for making millet crackers and Applicant's method which utilizes some of the methods of Applicant's invention:

The first four steps of each method are identical:

1. Soak ¾ cup (=4.9 ounces) of millet seeds for 8 hours in distilled water.
2. Sprout millet for 48 hours. (The result should be about 9.675 ounces of millet sprouts which, therefore, can be considered as consisting of approximately 4.9 ounces of millet solids and 4.775 ounces water.)
3. Sprout ¼ cup (=1.6 ounces) flaxseeds in 3/4 cup (=6 ounces) lukewarm distilled water for 12 hours. Do not drain.

Store in refrigerator until millet is sprouted. (Applicant assumes that Baker means that the flaxseed should merely be soaked in water in the refrigerator without the periodic washings and exposures to the air which normally characterize sprouting.)

4. Grind together the sprouted millet seeds and the soaked flax seeds. (No additional water need be added to facilitate the grinding of this mixture.) Add ½ teaspoon of salt (=0.07 ounces).
5. Remove 2 ounces of batter. Determine the pH value of a 2:1 slurry of this batter. This measured pH of the 2:1 slurry is called $pH_o$. Measure the $a_w$ of the batter.

The remaining steps of the two methods differ, and a side by side comparison of the remaining steps of each method follows:

| Millet Crackers (Baker's Method) | Millet Crackers (Applicant's Method) |
|---|---|
| 6A. Add 4 teaspoons (= 0.35 ounces) poppy seeds. After adding the salt and poppy seeds, mix well with the ground sprouts. | 6B. Stir 6.5 ounces of poppy seeds into the ground sprout mixture, and continue to stir vigorously for several minutes to ensure that the poppy seeds are uniformly distributed throughout the batter |
|  | 7B. Record the $a_w$ of the batter, and let the batter set for 30 minutes. |
| 7A. Pour out in thin layer on oiled or flour dusted cookie pan and dehydrate. | 8B. Pour the batter onto a circular screen, and spread evenly on the screen. Place the screen with batter in a dehydrator tray. Slice the batter into ½ inch squares. |
|  | 9B. Place an empty dehydrator tray on this dehydrator tray to provide additional ventilation for the drying batter. |
|  | 10B. Begin dehydration at 104° F. (40° C.). |
| 8A. Mark in triangles when half dry. | 11B. Every 30 minutes for the next 3 hours, reslice the drying batter along the slice marks of step 8B. |
|  | 12B. Every 12 hours after step 7B, check the $a_w$ of the drying batter. |
| 9A. Break into triangles when crisp and store in cool, dry place. | 13B. Continue to dehydrate the batter until its $a_w$ has been reduced below 0.45. |
| 10A. After the batter has been dehydrated to an $a_w$ of 0.45, measure the pH of a 2:1 slurry prepared from the batter. This pH value is called $pH_f$. Then $\delta pH_{LA}$ = $pH_o-pH_f$. | 14B. After the batter has been dehydrated to an $a_w$ of 0.45, measure the pH of a 2:1 slurry prepared from the batter. This pH value is called $pH_f$. Then $\delta pH_{LA}$ = $pH_o-pH_f$. |

Applicant will now describe the novel features of his invention referring to the several steps of his above method for making sprouted rice crackers.

The big advantage in using 6.5 ounces of poppy seeds instead of 0.35 ounces at step 6B is two-fold. First the extra poppy seeds soak up water from the rest of the batter thus depriving lactic acid bacteria of this water which in and of itself will reduce bacterial souring. Second, the batter becomes thick enough during the waiting period to be spread on dehydrator screens instead of a cookie pan or a solid dehydrator sheet. This allows the batter to dry on both sides simultaneously, which eliminates the moisture gradient from the bottom of the batter to the drying surface and greatly accelerates dehydration thus further reducing bacterial souring.

Slicing the batter every 30 minutes of dehydration time for several hours further accelerates the drying process by ensuring that no part of the batter is more than ½ inch from a drying surface for longer than 30 minutes.

When Applicant followed the steps of his method for making Millet Crackers, he found that the $a_w$ of the batter after the 30 minute wait of step 7B was 0.905 which is just under the lowest $a_w$ which will support bacterial activity. The pHf at step 14B was 5.21 which is 0.01 lower than the pH of the batter as measured at step 5. Hence, $\delta pH_{LA}=pH_o-pH_f=5.22-5.21=0.01$. This indicates that after the initial souring of the soaking flaxseeds in the refrigerator, the methods of Applicant's invention inhibited any further bacterial souring.

4.2.6 Two Tests For Determining the Vitality of NP Class Crackers

At this point, one might wonder whether NP CLASS Crackers are "living foods". There are two key tests for determining whether a sprouted seed product still possesses its "vitality". The first test is the test for enzyme activity. The dominant enzyme in sprouts is amylase (also called diastase), the enzyme which converts starches to sugars. The results of amylase enzyme analysis can be expressed as so many starch liquefying units (FM) per gram. (An enzyme with 1,000 starch liquefying units per gram reduces the viscosity of 300 times its weight of potato starch by 90% in 10 minutes at 70° C. and pH 6.7.) From this measurement, the activity of the amylase enzyme (also called diastatic activity) in a product can be determined. A food retaining most of its amylase activity also retains most of its other enzyme activity as well. A food can be said to be mostly "living" if it still possesses more than half of its enzyme activity. Samples of NP CLASS Crackers were submitted to a food testing laboratory for enzymatic analysis. Their analysis of NP CLASS Crackers for enzymatic activity shows that NP CLASS Crackers retain more than 90% of the amylase enzyme activity of the unprocessed sprouts from which they were made. (The results of this analysis are shown in "The Results of Enzymatic Analysis of the Products of This Invention" section (§5.8) of this patent application.) Therefore, NP CLASS Crackers can be considered living foods, retaining as they do substantially more than half of the amylase enzyme activity of the unprocessed sprouts from which they were made.

A second test of whether NP CLASS Crackers still possess their "vitality" is the sprouting test. If unsprouted seeds of the type used in these products can be subjected to the same temperatures and durations of time as NP CLASS Crackers and will still sprout, it can be said that the temperatures and durations of time of the methodology herein disclosed have done nothing to harm the "vitality" of the sprouts in NP CLASS Crackers. A method for verifying that 104° F. (40° C.) is a "safe" temperature for the vitality of NP CLASS Crackers whereas 125° F. (52° C.) is a "destructive" temperature for this vitality is taught in the "Verification of Product Vitality" Section (§5.7) of this patent application. An actual example is also shown.

This new class of food products has two species which I list here in order that one can more easily follow the several objects and advantages of my invention:

(1) Sprout Flour Based NP CLASS Crackers (the preferred species).

(2) Liquefied Sprouts Based NP CLASS Crackers (the nonpreferred species).

4.2.7 Objects and Advantages

Accordingly, several objects and advantages of NP CLASS Crackers are:

(a) to provide healthful alternatives to baked goods and commercial snack foods retaining the vital nutrients (enzymes, proteins, vitamins, minerals, etc.) of the sprouts from which they were made in as natural a state as possible; i.e., the heat labile nutrients in these products have not been damaged. (both species)

(b) to provide an easy to chew raw sprouted food product with pleasant taste and excellent shelf life (the souring action which would render the product somewhat unpalatable being limited) and thus suitable for a dietary staple and a healthful snack food. Samples of my product (in which a water activity depressant was used) had no discernible mold or rancidity and had excellent taste even after 3 months in the refrigerator. This long and stable shelf life is due to the water activity of the product having been reduced to less than 0.60. (both species)

(c) to provide a raw sprouted food product which, although prepared without cooking or chemical preservatives, resists mold, fermentation, fungal growths, and vitamin depletion. (both species)

(d) to provide a method of producing raw sprouted food products in which the sprouting process can be separated in time from the water activity reduction process which produces the final product. In the method of the Sprout Flour Based Species, the seeds are sprouted and then dried. These dried sprouts will keep for months in the refrigerator since their outer coats are intact and their water activity is less than 0.60. Then, at any time when one is ready to produce the final product, the dried sprouts can be taken from the refrigerator, milled with a flour mill, rehydrated with or without a water activity depressant, and then subjected to water activity reduction to produce the final product. (Sprout Flour Based NP CLASS Crackers)

(e) to provide a quick drying method of making large quantities of good tasting sprouted products very economically and with significant energy savings. With each species, the batter not only can be made up to 1 inch thick, but also can be spread on dehydrator screens instead of dehydrator solid sheets thus greatly speeding up the dehydration process and reducing bacterial souring. Not only can larger batches of crackers now be obtained, but also fewer dehydrator trays and screens need be used, and considerably less cleanup is required. At last large scale economical production of NP CLASS Crackers is feasible. (both species)

(f) to provide a dietary staple prepared well below 160° F. (71° C.), the temperature at which proteins are denatured and possibly become carcinogenic. (Some commercial baked goods are prepared at temperatures of more than three times the temperature at which proteins are denatured. This is of great concern to me, for such high cooking temperatures are a possible contributing factor to our country's current cancer epidemic. For example U.S. Pat. No. 5,000,968 to Szwerc et al. (1991) discloses crackers prepared at temperatures ranging from 350° F. to 600° F., and U.S. Pat. No. 3,911,142 to Huelskamp et al. (1975) discloses a protein snack food dehydrated at temperatures ranging from 600° F. to 700° F.)

(g) to provide a good tasting raw sprouted seed product with severely limited souring. The souring which would have occurred is virtually suppressed by the use of sufficient water activity depressant. (both species)

(h) to provide methods of preparing raw sprouted seed products in which mold and fungal growths are entirely prevented. (both species)

(i) to provide methods of preparing raw sprouted seed products which succeed in preserving more than 90% of the diastatic activity of the sprouts from which they were made. (both species)

(j) to provide a raw sprouted food product which need not be frozen which would destroy its vitamin E content. (both species)

(k) to provide a product, which, even when thoroughly dry, will not cut up the inside of one's mouth with sharp edges as is the case with sprouted grain products which lack sufficient amounts of nongluten-containing seeds to moderate hardness. Since these products are tasty and easily chewed, they will appeal even to those who do not normally consume health foods. (both species)

(l) to provide a high fiber dietary staple with a greatly improved amino acid profile over similar unsprouted products. (both species)

(m) to provide a healthful product with not only a pleasant satisfying taste but also an attractive appearance as well. (both species)

(n) to provide a dietary staple and snack food with the taste of Essene raw sprouted bread, the enzymes and other nutrients of the raw sprouted seeds, and long shelf life. (Liquefied Sprouts Based NP CLASS Crackers)

(o) to provide convenient raw snack foods made from sprouted seeds suitable for those who have embarked on a raw food diet. Those who go on a raw food diet sometimes have difficulty obtaining adequate amounts of high quality protein—these products go a long way toward meeting that need.

(p) to provide a shelf-stable nutritious food which could be used to alleviate world hunger. Many health experts now agree that most baked breads can no longer be considered the staff of life. The tasty and nutritious products of this invention go a long way to restoring life (i.e., enzymes) to the staff of life. (both species)

4.3 Summary of Rustic Sprouted Seed Products, Objects and Advantages

RUSTIC Sprouted Seed Products are prepared without cooking or preservatives from seeds utilizing sprouting techniques and low temperature water activity reduction methods to prevent bacterial souring and fungal growths thus minimizing damage to vital nutrients (especially enzymes) and thus producing tasty shelf-stable food products with many health benefits. The seeds are converted to a form suitable for human consumption by various methods which are very briefly summarized below:

sprouting, compressing, refrigerating, and dehydrating the seeds.

sprouting, dehydrating, compressing, and further dehydrating the seeds.

soaking seeds for several days, compressing them in the RUSTIC Press, and then dehydrating them.

soaking seeds for several days, freezing the seeds, and then dehydrating the seeds.

As mentioned in §4.2, "Summary of NP CLASS Crackers, Objects and Advantages", by "means for breaking seed coats" is meant any process and its associated equipment which can be used to break the seed coats of seeds so that human beings can masticate the seeds without difficulty. Thus, the methods for making RUSTIC Sprouted Seed Products specify two means for breaking the seed coats of the sprouted seeds: Compressing, and Freezing.

Whichever of these means is used for breaking seed coats, every seed will have some of its seed coats broken.

The various species of RUSTIC Sprouted Seed Products share the following characteristics:

Raw: The seed sprouts in these food products are raw, not having been subjected to such temperatures and durations of time which would destroy the enzymes therein.

Unsoured: The drop in pH value of these food products during product preparation due to lactic acid bacterial souring is less than 0.1. Hence, these products have a pleasant taste.

Shelf-stable: The water activity of these food products is less than 0.60. Products with a water activity below 0.60 will not support the growth of any known microorganism. Hence, these food products are shelf-stable.

Testae Intact: The compressed seed sprouts in these food products have substantially unfractured testae (seed coats) and are of substantially uniform thickness and consistency throughout. The methods outlined below ensure that although the compressed seeds in these food products have had their testae (seed coats) sufficiently fractured to facilitate easy mastication, the testae are still sufficiently intact to substantially shield the delicate nutrients within the seeds from the destructive effects of oxidation. These methods aim to ensure that the amount of fracturing of the seed coats is no more than the minimum required to ensure comfortable mastication of the seeds of the food product. Thus the compressed seed sprouts in these food products have minimally fractured testae (seed coats) and are of substantially uniform thickness and consistency throughout. Consequently the vital nutrients therein are afforded a protection not available in conventionally produced products. (It should be mentioned, however, that the more the seed sprouts are compressed, the greater the degree of fracturing of the testae. The methods of this invention ensure that for any degree of compression of the sprouted seed, fracturing of the testae and formation of sprout flour as a result of this compression are minimized.) It should be noted, however, that seeds which do not have their seed coats broken to some extent are not contemplated by this invention. Hence, both the methods of NP CLASS Crackers and RUSTIC Sprouted Seed Products contemplate the processing of broken cell wall sprouts.

Converted: Since the seed sprouts in these products are converted to a form which crumbles under moderate pressure, these products are very easily masticated.

Sprouted: This patent application teaches three methods of sprouting the seed, one of which is known and the other two of which are new.

In the known method, hereinafter called the "Traditional Sprouting Method", the seed is soaked for 10 hours and then sprouted for 18 hours with rinsings every 6 hours. This yields sprouts with a better than 50-fold increase in diastatic activity but also with an unusual sweet taste that some people dislike. This sweet taste is due to the starches of the seeds having been converted to sugars during the sprouting process.

The first new method, hereinafter called the "Quick Sprouting Method", is preferably only used in conjunction with the "The Dehydration and Compression Method" given below. In the Quick Sprouting Method, the seed is soaked for ten hours. Then during the first three hours of the dehydration step of "The Dehydration and Compression Method", the seed sprouts to a slight extent. After about the third hour of dehydration, growth stops altogether (due to lack of sufficient moisture for growth to continue). The diastatic activity is considerably lower with this Quick Sprouting Method than with the Traditional Sprouting Method, but the seed has not developed the unusual sweet taste and actually tastes quite good. Not having been sprouted for 18 hours, considerable time and expense is saved: the sprouts do not have to be rinsed and drained every 6 hours. Seed sprouted by the "Quick Sprouting Method" and then dried and compressed looks and tastes very much like conventionally manufactured grain flakes.

The second new method, hereinafter called the "Long Soak Sprouting Method", is preferably only used in conjunction with "The Ultrathin Compression and Dehydration Method" given below. In the Long Soak Sprouting Method, the seed (preferably wheat) is soaked for at least two days with the soak water being replaced with fresh water every 12 hours. After several days of soaking, the seed is very soft and compresses with considerably less pressure than it does after only 10 to 12 hours of soaking. Furthermore it is then very easy to compress the seed until it is very thin. The applicant has discovered that soaking seed for several days or longer apparently causes a modification of the interior characteristics of the seed such that when it is subsequently compressed and dehydrated, the result is a much more tender food product which is easily masticated. But due to the much weaker structure of the seed after prolonged soaking, it can no longer be compressed by a roller mill. The soaked seed tends to quickly gum up the rolls of the roller mill making further rolling very difficult. Therefore the applicant invented the RUSTIC Press to compress such waterlogged seed. Essentially the RUSTIC Press consists of a narrow plate and a wide plate connected by a hinge. The narrow plate is connected by adjustable bolts to a lower base plate onto which is placed the grain to be compressed. The end of the upper wide plate furthest from the hinge is connected to a handle which is used to force the hinged wider upper plate onto the lower base plate thus compressing the seed on it. Being essentially flat and smooth, any gumming up produced by compression of the waterlogged seed is quickly cleaned from the plates before processing the next batch of seed.

The four preferred species of RUSTIC Sprouted Seed Products are as follows:

1. Unflavored raw compressed seed sprouts: These are very thin and almost flake-like in appearance. At one end of each dried compressed sprout grown by either the Traditional or the Quick Sprouting Method can be seen a small shoot emerging. In addition, at the other end of each sprout grown by the Traditional Sprouting Method can be seen tiny rootlets. This product makes a very crisp and crunchy breakfast cereal. Sprouts produced in the Long Soak Sprouting Method have no roots and very tiny shoots.
2. Flavored raw compressed seed sprouts: These are the same as the unflavored species with a natural flavoring for extra taste. The following flavoring agents can be used: fruit syrups, honey, molasses, maple syrup, and grain syrups. (The flavorings are, of necessity, diluted with water to keep the discrete compressed seeds from sticking to each other.)
3. Raw compressed seed sprout cakes: The dried compressed sprouts in this product are held together by an agglutinant. The agglutinant in the syrup-sweetened variety is honey, molasses, or any sticky fruit, grain, or tree syrup. The agglutinant in the plain variety is gluten or any glutinous grain.
4. Sprouted Wheat, "Puffed Wheat" Style. Applicant has recently discovered that when wheat is soaked for several days with periodic rinsings every 12 hours and then frozen, there is a modification or a breaking down of the internal structure of the wheat which, Applicant believes, results in a more porous, more fragile structure. As a result, when this frozen wheat is subsequently dehydrated, the result is a very tender and easily masticated product, not too dissimilar in taste, crunchiness, and consistency to puffed wheat. So tender is the resultant product, that it hardly even needs to be compressed.

The low temperature water activity reduction methods utilized to prevent bacterial souring and fungal growth are as follows:

1. The Compression and Refrigeration Method. This method can be used to produce dried compressed sprouts. In this method, sprouts are compressed with a roller mill and dried in a frost-free refrigerator until their water activity has fallen below 0.70. A dehydrator is then used to further reduce the water activity of the sprouts below 0.60 which is a level of water activity below the minimum moisture requirement of any known micro-organism. If it is then desired to make flavored compressed sprouts or compressed sprout cake, the dried compressed sprouts are treated with flavoring or an agglutinant respectively, dried in a frost-free refrigerator until their water activity has again fallen below 0.70, and then further dried with a dehydrator until their water activity has fallen below 0.60. Products with a water activity below 0.60 will not support the growth of any known micro-organism.
2. The Dehydration and Compression Method. This is a second method for producing dried compressed sprouts. In this method, the sprouts are dehydrated until their water activity has fallen below 0.91, compressed with a roller mill, and then further dehydrated until their water activity has fallen below 0.60, which, again, is below the minimum moisture requirement of any known micro-organism.
3. The Ultrathin Compression and Dehydration Method. This third method for producing dried compressed sprouts yields very thin sprouts which, consequently, dry very quickly. In this method, wet soft sprouts are compressed between two suitably sized hard flat surfaces, held in a compressed state for sufficient time for the sprouts to retain their flattened form, and then dehydrated until their water activity has fallen below 0.60. Since the compressed sprouts produced by this method are very thin and dry quickly, their water activity drops so quickly below 0.60 that bacterial souring is minimal. Any press such as the RUSTIC Press disclosed herein which has the proper characteristics to compress wet soft sprouts very thin will be referred to as a Wet Grain Press.

RUSTIC Sprouted Seed Products are uncooked; i.e. they have not been subjected to such temperatures and times which would denature the proteins thereof. Further, these products are nonpasteurized.

What I mean when I say that my products are nonpasteurized, is that they were not subjected to such temperatures and durations of time which would destroy most of the bacterial and fungal activity which ordinarily takes place in seed sprouts when they are compressed. Such temperatures and durations of time also destroy most of the enzyme activity as well. Further, the highest temperature these products are subjected to is 104° F. (40° C.), a temperature well below that required to destroy any of the known nutrients in seed sprouts. By "compression", I mean any process which will reduce the thickness of seed sprouts sufficiently so that human beings can masticate them without difficulty. The amount of compression required depends on the hardness, moisture content, and size of the seed sprouts and is different for each variety of seed. As used herein, compression is the flattening of sprouts by such means as a roller mill or a Wet Grain Press. Unless such sprouts as wheat, rice, triticale, and barley are further processed by compression or milling, they are very difficult for human beings to chew.

In order to properly describe a key notion of this invention, names must first be given to the various phases of the sprouting process. First of all, the seeds are soaked in water. This will be called the "soaking phase" of sprouting. After the seeds have been soaked, there are various possibilities for further processing. The soaked seeds may be immediately compressed and refrigerated or dehydrated. In this event, the "soaking phase" of sprouting is the only phase of sprouting that the seeds complete. Another possibility is that the seeds may be dehydrated for a few hours and then compressed. During those few hours of dehydration, the seeds still possess sufficient moisture to continue sprouting, but their rate of growth slows as their moisture runs out. These several hours of sprouting before the seeds run out of moisture or are compressed will be called the "initial airing phase" of sprouting. The third possibility is that the seeds may be exposed to the air, rinsed from time to time, and be allowed to grow until they have reached the desired maturity. The period of time from their first rinsing until the desired maturity is reached will be called the "rinsings phase" of sprouting. Performing the activities of the "rinsings phase" on sprouts shall be referred to as "rinsing and airing the hydrated seed to maturity". What I mean, therefore, when I refer to "rinsing and airing the hydrated seed to maturity" is that after the seeds have gone through the soaking phase and the initial airing phase, the seeds are now rinsed in water periodically until they has reached the desired maturity. After each rinsing, the hydrated seeds are allowed to drain, and again exposed to the air until the next rinsing.

The important thing about the seeds in the products of this invention is that they have had their enzyme content augmented by having been soaked in water. (This soaking in water actually begins the sprouting process. It must be said that the mere act of soaking the seed is the actual beginning of the sprouting process. The seed is no longer dormant. Before being soaked in water, the seed merely had a "life potential"; during the soaking phase of sprouting, it actually comes to life as is evidenced by the dramatic increase in enzymatic activity and the corresponding decrease in harmful enzyme inhibitors.) The seed may then be drained and then rinsed every few hours or so to further increase its enzyme content. Or it may enter into further processing without experiencing the rinsings phase at all. In that event the increase in enzymatic content is small. If the next processing step for the seed were compression followed by dehydration or refrigeration, the resultant increase in enzymatic activity over the unsprouted state would be less than 25 percent. If the next processing step for the seed were dehydration at a temperature of 104° F., for example, during the first three hours of dehydration the seed would still have sufficient moisture to continue sprouting (thus experiencing the initial airing phase) and the resultant increase in enzymatic activity over the unsprouted state would be about 50 percent.

Now the seed, whether it is used immediately after the soaking phase or is subjected to the initial airing phase, is either compressed right away followed by dehydration or refrigeration to lower its water activity, or is dehydrated somewhat and then compressed. In any event, the seed is compressed and then dried using either a dehydrator or the dehydrating effects of a refrigerator. At the point where the seed enters into further processing with or without experiencing the rinsings phase, it will be referred to as "hydrated seed", i.e., it has imbibed water. If it is then allowed to enter the rinsings phase, it will continue to imbibe water (the key notion here) and will, therefore, still be referred to as "hydrated seed". After being compressed, whether or not it is dried somewhat first, it will be referred to as "compressed hydrated seed". Then after its water activity has been lowered to the final contemplated level, it will be referred to as "dried compressed hydrated seed". The key idea is not whether it has entered any of the other sprouting phases after having been initially soaked; the key idea is that these seeds have imbibed water and are now suitable candidates for the further processing steps of the methods of this invention.

By "compressed hydrated seed", therefore, I mean seed which has at least undergone the soaking phase, and then, with or without entering the initial airing or rinsings phases, is compressed, this compression taking place either before or after its water activity has been reduced. The Quick, Long Soak, and Traditional Sprouting Methods yield hydrated seeds which are good candidates for compression. The terms "compressed sprouts" and "compressed dried sprouts" are to be understood as meaning "compressed hydrated seeds" and "dried compressed hydrated seeds" respectively wherever they appear in this specification.

Seeds which complete any of the three phases of sprouting have the necessary characteristics for the practice of this invention:

1. Being soft and pliable, they are easily compressed, with a minimum of fracturing and formation of sprout flour.
2. There has been an increase in enzymes with a corresponding decrease in enzyme inhibitors.
3. After drying, if unhulled, they can be hulled thus making them "edible".

Unless such seeds as millet which have very thin hulls are used, either hulled seeds must be selected for the sprouting process, or the hulls must be removed subsequent to sprouting. A special class of candidate dried compressed hydrated seeds must be defined for the purposes of this invention. This class shall be called the "edible compressed hydrated seeds". This class includes all nonpoisonous seeds which have experienced at least the soaking phase of sprouting, and further have very thin hulls (such as millet) or were hulled prior to being soaked in water (if they are the kind of seed which will still sprout once the hull has been removed), or were hulled after being compressed and dried. The presence of thick hulls in the final products would render them unacceptable by human standards. Examples of edible compressed hydrated seeds are unhulled compressed hydrated millet, hulled compressed hydrated millet, compressed hydrated hulled grain, and hulled compressed hydrated buckwheat.

To obtain a variable which measures the degree of difficulty in chewing sprouted seed which had been compressed to various thicknesses, Applicant obtained a pasta machine with adjustable rolls (The Deluxe Atlas Pasta Queen, Himark Enterprises, Hauppauge, N.Y.). He then produced compressed sprouted wheat of various thicknesses. Applicant found that it is very difficult to chew compressed sprouted wheat seeds which are thicker than 2.4 mm. (Uncompressed sprouted wheat averages 3 mm in thickness.) An X-ACTO® No. 1 Knife with a new No. 11 Fine Point Blade (Hunt XACTO, Speedball Road, Statesville, N.C. 28677) was used to slice a 2.4 mm thick dried compressed wheat sprout, and the force needed to slice it was measured. (This measurement was performed as follows: a 2.4 mm thick dried compressed wheat sprout was placed on a scale, and the scale was initialized to read zero. Holding the X-ACTO Knife perpendicular to the lengthwise direction of the wheat sprout, the blade of the knife was placed near the middle of the wheat sprout and pressed down until the wheat sprout was sliced in half. The maximum scale reading at the time the wheat sprout was sliced in half was recorded.) It took 3 pounds 8.2 ounces of force to slice a 2.4 mm thick compressed wheat sprout. Applicant has called this 3 pounds 8.2 ounces of force the Comfortable Mastication Force (CMF). Since different kinds of seed sprouts vary in hardness, the degree to which any given seed sprout must be compressed, such that CMF pounds of force on an X-ACTO Knife with the Fine Point Blade will slice the sprout in half, will vary. The maximum thickness that a given kind of dried seed sprout can have after compression such that CMF pounds of force applied on the X-ACTO Knife with the Fine Point Blade will slice any one of them in half shall be called that kind of sprout's Maximum Mastication Thickness (MMT). This MMT will vary inversely with the hardness of the type of seed sprouted. Mastication Difficulty (MD) can be computed from CMF as follows: MD=(force needed to slice a compressed sprout/CMF). One will have difficulty masticating seeds with an MD much greater than 1.

What I mean, therefore, when I say that the MD of the dried compressed seed sprouts of this invention is less than 1, is that not only have these sprouts been sufficiently compressed to break their seed coats but also that these sprouts have been compressed to less than their MMT and are now sufficiently thin that the quantity [(Maximum force required to split any one of them with an X-ACTO Knife with the Fine Point Blade)/CMF] is less than 1. In other words, these sprouts are sufficiently thin that any one of them can be split in half with an X-ACTO Knife with the Fine Point Blade using a force of less than the sprout's MMT. Applicant has found that the rolls of the Rolled Oats Crusher are sufficiently close to one another to yield compressed wheat sprouts with a thickness of less than MMT, and thus with an MD of less than 1. If other types of roller mills and sprouted seeds are used to practice this invention's methods, the distance between the rolls of the mill must be sufficiently reduced to ensure that the sprouts have their seed coats broken and that the MD of the dried compressed sprouts is less than 1. Otherwise the output of the mill will be difficult to chew. (For reference purposes, the average force which must be applied to an X-ACTO Knife with the Fine Point Blade to slice in half a hulled unsprouted wheat seed is 3 pounds 11 ounces (MD≈1.05). The average force required to slice an unsprouted barley seed is 5 pounds 13.6 ounces (MD≈1.7). This is the reason why sprouted barley seed is considerably more difficult to masticate than sprouted wheat seed.)

Applicant has discovered that when wheat seeds have been soaked in water for 5½ days (with a change of soak water every 12 hours), frozen, and then dehydrated, the average force which must be applied to an X-ACTO Knife with the Fine Point Blade to slice in half one of these dehydrated seeds is 2 pounds 12.7 ounces. Hence MD≈0.80. Applicant ate these wheat seeds and found that they had approximately the taste, consistency, and mouth-feel of puffed wheat. Applicant has defined the term "Chewing Comfort Soak Time" to mean the length of time that wheat seeds must be soaked in water such that when they are subsequently frozen and dehydrated, their average MD will be less than 1.0. Applicant has further defined the term "Optimal Chewing Comfort Soak Time" to mean the length of time that wheat seeds must be soaked in water such that when they are subsequently frozen and dehydrated, their average MD will be less than 0.8.

Applicant also dehydrated some of the above wheat seeds which had been soaked for 5½ days. But this time he did not freeze them before dehydrating them. In this case, the average force which had to be applied to an X-ACTO Knife with the Fine Point Blade to slice in half one of these dehydrated seeds was 3 pounds 2 ounces. Hence MD≈0.89. Applicant ate these wheat seeds and found that although they were somewhat more difficult to chew than the wheat seeds which had been frozen before dehydrating them, these again had approximately the taste, consistency, and mouth-feel of puffed wheat.

By "water activity reduction", I mean any process and its associated equipment which can be used to reduce the amount of water in a product which is available for the growth of microorganisms. Examples of such processes are: increasing the concentration of dissolved substances in the Pre-Product (the term Pre-Product is defined below), incorporating hydrophilic colloids in the product, vacuum chamber drying, centrifuge techniques, and drying in a wind tunnel. Each group of micro-organisms has a different minimum water requirement to support growth. The purpose of water activity reduction methods is to reduce the amount of water in a product available to micro-organisms below the lowest of these minimum requirements. If micro-organisms are sufficiently deprived of water, they will no longer grow.

By "syrup sweetened" is meant that the product is sweetened and held together by honey, molasses, or any sticky fruit, grain, or tree syrup.

By "flavored" is meant that the product is flavored with a syrup (or other seasoning) which has been diluted with water to such an extent that the discrete compressed seeds of the product do not significantly adhere to one another.

By "milling" is meant grinding to a fine flour.

By "limiting souring" is meant utilizing the souring limitation methods of this invention to limit the pH drop, $\delta pH_{la}$, of each of the products of this invention to less than 0.1. The pH drop, $\delta pH_{la}$, is defined as the drop in the pH value of a product which occurs when lactic acid bacteria convert the sugars of that product to lactic acid during the preparation of that product. ("la" stands for lactic acid.) $\delta pH_{la}$ can be determined as follows:

1. The Pre-Product is defined as the input to the process which produces the final product. The following table defines the Pre-Product for each of the preferred species of this invention.

| Species (Final Product) | Pre-Product |
| --- | --- |
| unflavored raw compressed seed sprouts | seed sprouts |
| flavored raw compressed sprouts | seed sprouts plus flavoring |
| raw compressed sprout cakes.: | |
| a. syrup sweetened variety | seed sprouts plus syrup |
| b. plain variety | seed sprouts. |
| sprouted wheat, "puffed wheat" style | soaked wheat |

2a. Where the Pre-Product is soaked wheat or seed sprouts alone, a slurry is prepared from 1 part by weight uncompressed dried sprouts and 2 parts by weight neutral pH water (water with a pH of 7). The pH of this slurry is measured and called $pH_o$.

2b. Where the Pre-Product is seed sprouts plus flavoring or syrup, a slurry is prepared from 1 part by weight uncompressed dried sprouts, 2 parts by weight neutral pH water, and a proportionate amount of the flavoring or syrup. (The exact amount of flavoring or syrup to be added is given at the pertinent step of "The Method" in the Description of Preferred Method to Manufacture Invention section of this patent application.) The pH of this slurry is measured and called $pH_o$.

3. Dehydrate the final product to a water activity of 0.60.

4. Take 1 part by weight the final product, mill it to flour, and stir it into 2 parts by weight neutral pH water to form a 2:1 slurry.

5. Measure the pH of this 2:1 slurry. Call it $pH_f$.
6. Then $\delta pH_{la} = pH_o - pH_f$, and is therefore a positive number which reflects the drop in pH value of the product due to lactic acid formation in the product during product preparation. (The detailed method steps by which $\delta pH_{la}$ is to be computed for each product are given at step 75.)

As used throughout this Specification, the term "2:1 slurry" refers to a slurry consisting of two parts neutral pH water and 1 part the milled product.

Although the dried compressed seed sprouts in RUSTIC Sprouted Seed Products are raw, they do not taste sour, having experienced a drop in pH value due to lactic acid formation during product preparation of less than 0.1. The sour taste which is found in raw sprouted seed products which have not been processed using special methods to prevent souring, is due to the action of lactic acid bacteria on the moist exposed interior portion of the sprouted seed before dehydration was complete. The initial pH of the Pre-Product from which such products are made can be determined as explained above. Such products typically experience a drop in pH from about 6.0 to about 4.5 during product preparation. Hence, for such products, $\delta pH_{la}$ is in excess of 1.4.

Because lactic acid bacteria convert sugars to lactic acid rapidly and in considerable amounts, they usually eliminate for the time being much of the competition from other micro-organisms.

As the lactic acid bacteria ferment sugars to lactic acid (one of the organic acids), the acid build up in the product lowers the pH of the product thus resulting in the sour taste.

Soured sprouted seed products with a pH of 4.5 taste much more sour than honey which has a pH of about 4.0, apple concentrate with a pH of 3.9, and even more sour than grape concentrate with a pH of 2.4. The lactic acid molecule stimulates those taste receptors in our taste buds which are sensitive to sour and bitter much more vigorously than do the molecules in honey, apple concentrate, and grape concentrate.

Therefore, by measuring the pH of my products at various stages of the production process, it can be demonstrated.that bacterial souring is not occurring. As will be shown, the products of this invention experience a pH drop of less than 0.1 during the course of preparation.

These new food products, therefore, are the only ones, to my knowledge, truly using the second (nonpasteurized) method of making shelf-stable ready-to-eat sprouted grain breakfast cereals which was previously described in the "Description of Prior Art" section of this patent application: Bacterial souring and fungal growth are prevented by reducing the water activity of the sprouts below the point at which any bacterial or fungal activity can occur.

In this patent application, I will refer to RUSTIC Sprouted Seed Products as comprising "compressed sprouts". (I wish to reserve the term "flakes" for breakfast cereals prepared with a cooker extruder or similar equipment and flaked with flaking rollers.)

As will be seen, the essence of RUSTIC Sprouted Seed Products is that low temperature water activity reduction methods (which spare enzymes) rather than cooking (which destroys enzymes) or the use of preservatives (which also spares enzymes but which many find objectionable) are used to inhibit bacterial souring. Lactic acid bacteria are normally present on the surface of seed. When the seed is compressed, portions of the seed coat (testa) are broken, and the lactic acid bacteria enter. If there is sufficient warmth and moisture, these bacteria grow and begin fermenting the sugars of the seed to lactic acid thus ruining the taste. The low temperature water activity reduction methods of this invention prevent this bacterial souring. When the compressed sprouts are further treated with flavoring or agglutinant prior to making flavored compressed sprouts or compressed sprout cakes respectively, the high water content of the flavoring or agglutinant will again provide the moisture necessary for bacterial souring and fungal growth to occur unless low temperature water activity reduction methods are again used to prevent this. (In this context, an agglutinant is an edible substance which will cause the discrete compressed sprouted seeds of my products to adhere to one another.

As was indicated by the table on page 10 of the 4th Edition of Food Microbiology, no microbiological activity takes place if the water activity of a food product falls below 0.60.

Therefore my methods use dehydration and refrigeration to inhibit microbial activity until the water activity of the product is reduced below 0.60.

Further, the sprouts are compressed or frozen rather than being blended or milled in order that the bulk of the nutrients within the sprouts may be protected from rather than exposed to the ravages of oxidation.

RUSTIC Sprouted Seed Products has four species which I list here in order that one can more easily follow the several objects and advantages of my invention:
1. unflavored raw compressed sprouts
2. flavored raw compressed sprouts
3. raw compressed sprout cakes
   a. syrup sweetened variety
   b. plain variety
4. Sprouted Wheat, "Puffed Wheat" style At this point, one might wonder whether RUSTIC Sprouted Seed Products are "living foods". There are two key tests for determining whether a sprouted seed product still possesses its "vitality". The first test is the test for enzyme activity. The dominant enzyme in sprouted seed is amylase, the enzyme which converts starches to sugars. The results of amylase enzyme analysis can be expressed as so many starch liquefying units (FM) per gram. (An enzyme with 1,000 starch liquefying units per gram reduces the viscosity of 300 times its weight of potato starch by 90% in 10 minutes at 70° C. and pH 6.7.) From this measurement, the activity of the amylase enzyme in a product can be determined. A food retaining most of its amylase activity also retains most of its other enzyme activity as well. A food can be said to be mostly "living" if it still possesses more than half of its enzyme activity. Thus, the products of my invention can be considered living foods because they retain in the final product substantially more than half (and, in fact, more than 90 percent) of the amylase enzyme activity of the unprocessed sprouts from which they were made. Samples of the breakfast cereal made by the methods of this application were submitted to a food testing laboratory for enzymatic analysis. The results of this analysis are shown in §5.8, "Results of Enzymatic Analysis of the Products of This Invention"

A second test of whether the products of my invention still possess their "vitality" is the sprouting test. If unsprouted seeds of the type of seed used in my products can be subjected to the same temperatures for the same durations of time as the products of my invention and will still sprout, it can be said that the temperatures and times of the methodology I am teaching have done nothing to harm the "vitality" of the sprouts in my products. A method for verifying that 104° F. (40° C.) is a "safe" temperature for the vitality of the products of my invention whereas 125° F. (52° C.) is a "destructive" temperature for this vitality is taught in the §5.7.2, "Verification of Product Vitality for RUSTIC Sprouted Grain Products". An actual example is also shown.

Accordingly, the objects and advantages of the present invention are:

(a) to provide a healthful breakfast cereal and a granola-like bar made therefrom which contain raw sprouted seeds. Sprouting seeds for 18 hours increases their amylase enzymatic activity 50 fold with a corresponding decrease in enzyme inhibitors. (When the Quick Sprouting Method is used, the seeds sprout for only about 3 hours which leads to only a 50 percent increase in amylase enzymatic activity, with a corresponding 50 percent decrease in enzyme inhibitors. When the Long Soak Sprouting Method is used, the seeds have only been exposed for a total of about fifteen minutes to the air—during the twelve hour rinsings—and have just barely started sprouting having only very tiny shoots.) During the sprouting process, the starches of the seeds are converted to sugars. And since microbial activity is suppressed during product preparation, these products retain their naturally sweet taste.

(b) to provide healthful raw sprouted seed breakfast cereals and products based thereon which have not been exposed to such temperatures and durations of time which would destroy the enzymes and other vital nutrients thereof. (all species)

(c) to provide healthful raw sprouted seed breakfast cereals and products based thereon which are not prepared with preservatives which many health knowledgeable people are attempting to avoid. (all species)

(d) to provide healthful raw alternatives to baked goods and commercially available snack foods prepared without preservatives or nutrient-destroying heat or cold, thus retaining the vital nutrients (enzymes, proteins, vitamins, minerals, etc.) of the sprouts from which they were made in as natural a state as possible. (species 3)

(e) to provide raw sprouted seed products which have as little as possible of the interior portion of the seed exposed to the ravages of oxidation during processing, thus better retaining those vital nutrients which are especially vulnerable to oxidation. (Flour based and cooker extruder produced sprouted seed products have had the entire inner portion of the seed exposed to the air during processing.) (all species)

(f) to provide raw sprouted seed products in which the compressed sprouted seeds of the product have been compressed to less than their MMT, and, therefore, have an MD of less than 1. Consequently, the product is very easily masticated. One should not have to worry about chipping a tooth while eating. (species 1–3)

(g) to provide unsoured raw sprouted seed products which are shelf-stable. Since these products are unsoured, they have a pleasant taste, which will encourage even the most taste-conscious consumers to use these products. And since the water activity of these food products is less than 0.60, they are not susceptible to microbial activity as long as they are kept dry. (all species)

(h) to provide raw sprouted seed products in which the sprouting process has been severely truncated in order to provide a lower priced product with an even more acceptable taste for the mass market.

(i) To provide raw sprouted seed products in which fracturing of the seed coats of the compressed seed sprouts has been minimized. Therefore these products are substantially free from sprout flour which would render the products unmarketable. (all species)

(j) To provide ultra-thin sprouted seed flakes which have the consistency, tenderness, and mouth-feel of commercially available grain-flakes. Being very thin and tender, these sprouted seed flakes do not need to be soaked in liquid prior to consumption by the consumer.

(k) To provide a dried sprouted seed food with the consistency and organoleptic properties of puffed wheat. Being very tender, this product does not need to be compressed before consumption by humans. (species 4)

(l) to provide a device for compressing wet sprouts with the following advantages over a roller mill:

(1) much easier to use in continuous operation, for much easier to keep from clogging up with crushed sprouts.

(2) more easily cleaned at end of compressing operation.

(3) can be used to exert a pressure for a given period of time.

(4) much cheaper to manufacture and service.

(5) much easier to vary the amount by which the sprouts are compressed.

Having read this far, the reader might think that the idea of using low temperature water activity reduction methods to produce a breakfast cereal is such a simple one that surely it must have been done before. One might therefore think that preparing a breakfast cereal by these methods is obvious to one with ordinary skill in the art. This is not true. A careful review of the literature in the art of sprouting shows that other than making sprout bread, sprout flour and such products as barley malt, those who are skilled in this art ordinarily do not dehydrate the sprouts they grow, preferring to eat and market fresh sprouts. And, none of the books or articles with which I am familiar in the field of nutrition teaches a method for making raw breakfast cereals using a roller mill. It certainly was not obvious to me how best to use a roller mill to make compressed sprouts. In my first few attempts to make compressed sprouts, I tried feeding freshly grown 24 hour sprouts into the hopper of a roller mill, and turning the crank. My progress in rolling the wet sprouts was somewhat slow, and the moist compressed sprouts gummed up the rollers of the roller mill, making cleanup difficult. It should be noted, however, that the advertisement for this Rolled Oats Crusher roller mill in the Walnut Acres catalog does not even hint that this roller mill might be suitable for preparing a raw breakfast cereal. The advertisement reads in part as follows: "Make your own hot cereal from freshly rolled grains . . . Our Rolled Oats Crusher flakes oats, rye, wheat, barley and other 'soft' grains, ready to cook up into a cereal or for your recipes . . ."

Thus, while it was known that flaked or rolled grains make an excellent hot cereal, what was not known, and what I believe I am the first to discover is that when low temperature water activity reduction methods are used to produce compressed sprouted grain products, the compressed dried sprouts therein are very easy to chew and consequently make very delicious as well as nutritious raw breakfast cereals and other products based thereon. Then also, since most people do not appreciate the fact that cooking destroys vital enzymes, they would not have had an incentive to look for ways to prepare raw as opposed to cooked breakfast cereals. The vast majority of the human race have always consumed their grains cooked, and most people believe that grains require cooking to make them edible. Further, those with experience in the art of using a roller mill to crimp (roll) grain customarily do so to prepare grain for consumption by livestock and ordinarily have neither experience in the art of sprouting nor in the art of making breakfast cereals. Finally those with experience in the art of making sprouted-grain breakfast cereals are usually only familiar with the cooker extruders and flaking rollers made for that purpose.

Furthermore, the exceedingly thin flakes which result from soaking seed for two or more days, compressing this seed in a Wet Grain Press, and dehydrating this seed, rival anything found in the supermarket for crisp and tender crunchiness. None of the prior art methods even vaguely resemble this new method for producing ultrathin flakes.

Finally, the delicate and tender sprouted seed product produced by soaking seed for several days, freezing it, and then dehydrating it, is so tender that it does not even need compression before consumption by humans.

Other objects and a fuller understanding of the invention may be had by referring to the following description, drawings, and claims.

4.4 BRIEF DESCRIPTION OF THE DRAWINGS

The present invention will become more fully understood from the detailed description given hereinbelow and the accompanying drawings which are given by way of illustration only, and are thus not limitative of the present invention, and wherein.

4.5 DETAILED DESCRIPTION OF THE DRAWINGS

Figure 1:
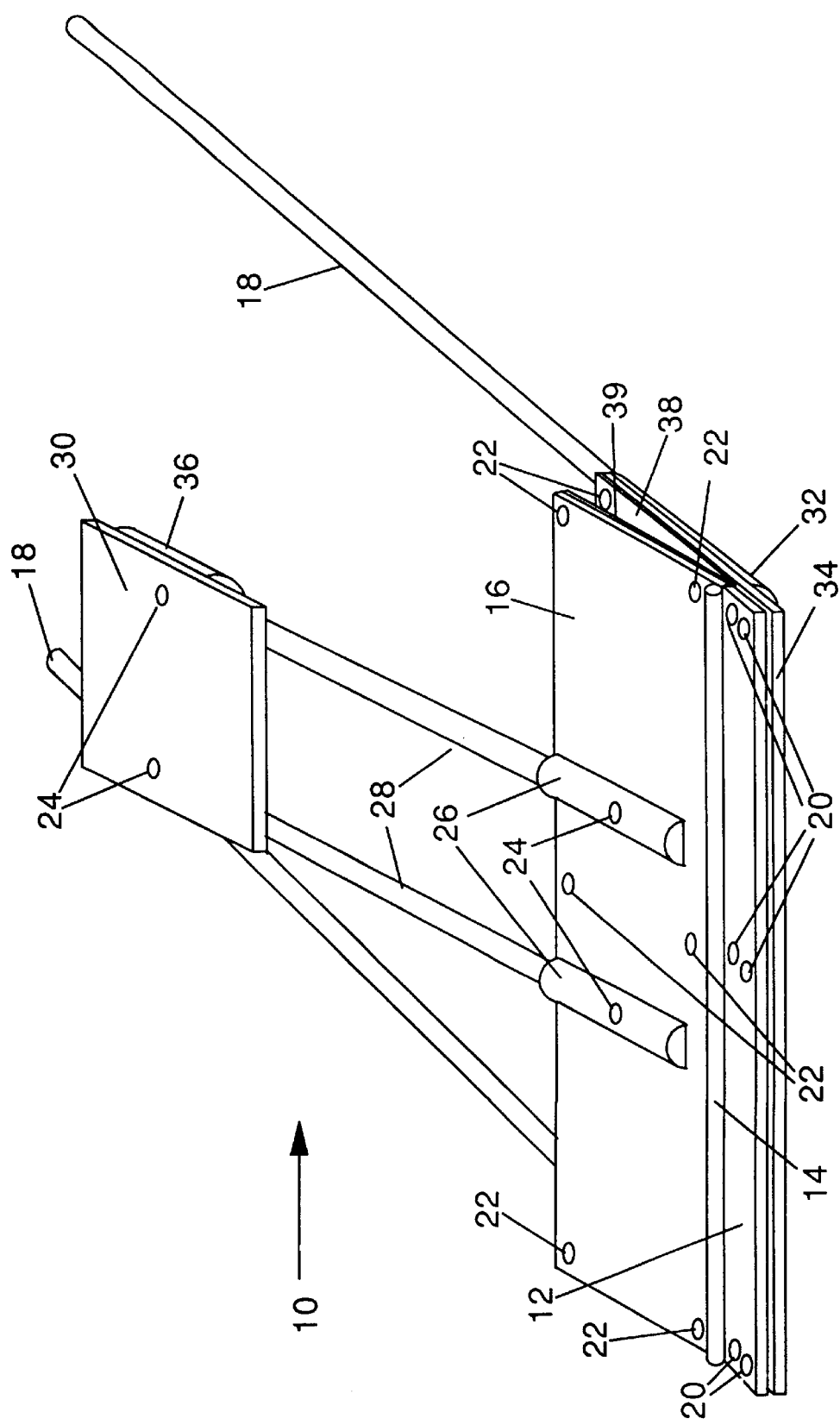
FIG. 1 is a perspective view of the RUSTIC Press in a partially opened state.
Figure 2:
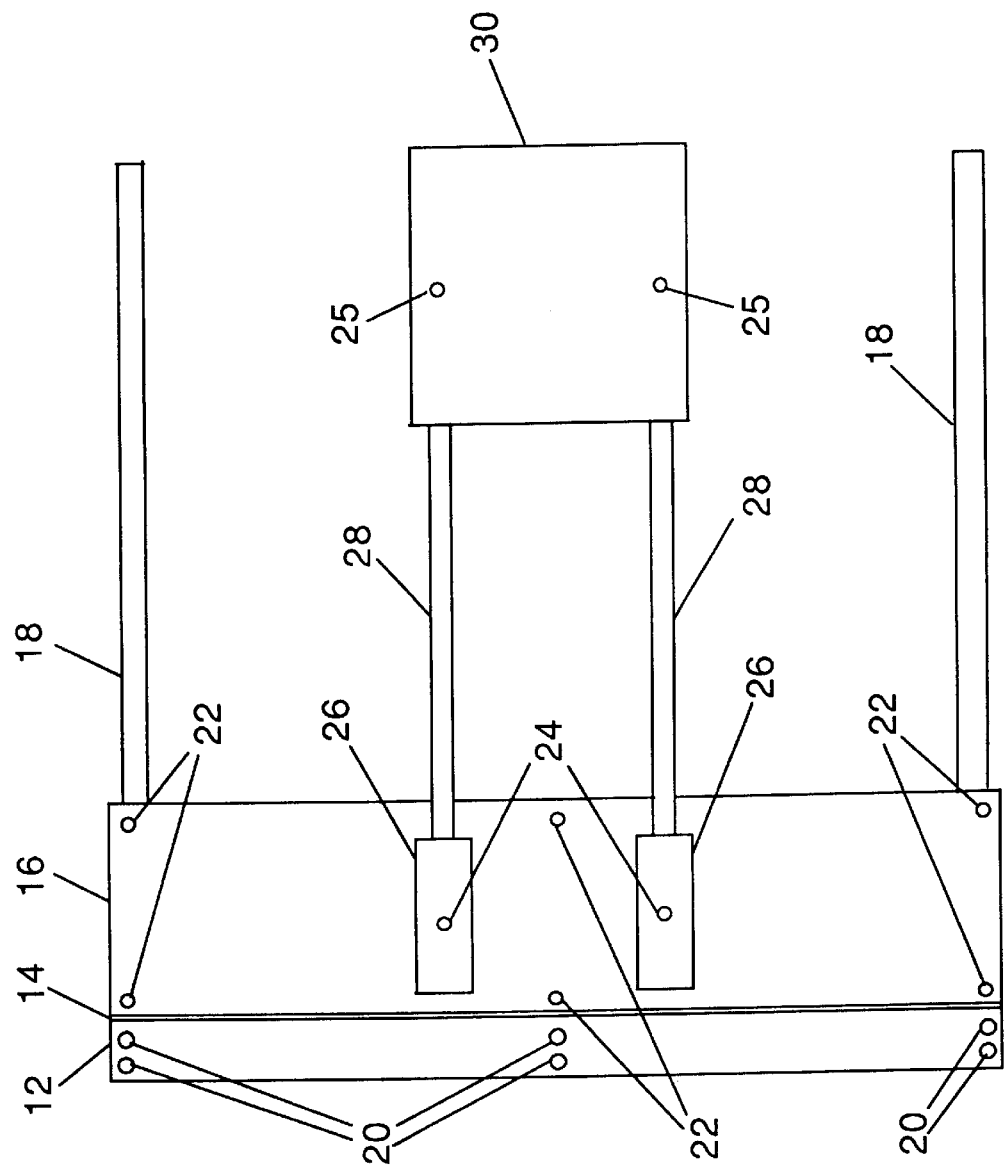
FIG. 2 is a top view of the RUSTIC Press.
Figure 3:
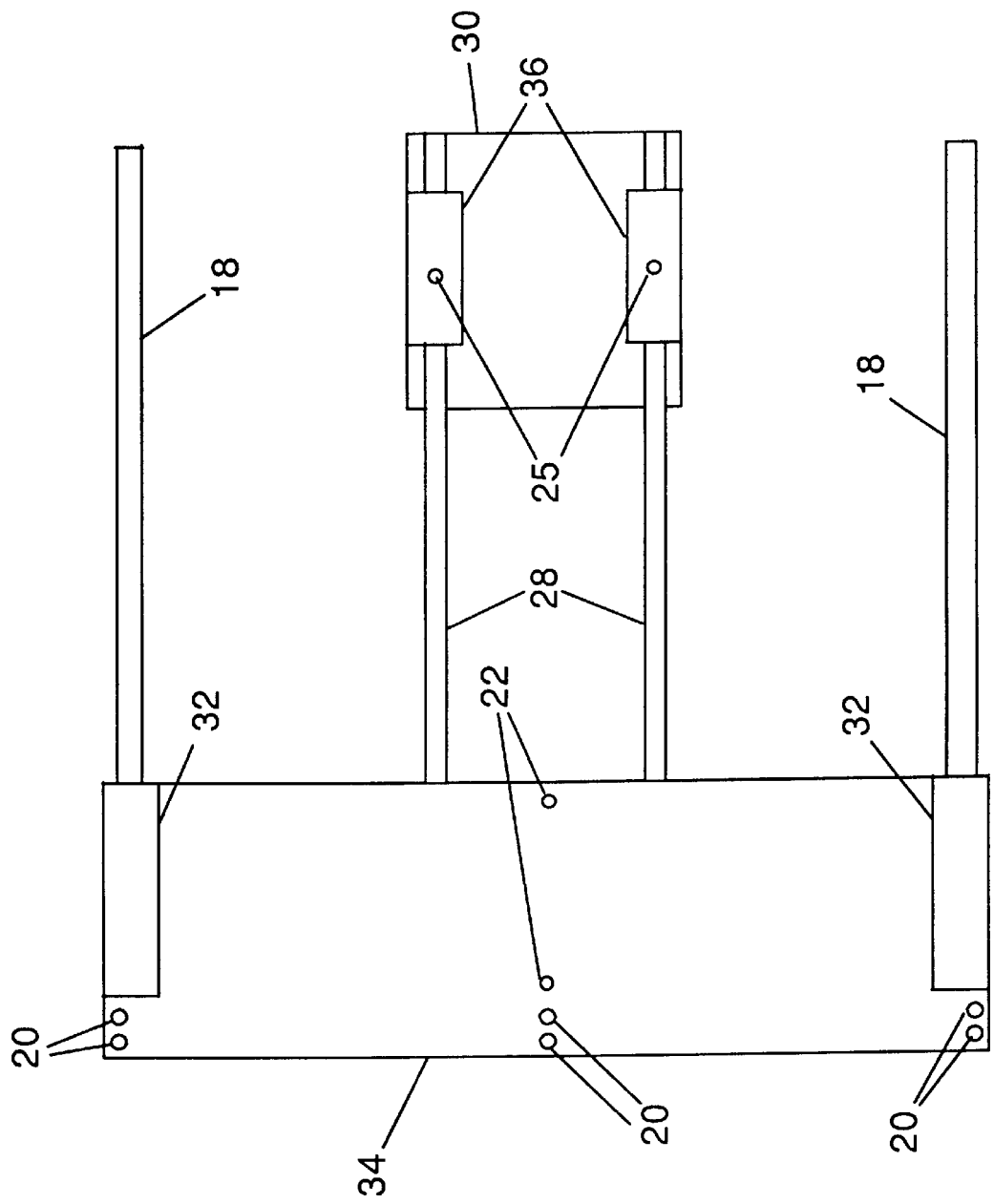
FIG. 3 is a bottom view of the RUSTIC Press.
Figure 4:
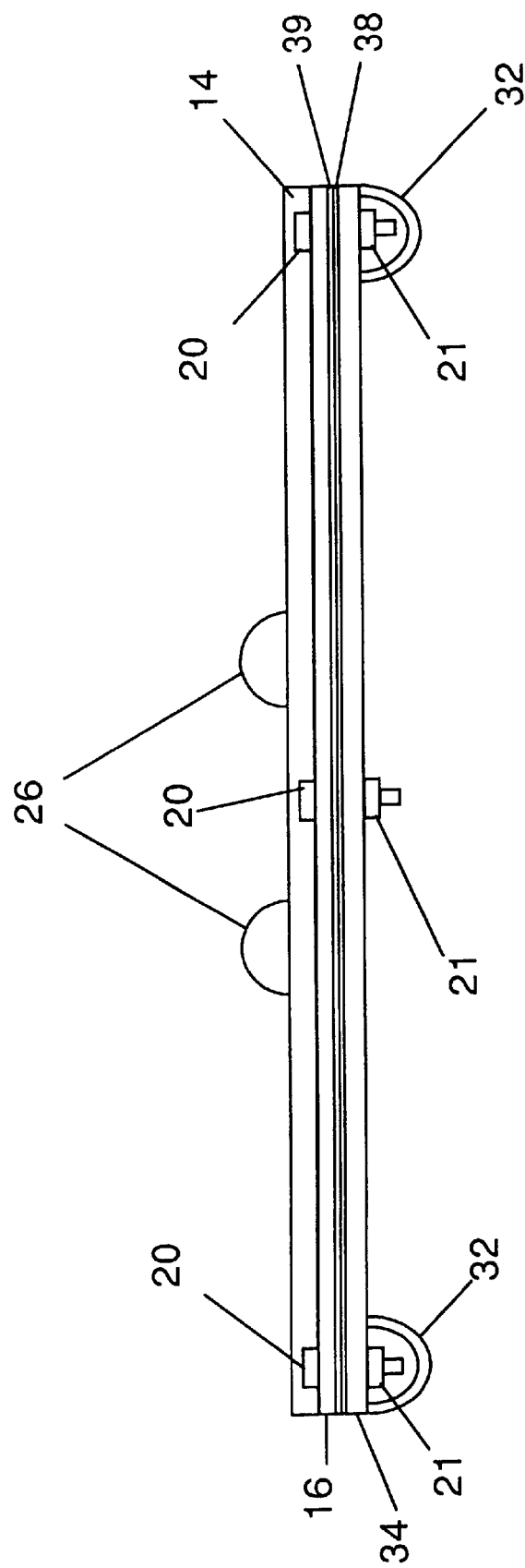
FIG. 4 is a front view of the RUSTIC Press without the two lower support pipes and without the two upper pipes which support the platform.

The RUSTIC Press apparatus for producing ultrathin flakes from seed which has been soaked for two or more days is generally shown in FIG. 1 as numeral (10). FIG. 1 is a perspective view of the RUSTIC Press in a partially opened state. The lower plate (34) of the RUSTIC Press rests upon two pipe sleeves (32) welded to the lower surface of the lower plate (34) at the two shorter ends thereof. To the upper surface of the lower plate (34) is attached a thin sheet of food-grade stainless steel (38). The stainless steel sheet (38) is attached to the lower plate (34) by 6 screws (22). Above the lower plate (34) and attached to it by 6 bolts (20) is a hinged upper plate consisting of three sections: a larger upper plate (16), a smaller upper plate (12), and a hinge (14) connecting the larger upper plate (16) to the smaller upper plate (12). Six bolts (20) connect the lower plate (34) to the smaller upper plate (12). Attached to the lower surface of the larger upper plate (16) is a thin sheet of food-grade stainless steel (39), held in place by six screws (22). Attached to the upper surface of the larger upper plate (16) are two pipe sleeves (26) parallel to the shorter edges of the larger upper plate (16), held to the larger upper plate (16) by two screws (24). Upper pipes (28) fit into each of the pipe sleeves and extend back away from the hinge (14) which connects the larger upper plate (16) to the smaller upper plate (12). Attached to the two furthermost sections of these upper pipes (28) is a small platform (30). The small platform (30) rests upon two pipe sleeves (36) into which the two upper pipes (28) pass. FIG. 3 which is a bottom view of the RUSTIC Press shows the two pipe sleeves (36) attached to the bottom of platform (30) and into which the two upper pipes (28) pass. Screws (25) extend through the platform (30) and pass into the two upper pipes (28) thus securing the platform (30) to the two upper pipes (28). Two lower support pipes (18) pass into the two pipe sleeves (32) attached to the lower surface of the lower plate (34).

FIG. 3 illustrates how the support pipes (18) enter the pipe sleeves (32) attached to the lower surface of the lower plate (34). The support pipes (18) keep the RUSTIC Press from tipping when downward pressure is exerted on platform (30). FIG. 3 also illustrates how platform (30) is supported by the two upper pipes (28) which enter the two pipe sleeves (36) which are attached to the lower surface of this platform (30).

Figure 5:
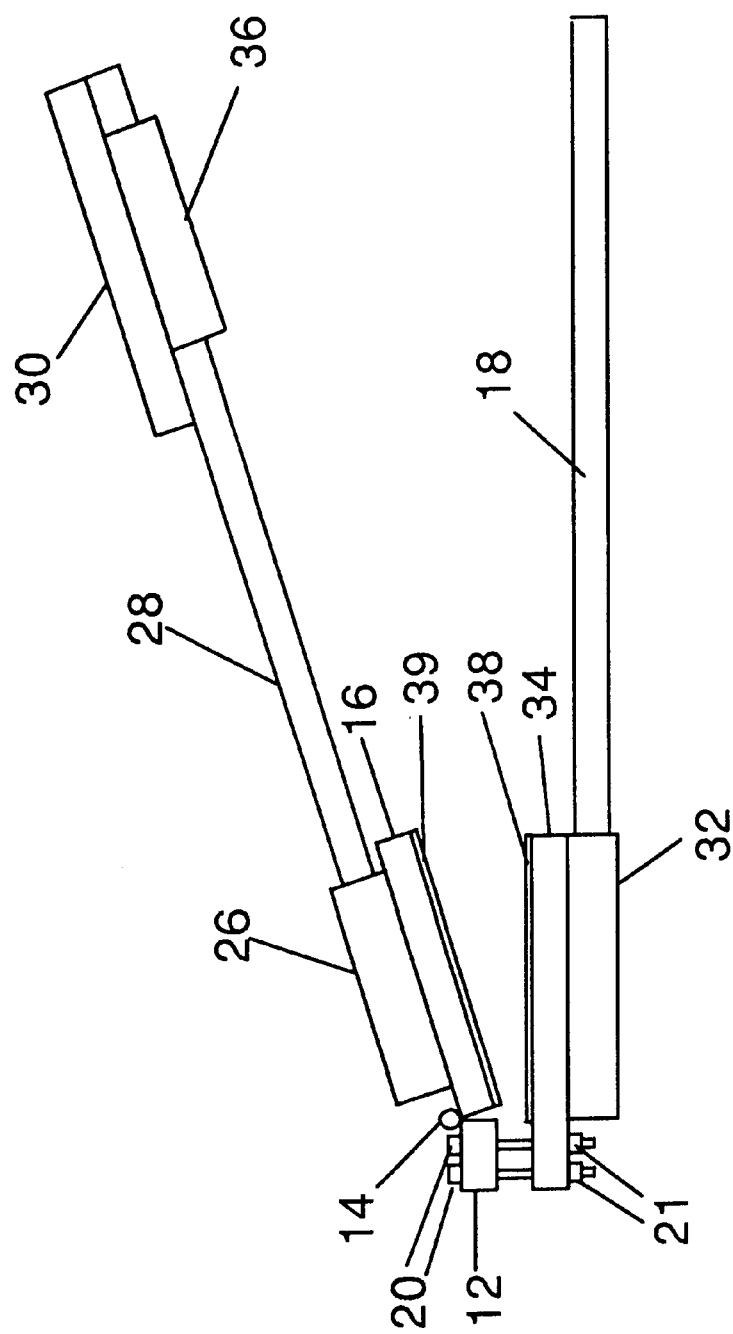
FIG. 5 is a side view of the RUSTIC Press in a partially opened state.

FIG. 5, a side view of the RUSTIC Press, shows how the nuts (21) attached to the bolts (20) can be adjusted to vary the distance between the stainless steel sheets (38 and 39) when the RUSTIC Press is fully closed. In this way the amount of compression of the seed which is placed on the lower stainless steel plate (38) can be controlled.

Use of the RUSTIC Press: The bolts (20) are adjusted so that the distance between the two stainless steel sheets (38 and 39) corresponds to the amount it is desired to compress seed placed on the lower stainless steel sheet (38). Upward pressure is exerted on the platform (30) attached to the two upper pipes (28) which enter the two pipe sleeves (26) attached to the larger upper plate (16). This causes the larger upper plate (16) to move away from the lower plate (34) thus exposing the two sheets of stainless steel (38 and 39) attached to these plates. The seed to be crushed is placed on the sheet of stainless steel (38) attached to the lower plate (34). Pressure is then exerted downward on the platform (30) thus causing the stainless steel sheet (39) attached to the larger upper plate (16) to contact and exert a downward pressure on the seed to be compressed. This downward pressure is continued for about a minute causing the seed to be nearly completely flattened. Upward pressure is then exerted on platform (30) causing the larger upper plate (16) to move away from the lower plate (34) thus exposing the compressed seed. The compressed seed is then scraped from the stainless steel plates (38 and 39) in preparation for the next batch of seed to be compressed.

5.0 DETAILED DESCRIPTION OF INVENTION

This section of the application describes the ingredients and the equipment used and their sources, the proper setup and use of the equipment, and the methods for producing NP CLASS Crackers and RUSTIC Sprouted Seed Products.

5.1 Description of Ingredients Used in Manufacture of Invention

| Ingredient | Source/Manufacturer |
| --- | --- |
| Hulled Organic Wheat Grain (Preferably Hard Winter Wheat) | Garden Spot Distributors, New Holland, PA |
| Hydrogen Peroxide 35% Solution Food Grade Quality (diluted to 3% strength before using) | Vital Health Products, Ltd.- Hales Corners, Wisconsin |
| Nickabood's Desert Gold Unheated, Unfiltered Sage Honey | Nickabood's Inc., 1401 Elwood Street, Los Angeles, CA |
| Apple and Grape Concentrates | Bernard Jensen Products, Solana Beach, CA 92075 |
| Hulled Chemical-free Sesame Seed | Garden Spot Distributors, New Holland, PA |
| Unhulled Organic Millet | Garden Spot Distributors |
| Organic Teff Seed | Maskal Forages, Inc., 1318 Willow, Caldwell, Idaho 83605 |

5.2 Description of Equipment Used in MANUFACTURE of Invention

| Equipment | Source/Manufacturer |
|---|---|
| Model FD 1000 Food Dehydrator | American Harvest Division of Alternative Pioneering Systems, 4064 Peavey Rd., Chaska, MN 55318 |
| 16" inside diameter 20 gal. stainless steel drum | Freund Can Co., Chicago, Ill. |
| Kitchen Mill ™ Electric Flour Mill | K-Tec, American Fork, Utah. (Kitchen Mill is a trademark of K-Tec Corporation) |
| Model #134 8" Stem Thermometer with range of 0° F. to 220° F. | Weiss Instruments Inc., West Babylon, N.Y. |
| Model MK-8020 Food Processor | Matsushita Appliance Co. Secaucus, N.J. |
| iSi$^R$ Soda Spritzer | iSi Siphon of America Inc., Pine Brook, NJ 07058 |
| Presto$^R$ Professional Salad-Shooter$^R$ electric slicer-shredder | National Presto Industries, Inc., Eau Claire, WI 54703 |
| Rolled Oats Crusher Roller Mill, Model 568 | Miracle Exclusives Inc. Locust Valley, N.Y. 11560 |
| Frost tree refrigerator Model No. RA186ACW0 | Westinghouse Electric Corp., Pittsburgh, PA 15222 |

The Model FD 1000 Food Dehydrator is a 4 tray dehydration unit (with optional additional trays) which has a circular base unit containing a motorized fan and a core filament heating element. The trays of material to be dehydrated are stacked on the circular base unit, the insulated cover is placed on the top tray, the desired temperature is selected via a rotary dial, and the power is turned on. The construction of the circular interlocking trays allows warm air currents to flow in a circular pattern from the bottom tray to the top tray thus providing fast even drying. Due to the design and strength of the fan motor, the circular trays can be stacked thirty high. For dehydrating liquids, a circular solid sheet (Alternative Pioneering Systems' registered trademark name is "Fruit Roll-Up Sheets") is placed in each tray before pouring in liquids. For dehydrating solids, a circular screen (registered trademark name is "Clean-A-Screens") is placed in each tray before putting the solids in the trays. Except for the fact that this particular model dehydrator seems to dry much faster than the other models I have used, the type of dehydrator used is probably not critical to the success of the methods used to make NP CLASS Crackers or RUSTIC Sprouted Seed Products.

The Rolled Oats Crusher roller mill is hand operated via a crank. As the crank is turned, the sprouts in the roller mill's hopper are drawn between the two cylindrical rolls below the hopper which flatten or crush the sprouts (depending on the moisture level of the sprouts which, in turn, depends on how long the sprouts were dried before being compressed). (Applicant has found that the rolls of the Rolled Oats Crusher roller mill are close enough together to compress hulled wheat sprouts to less than their MMT. Therefore, these compressed wheat sprouts have an MD of less than 1.) For those seeds with thick hulls, it is preferable that the sprouts be hulled before being rolled.

The Kitchen Mill™ Electric Flour Mill (U.S. Pat No. 4,203,555 to Dickson (1980)), however, contributes greatly to the success of my methods. The milling chamber's concentric spinning metal sections which burst the seeds into flour do not actually touch which results in a cooler milling operation than with most other flour mills. Furthermore, the ease with which an 8 inch stem thermometer may be mounted transversely in the flour mill's Lexan™ Flour Pan just below the point where the flour leaves the milling chamber, makes it easy to monitor the temperature of the sprouts as they are being ground. When the temperature gets too high, one need only turn off the mill and refrigerate it (or let it cool) until the temperature is once again safe for the vital nutrients in the sprouts. And since this mill does not use grinding stones, there is no possibility that stone grit will mix with the flour. A further advantage of this particular flour mill is that it is self cleaning.

The Model MK-8020 Food Processor which is used to liquefy the sprouts in the method for making Liquefied Sprouts Based NP CLASS Crackers, being a typical food processor, is not essential for the success of this method and almost any quality food processor can be used in its place.

The 16" inside diameter stainless steel open head drum is used for submerging the stacked trays used for sprouting. Please see §5.3.1 for the proper set-up of these stacked trays.

The iSi Soda Spritzer is used to carbonate water. NP CLASS Crackers are preferably made with carbonated distilled water. After filling the Soda Spritzer with distilled water, and carbonating the water, it is strongly recommended that the Soda Spritzer be refrigerated for at least two days before using. It takes about two days for the carbonated water to reach full strength.

The Presto® Professional SaladShooter® electric slicer-shredder is used to shred the firmer fruits and vegetables prior to dehydrating them. Used with the shredding cone, it can be used to shred such fruits as peeled apples, nectarines, peaches, and pears, and such vegetables as carrots, chili peppers, red and green peppers, and onions.

5.3 Setup of Equipment Used in Manufacture of Invention

5.3.1 Construction and Use of a Seed Sprouter to Sprout Seeds

Methods for sprouting seeds are known in the art and are not properly part of this invention. To assist one in a fuller understanding of my invention, however, I have included here a method for the preliminary step of sprouting the seeds.

The first step in sprouting seeds is to soak the selected seeds for between five and ten hours in either filtered or distilled water. (The optimal soak times for many seeds can be found on pages 72–73 of *The UNcook Book* by Elizabeth and Dr. Elton Baker (Communication Creativity, Saguache, Colo. (1980).) The temperature of the water in which the seeds are soaked must be below 45° C. (Higher temperatures would destroy the seeds' ability to sprout.) In general, this temperature is between 20° and 30° C. Next, the selected seeds are sprouted in an environment whose air temperature is between 15° and 30° C. (It should be noted that during the first few hours of any subsequent dehydration, the seeds sprouts still retain sufficient moisture to continue growing which brings about a further increase in enzymes, especially alpha amylase, and a further decrease in enzyme inhibitors.) If some seeds such as wheat, however, are sprouted for much longer than 24 hours, they begin to develop an objectionable sweet taste. Many seeds if they are sprouted for longer than about 24 hours, due to the lengthening of their roots and shoots, tend to become tangled which makes it difficult to feed them into the hopper of a flour mill after dehydration.

(1) Carefully inspect the seeds it is desired to sprout. Remove all extraneous matter such as pebbles, dirt, staples, shotgun pellets, bits of metal, and badly discolored or otherwise defective seeds.

(2) Wash the seeds in a solution containing ½ ounce of 3% strength food grade hydrogen peroxide per gallon of wash water. This washing will reduce the fungal population on the surface of the seeds.

(3) In a glass, stainless steel, or plastic container of suitable capacity which complies with FDA regulations, pour one pint of distilled water for every pound of seeds it is desired to sprout. Add 1/8 of an ounce of 3% strength food grade hydrogen peroxide for every pint of water. (The hydrogen peroxide acts to inhibit fungal growths on the sprouts as they are growing, and also leads to a more abundant crop of sprouts.)

(4) Stir the seeds into the solution of step 3.

(5) Allow the seeds to soak in this solution for the optimal soak time for the type of seeds selected. (The optimal soak times for many seeds can be found on pages 72–73 of *The UNcook Book* by Elizabeth and Dr. Elton Baker (Communication Creativity, Saguache, Colo. (1980)). For example, after ten hours of soaking, wheat grain will have absorbed just about as much liquid as it is capable of absorbing.

(6) Place a large strainer over the mouth of the container used for soaking the seeds, and, holding the strainer tightly against the mouth of the container, tip the container and drain all the solution from the container. The container now contains just the soaked seeds. Rinse the soaked seeds by filling the container with fresh filtered or distilled water and draining again. Record the time at which you complete this step. Step 8 should be performed six hours after step 6.

(7) The circular trays plus insulated cover of the Model FD-1000 Food Dehydrator can be used to construct an excellent seed sprouter as shown in the following steps. Please note, however, that the circular screens of step (b) are only suitable for seeds larger than the hole openings of the screens. For sprouting smaller seeds, suitable screen material may be obtained from Alfa III Corporation, Chaska, Minn. (The seed sprouter as set up will have about one tray for each pound of soaked seeds.)

(a) Pour two cups of water into an 18½ inch diameter stainless steel basin. The two cups of water provide the proper humidity for the growing sprouts.

(b) Place a circular screen in a circular food dehydrator tray of the Model FD-1000 Food Dehydrator. You will notice that the screen has two semi-circular cutouts on opposite edges of the screen to enable one to more easily lift the screen out of the tray. When seeds are spread on the screen, some of the seeds close to these cutouts may fall through. To remedy this situation, place a second screen in the tray so as to cover the cutouts of the first screen, thus preventing the seeds from falling through.

(c) Place the dehydrator tray containing the two screens on a large pizza platter.

(d) Spread 2 pints of the soaked seeds evenly over the surface of the upper circular screen in the dehydrator tray.

(e) Carefully lift the dehydrator tray off of the pizza platter and place it in the stainless steel basin.

(f) Repeat steps b through e, placing each newly prepared dehydrator tray on top of the last dehydrator tray which was placed in the stainless steel basin (thus forming a stack of dehydrator trays in the basin), until all of the soaked seeds have been placed in dehydrator trays.

(g) Place an empty dehydrator tray on top of the last dehydrator tray placed on the stack of dehydrator trays. Put several wet napkins in this tray to provide extra humidity for the growing sprouts in the trays below.

(h) There is now a stack of dehydrator trays in the stainless steel basin. Place the insulated dehydrator cover on the top dehydrator tray to provide the sprouts a humid environment in which to grow. The hole in the insulated cover provides sufficient fresh air for the growing sprouts. Due to the much poorer aeration of the sprouts in the lower trays, it is recommended that not more than about ten trays be stacked in this way.)

(8) Six hours after performing step 6, fill a large stainless steel drum with enough water to cover the top tray of the seed sprouter set up in step 7 when it is submerged in the stainless steel drum. It is very important that this water be either distilled or filtered water; the chemicals added to municipal water may retard the growth of the sprouts.

(9) Add one ounce of 3% strength food grade hydrogen peroxide for each gallon of water in the drum. (Not all of the seeds will sprout, and the seeds that do not sprout have a tendency to mold. The food grade hydrogen peroxide inhibits these seeds from molding.)

(10) Remove the insulated dehydrator cover. Using a good quality butchers twine, tightly tie together the stack of trays from top to bottom such that it will hold together when you immerse this stack of trays in the water in the drum.

(11) Using the portion of the butchers twine stretched across the top tray as a handle, slowly lower the stack of trays minus the insulated cover into the stainless steel drum until the top tray of the stack of trays is submerged. Wait 10 seconds while the sprouts soak.

(12) Slowly raise the stack of trays from the drum of water, tip the stack of trays to facilitate drainage, allow to drain for 10 seconds or so, and place the stack of trays back in the stainless steel pan. Replace the insulated cover.

(13) Every six hours until one hour before the time selected at which to stop sprouting, remove the dehydrator cover, and repeat steps 11 and 12. (If, however, it is desired to sprout the seeds for longer than 24 hours, the water in the drum should be replaced with fresh water and one ounce of 3% strength food grade hydrogen peroxide added per gallon of water.)

(14) One hour before the time selected at which to stop sprouting, again remove the dehydrator cover, and repeat steps 11 and 12.

(15) One hour after step 14, the seeds have now sprouted for the desired length of time. Remove the twine holding the stack of trays together, and refrigerate the sprouts until they are ready to be used. (It should be noted, however, that the sprouts will continue to grow, albeit slowly, in the refrigerator.)

5.3.2 Mounting the Thermometer in the Lexan™ Flour Pan of the Kitchen Mill Flour Mill (1) The Flour Pan is 10" long, 8¼" wide and 5¼" deep. Using a 9/64" drill bit, drill a hole in one of the longer side walls of the flour pan, which hole is 5/8" below the rim of the flour pan and 4" along the length of the flour pan.

(2) Drill a corresponding hole in the opposite side wall of the flour pan such that the 8" stem of the thermometer may be inserted through one of these holes, pushed across the opening of the pan, and through the hole on the opposite side of the pan.

(3) Now push the stem of the thermometer through the first of the two holes and continue pushing it until the tip of the stem passes through the second of the two holes.

(4) Attach the assembled cyclo cup to the bottom of the mill as explained in The Kitchen Mill Owner's Manual and Use Guide.

(5) Mount the mill on the flour pan such that the stem of the thermometer nearly touches the assembled cyclo cup.

(6) As the dried sprouts are milled, the sprout flour will fall on the long stem of the thermometer, and the circular dial of the thermometer just outside the wall of the pan will record the temperature of the sprout flour.

5.3.3 Method of Manufacture of Despoked Trays and Screen-Forms

The circular dehydrator trays of the Harvest Maid Model FD 1000 Food Dehydrator are about 15¼ inches in diameter. Starting from the circular outer wall of a dehydrator tray and heading toward the circular hole at the center of a dehydrator tray, one successively comes upon the thicker outer wall just mentioned, a thinner circular inner wall, thin plastic spokes pointing toward the center of the tray, and a finned wall surrounding the hole in the very center of the dehydrator tray. The outer wall of the tray is about five-sixteenths of an inch thick in the horizontal direction, and about 1 inch high in the vertical direction. The thickness of the inner wall is about ⅟₁₆th of an inch in the horizontal direction. Leading from the inner wall of the tray to the 2⅛ inch diameter finned central hole of the tray are numerous thin plastic spokes which provide the support for the sheet or screen to be placed in the dehydrator tray. These trays are stacked one above the other on the dehydrator base unit. Due to the height of the outer wall of the tray and the thickness of the spokes leading to the central hole of the tray, batter can be put in each tray to a depth of no more than about three-fourths of an inch. To allow for the much thicker batter depths that the methods of this invention allow, it is necessary to remove the entire spoked area of several of the trays by cutting the spokes at the point where the spokes meet the inside surface of the inner wall of the tray. Then after placing batter on a screen to a much greater depth than heretofore possible, this screen with its batter can be placed in one of the original trays which still retains its spoked area, and this tray placed on the dehydrator base unit. Then several trays with their spokes removed can be stacked on top of this tray (thus providing head room for the much higher batter), and an empty dehydrator tray placed on top (for additional ventilation).

(1) Using a knife or a saw, remove the entire spoked area from one of the dehydrator trays. This tray, hereinafter called the despoked tray, will be used in each of the methods for making NP CLASS Crackers.
(2) On a sheet of black paper, draw two concentric circles, the outer circle with a diameter equal to the diameter of a circular dehydrator screen minus ¾ inch and the inner circle with a diameter equal to the diameter of the hole at the center of the screen plus ¾ inch. Cut along the circumference of each of the two circles thus producing a doughnut-shaped form, hereinafter called the screen-form, with the same shape as, but somewhat smaller in size than, a dehydrator screen.

5.4 Operation of Equipment Used in Manufacture of Invention

5.4.1 Operation of the Kitchen Mill

The method for using the Kitchen Mill Flour Mill for milling sprouts is as follows:
(1) Refrigerate the flour mill until its mounted thermometer reads less than 50° F.
(2) Measure out the required amount of dried sprouts.
(3) Select the Kitchen Mill's "Fine Flour Texture Setting" by turning the arrow on the rotary dial to the smallest dot, and turn on the Kitchen Mill.
(4) Place 1 cup of dried sprouts in the hopper of the mill. The dried sprouts will be milled to flour and fall onto the long stem of the thermometer mounted transverse the flour mill pan. Whenever the thermometer records a temperature greater than 104° F., refrigerate the mill until the temperature has dropped below 70° F. and continue milling the flour. Continue in this way until all the sprouts are milled.

5.4.2 Operation of the Presto® Professional Salad-Shooter® electric slicer-shredder The general method for using the Presto® Professional SaladShooter® electric slicer-shredder to slice firmer fruits and vegetables is as follows:
(1) Cut up the fruit or vegetable into pieces sufficiently small to fit into the food chamber.
(2) Assemble the slicer-shredder with the Shredding Cone.
(3) Place the fruit or vegetable pieces into the food chamber and turn the slicer-shredder on.

Please see the instruction booklet for further details. §5.5 describes the preferred method of making NP CLASS Crackers, and §5.6 describes the preferred method of making RUSTIC Sprouted Grain products.

5.5 Description of Preferred Method to Manufacture NP Class Crackers

5.5.1 Introduction

A brief word on how I happened to invent my new NP CLASS. Crackers is in order. I had been sprouting various plant seeds for about 18 years. One of the seeds I had particular success with was the wheat berry, and I became quite proficient in making raw sour sprout crackers from sprouted wheat berries. To aid me in making larger quantities of sour sprout crackers, I ordered a food dehydrator and a food processor by mail order.

After many months of waiting for the food processor, I was sent a grain mill by mistake. I was deeply disappointed for I knew that I could not feed wet sprouts into a grain mill. As I was preparing to return the grain mill, I began to wonder if there was any way to use it to make sour sprout crackers. After a day or so, the idea occurred to me that if I dehydrated the sprouts after sprouting the grain, it just might be possible to use the grain mill to make flour from the dried sprouts. I could then stir the sprout flour into some water, knead the resultant dough, form it into a loaf, and dehydrate the loaf in my dehydrator. When I mixed the sprout flour into the water, it would not settle out so I could make a loaf from it. When I poured the watery slurry onto dehydrator solid sheets in dehydrator trays and dehydrated the slurry, it dried to a thin firm chewy "pancake". But, of course, it still had the same sour taste as before. Because of the sour taste, I began putting honey on the sprout crackers before eating them.

Then I remembered reading somewhere that honey would ferment. So I decided to mix honey with the sprout slurry before dehydrating it so that I would obtain the hoped for health benefits of eating fermented honey as well as fermented wheat. (Fermenting foods increases their content of some of vitamins in the vitamin B complex.) After dehydrating this mixture of sprout slurry and honey, I was surprised to discover that not only did the honey not ferment, but the honey kept the wheat sprout slurry from fermenting as well. When several of my friends told me that they liked the taste of this new product, I realized that it had commercial possibilities.

More recently I began to make unsweetened sprouted seed crackers for my friends who prefer products prepared without added sweeteners. Then I made the discovery that when whole hulled and preferably presoaked sesame seeds are added in suitable proportions to the product batter, not only did the crackers not taste as sour as usual but they also developed a very pleasant cheesy taste. Without wishing to be bound by theory, Applicant believes that the whole hulled sesame seeds added to the batter absorb some of the water in the batter thus making less of this water available for microbial growth, and thus limiting the amount of bacterial souring which takes place.

While I was preparing the now abandoned Continuation in Part Patent application, U.S. application Ser. No. 07/806,580, filed Dec. 12, 1991, I determined that I would conceive a completely unobvious improvement to NP CLASS Crackers which would greatly enhance my chances of being granted a patent. My most grievous problem in product preparation is that the more batter I place on a dehydrator drying sheet, the longer it takes to dehydrate, and the further along bacterial souring proceeds. There is a moisture gradient from the dehydrator drying sheet (wet) to the drying surface of the batter (dry). And the deeper the batter, the longer the bottom of the batter is wet which not only gives lactic acid bacteria a field day but also vastly increases the possibility of fungal growths. But if only a very thin batter is spread on each of the drying sheets, output is small, and expenses are high.

While really wrestling with this problem, the thought occurred to me: "Why don't I try slicing the batter every 30 minutes into very tiny squares in order to increase the drying surface." Now I know that if I try to slice the batter too early, it will just flow back into the slice marks with no effect. But if I reslice the batter each and every half hour, the batter will gradually get harder and harder and the slice marks will tend more and more to remain. And the more tiny squares I slice the batter into, the greater will be the amount of batter exposed to air, and the faster will dehydration proceed even if the batter is very thick. If I slice the batter after this manner, drying air can get all the way to the drying sheet at least at the slice marks and no part of the batter will be very far from a drying surface. Immediately I decided to try this idea and see what would happen. I made up a batter consisting of 12 ounces of milled wheat sprouts, 12 ounces of whole hulled sesame seeds, and 20 ounces of distilled water, and poured all 44 ounces of this batter onto one dehydrator sheet, more by far than I had ever before poured onto a dehydrator sheet. Prior to this, I never would have dared to pour this much batter onto a single sheet; it would have taken nearly a week to dry and would have started molding a long time before it dried. Fermentative bacteria would have had a field day, and it would taste so sour and bitter that not even I would want to eat any of it. After pouring all the batter onto a single dehydrator sheet, it completely filled the sheet and even began to overflow a little. Only because the batter is quite thick could significant overflow be avoided. An hour later, I sliced the batter into half inch squares, and batter from below the surface oozed through the slice marks onto the surface of the batter. All that day, I resliced the batter every 30 minutes or so, retracing the slice marks I had made 30 minutes earlier. After ten hours, the batter, although a bit broken up, was about 75% dry, and 28 hours after I poured the batter onto the dehydrator sheet, it was completely dry. Never in all my cracker making days have I ever seen so much batter dry so quickly. With great anticipation, I measured the pH value of a slurry consisting of 2 ounces of milled product and 4 ounces of neutral pH water. The pH value of this slurry was 5.01! And the product, which I immediately dubbed "Sprout Nuggets", was simply delicious. I was ecstatic! I just know that what I have discovered can be used to make large quantities of a very economical raw sprout product which will be welcomed with open arms by the raw vegetarian health food industry.

More recently I discovered that if after the batter is prepared, a sufficient amount of sesame seeds are stirred into the batter, and the batter is allowed to sit for a while, the sesame seeds absorb a considerable amount of water from the batter, thus sufficiently thickening the batter that it can now be spread upon dehydrator screens rather than dehydrator sheets. Since the micro-organisms are thus initially deprived of much of the moisture which they need to grow, bacterial souring proceeds very slowly. Further since drying air now has access to both the upper and under sides of the batter simultaneously, the batter dries very quickly thus further depriving micro-organisms of the moisture they need to grow. Consequently bacterial souring is greatly limited, and, in those varieties prepared with a substance to depress the water activity of the cracker batter, virtually nonexistent.

Very recently, I was wrestling with the problem of how my crackers could possibly be made if sesame seed suddenly became unavailable. I knew from previous attempts to make a very stiff batter that if, for example, I stirred dehydrated vegetable powder into the cracker batter until the batter became very thick, the vegetable powder would so quickly absorb water from the batter as it was being stirred into it, that not enough vegetable powder could be stirred in to make the cracker batter. sufficiently thick that it could be spread upon dehydrator screens without major leakage through the screen openings. Suddenly it dawned upon me that if small pieces of dehydrated vegetables (rather than vegetable powder) were stirred into the cracker batter, these pieces would absorb water very slowly from the cracker batter, and therefore a great quantity of them could be stirred into the cracker batter before the cracker batter started becoming stiff. Then the batter could be let to set until the dehydrated vegetable pieces had absorbed sufficient water from the batter that the batter could now be easily spread on dehydrator screens with little if any leakage through the screen openings. This indeed proved to be the case, and a sprouted wheat and carrot cracker was produced with no sour taste whatsoever! The dehydrated carrot pieces apparently grabbed so much water from the cracker batter that all the souring bacteria must have quickly died of thirst. So the mechanism is this: The batter is prepared; A large quantity of dehydrated vegetable pieces are stirred in; The dehydrated vegetable pieces quickly grab so much water from the cracker batter that souring never really has a chance to get started; Then upon dehydration, the vegetable pieces give up the water they have absorbed, and the rest of the cracker batter gives up its remaining moisture.

Without wishing to be bound by theory, Applicant believes that the reason the carrot pieces in the batter do not sour appreciably is that being pieces rather than powder, the ratio of surface area to volume is relatively small (as compared to what this ratio would be if the dehydrated carrots had been ground to a powder). It is believed that the bacteria only attack the surfaces of the carrot pieces and not their interiors. On the other hand since the sprouts in the batter are thoroughly ground, tremendous surface area is exposed to the bacteria, and if the bacteria are not quickly deprived of moisture, souring will be extensive.

Recently, I had been considering how I might vary the ingredients or method of making NP CLASS Crackers so as to make a cracker which was moister and not quite so dry as the NP CLASS Crackers I hitherto had been making. I considered adding emulsified oil but did not like either the greater difficulty of cleaning my equipment or giving up one of my main selling points: "no added oil". While on a visit to a local restaurant supply store to purchase equipment, I noticed that they had a few food items for sale. One of the items they had was Table Joy™ Martini Olives. While contemplating the olives, I wondered if I could add olives to NP CLASS cracker batter. When I got home, I began experimenting with the olives. I dehydrated 4 ounces of shredded olives. The end result was 0.9 ounces of dried olive shreds. Therefore olives are about 80% water and are therefore ideal in this respect for my cracker invention. Further the dehydrated olive shreds were not hard and brittle (like every other vegetable I tried) but on the contrary were moist and somewhat soft (due to olives being 15% or more oil by weight. I prepared NP CLASS Cracker batter in the usual way. I added these dried shredded olives to the cracker batter, dehydrated the crackers, and one taste told me I had a winner: NP CLASS Crackers which were much moister than any previous batch of NP CLASS Crackers. The main complaint of consumers of NP CLASS Crackers that they are too dry has now been eliminated.

There are two species of NP CLASS Crackers, and each of these species can exist in both a sweet (i.e. minimally soured) and a cheesy (i.e. soured just enough to have a somewhat cheesy taste) variety. Following are the methods for making the various varieties of these two species:

(1) Sprout Flour Based NP CLASS Crackers: Sweet and Cheesy Varieties (2) Liquefied Sprouts Based NP CLASS Crackers: Sweet and Cheesy Varieties.

5.5.2 Overview of the Preferred Method for Making the Preferred Species, Sprout Flour Based NP CLASS Crackers 5.5.2.1 Sprouting the Seeds:

First the seeds to be sprouted are selected. For the purposes of this invention, seeds can be divided into three classes: High Gluten Grains (Wheat, Spelt, Kamut, Triticale), Moderate Gluten Grains (Barley, Rye, Oats, Buckwheat), and Low or No Gluten Seeds (Millet, Teff, Sunflower, Rice, Quinoa, etc.). Due to the exceptional hardness of raw crackers made exclusively from high gluten sprouted grains, it is strongly recommended that the high-gluten grains constitute no more than about 50% of the sprouted seeds used in the Cheesy Variety of Sprout Flour Based NP CLASS Crackers and no more than about 10% of the sprouted seeds used in Sprout Flour Based NP CLASS Crackers which are prepared with a syrupy type of water activity depressant (which contributes its own agglutinating properties).

Note: Throughout the rest of this specification the term "hulled seeds" (or sprouts) refers to seeds which have had their hulls removed. The term "thin-hulled seeds" (or sprouts) refers to seeds with very thin (and, thus, easily masticated) hulls. And the term "thick-hulled seeds" refers to seeds with thick (and, thus, difficult to masticate) hulls.

With the exception of such thin-hulled seeds as millet and teff, it is best to use hulled seeds for sprouting. It should be noted, however, that many seeds will no longer sprout once their hulls have been removed. Apparently the seeds are sufficiently damaged by hull removal that they will no longer sprout. If unhulled seeds are sprouted, they can not be used to make Liquefied Sprouts Based NP CLASS Crackers—the resultant crackers will be too fibrous (due to the woody hulls of the seeds) for use as a food for humans. The unhulled sprouts must first be dehydrated and then either hulled before milling, or, if unhulled, they must be milled two or more times before they are suitable for inclusion in the cracker batter. The second and succeeding millings, however, are much more time consuming (due to heat buildup and resultant time spent waiting for the mill to cool sufficiently to continue) than the first milling and, therefore, have an adverse impact upon time and cost of production. Needless to say, it is preferred to use hulled or thin-hulled seeds for sprouting. Applicant has successfully used the following seed sprouts in his NP CLASS Crackers:

Hulled seed sprouts: wheat, spelt, rice, sunflower.

Unhulled seed sprouts: millet, teff, oats, sunflower, quinoa, buckwheat, and barley.

The first step in sprouting the seeds is to soak the selected seeds for 5–10 hours (the optimal soak times for many seeds can be found on pages 72–73 of *The UNcook Book* by Elizabeth and Dr. Elton Baker (Communication Creativity, Saguache, Colo. (1980)). Next, the selected seeds are sprouted for at least 18 hours. It takes at least 18 hours of sprouting to deactivate the majority of enzyme inhibitors in the seeds. (It should be noted that during the first few hours of any subsequent dehydration, the sprouts still retain sufficient moisture to continue growing which further inactivates enzyme inhibitors.) If some seeds such as wheat, for example, are sprouted for much longer than about 24 hours, they begin to develop an objectionable sweet taste. Many seeds if they are sprouted for longer than about 24 hours, due to the lengthening of their roots and shoots, tend to become tangled which makes it difficult to feed them into the hopper of a flour mill after they have been dehydrated.

5.5.2.2. Preparing the Cracker Batter:

a. Dehydrating the Sprouts:

After the seeds have sprouted for the desired length of time, they are dehydrated until their water activity is less than 0.60. Now they should be refrigerated until they are ready to be used to make Sprout Flour Based NP CLASS Crackers. Under refrigeration, these dehydrated sprouts should keep well for a year or more with no noticeable deterioration.

b. Milling the Sprouts to Flour:

When milling hulled dehydrated sprouts and certain thin-hulled dehydrated sprouts like millet and teff, the mill should be set at its "Fine Flour Texture Setting" (the dial position indicated by the smallest dot) and the sprouts need only be milled once. For thick-hulled sprouts like sunflower and oats, it is advantageous to mix the thick-hulled sprouts with hulled or thin-hulled sprouts prior to milling them in order to reduce heat buildup while milling. The temperature of the flour should be carefully monitored while milling and, if the temperature should climb past 118° F., the mill should be allowed to cool before continuing in order to assure that the delicate enzymes in the sprouts are not damaged. The mixture of thick hulled sprouts and hulled or thin-hulled sprouts is now milled with the mill set at its "Coarse Flour Texture Setting" (the dial position indicated by the largest dot) and generally needs to be milled again with the mill set at its "Fine Flour Texture Setting" before the resultant flour is fine enough to be used to make cracker batter.

NOTE: If the dehydrated sprouts being milled do not include any high gluten grains, and the Cheesy Variety of Sprout Flour Based NP CLASS Crackers is going to be made, it will be necessary to add additional agglutinant to the product batter, or the resultant crackers will not hold together. For example, the Cheesy Variety of Sprout Flour Based NP CLASS Crackers where millet sprouts and sesame seeds are the only ingredients will not hold together; either gluten or a gluten containing grain must be added in sufficient amount to agglutinate the batter or the resultant crackers will not hold together.

c. Mixing the Batter Ingredients

The very first step is to ensure that the relative humidity of the atmosphere in the Preparation Room is less than 45% since it is desired to reduce the water activity of the cracker batter below 0.45. If the relative humidity at any time is allowed to climb above 70%, fungal growths and mold are encouraged which will result in an unacceptable product. While dehydration of the cracker batter is in progress, it is desirable that the temperature of the atmosphere about the drying batter be maintained in the range 90–104° F. A warm dry atmosphere about the drying batter is most conducive to rapid dehydration and minimal chances of microbial growth.

If it is desired to make the Cheesy Variety of Sprout Flour Based NP CLASS Crackers, a batter is prepared from milled sprout flour and carbonated distilled water. (Carbonated distilled water is prepared by subjecting distilled water to carbonation.) The preferred ratio by weight of carbonated distilled water to milled sprout flour to use depends upon the percentage of the milled sprout flour which is high gluten containing grains (such as wheat, triticale, and spelt). The greater the percentage of high-gluten containing grains in the milled sprout flour, the larger the amount of water which needs be added to make an easy to stir slurry. The following table presents the recommended Ratio of Carbonated Distilled Water to Sprout Flour for various percentages by weight of gluten-containing grains in the sprout flour:

| Percentage by Weight High-Gluten Containing Grains in the Sprout Flour | Preferred Ratio of Carbonated Distilled Water to Sprout Flour |
| --- | --- |
| 100% | 1.125 to 1.0 |
| 75% | 1.0625 to 1.0 |
| 50% | 1.000 to 1.0 |

If these ratios are adhered to, the resultant batter will be fairly easy to stir, and the ingredients can be thoroughly mixed with no more than a moderate expenditure of energy.

Now pieces of absorbent vegetal matter are stirred into the batter. If soft seeds are being used, an amount of soft seeds equal to the weight of the sprout flour is stirred into the batter. If dehydrated fruit or vegetable pieces are being used, a lesser amount should be used, inasmuch as dehydrated fruit and vegetable pieces are much more absorbent than soft seeds. Enough pieces of absorbent vegetal matter should be stirred into the batter to thicken it sufficiently so that it can now be spread upon dehydrator screens without excessive leakage through the screen apertures.

If, on the other hand, it is desired to incorporate a water activity depressant in the batter in order to suppress bacterial souring during dehydration, add a sufficient amount of water activity depressant to the carbonated water to lower its water activity below 0.91 (below 0.75 if salt is the water activity depressant). Applicant has successfully used the following water activity depressants in his NP CLASS Crackers: honey, fruit concentrates, barley malt syrup, fructose, and salt. Syrupy type water activity depressants contribute an extra amount of liquid which means either that less carbonated water need be used or more sprout flour can be stirred into the mixture of carbonated water and the water activity depressant. It has been found that the use of a water activity depressant greatly inhibits the ability of the pieces of absorbent vegetal matter to absorb water from the cracker batter. It is therefore necessary either to use considerably less water in the cracker batter or to add a considerably higher proportion of absorbent vegetal matter to the cracker batter in order to thicken the batter sufficiently that it can now be spread on dehydrator screens without excessive leakage through the screen openings. (For example, it has been found that when honey is used as the water activity depressant, the following proportions of ingredients results in a successful product:

| | |
| --- | --- |
| Milled sprout flour: | 1.0 part |
| Honey: | 0.575 parts |
| Carbonated distilled water: | 0.575 parts |

Into a mixture of these ingredients, 1 part of soft seeds or a lesser amount of either dehydrated fruit or vegetable pieces is stirred.)

Therefore, whether the batter has been prepared with or without a water activity depressant, the pH of the batter before dehydration ($pH_o$) should be measured for the later computation of $\delta pH_{LA}$ for the resultant product.

Where the batter has been prepared without a water activity depressant, let us assume that the batter was prepared from C parts carbonated water, F parts milled sprout flour, and S parts absorbent vegetal matter. An ounce of batter will then consist of C/(C+F+S) ounces of carbonated water, F/(C+F+S) ounces of milled flour, and S/(C+F+S) ounces of absorbent vegetal matter. The batter, therefore, can be considered as consisting of (F+S)/(C+F+S) ounces of solids and C/(C+F+S) ounces of water. In order to make a 2:1 slurry from an ounce of this batter, it will be necessary to mix the one ounce of batter with (2−(3C/(C+F+S))) ounces of distilled water. Then the pH of this 2:1 slurry is called $pH_o$.

Where a batter with a water activity depressant has been prepared, let us assume that the batter additionally consists of D parts of the water activity depressant. And let us assume that the D parts of water activity depressant is W percent water and (100−W) percent solids. The water activity depressant is therefore contributing an additional D*W/100 parts water and D*(100−W)/100 parts solids. The batter, therefore, can be considered as consisting of (F+S+D*(100−W)/100)/(C+F+S+D) parts solids and (C+(D*W/100))/(C+F+S+D) parts water. In order to make a 2:1 slurry from an ounce of this batter, it will be necessary to mix the one ounce of batter with (2−3*(C+(D*W/100)))/(C+F+S+D) ounces of distilled water. Then the pH of this 2:1 slurry is called $pH_o$.

5.5.2.3. Dehydrating the Cracker Batter

After stirring the pieces of absorbent vegetal matter into the cracker batter, it is now advantageous to spread the cracker batter on a flat surface and allow it to set in order to give the pieces of absorbent vegetal matter enough time to absorb sufficient liquid from the cracker batter, that the cracker batter will be thick enough to be successfully placed on dehydrator screens without significant leakage through the screen openings.

It is advantageous to heat and maintain the batter on the flat surface at a temperature of 104° F. The setting time need not exceed about 60 minutes, for by that time the pieces of absorbent vegetal matter in the batter will have absorbed most of the liquid they would eventually absorb. For example, the following table shows the amount of water which one pound of various kinds of soft seeds will absorb as a function of time: (As can be seen, the kinds of soft seeds are sesame and poppy. If sliced oats or sunflower seeds are used, nearly twice as much is required to have the same effect.)

Ounces of Water Absorbed by One Pound of Soft Seeds as a Function of Time:

| Elapsed Time | Sesame Seed | Poppy Seed | Sliced Oats | Sunflower |
| --- | --- | --- | --- | --- |
| 0 | 0 | 0 | 0 | 0 |
| 30 | 4.2 | 2.6 | 1.5 | 1.1 |
| 45 | 4.8 | 4.0 | 2.1 | 1.5 |
| 60 | 5.4 | 5.4 | 2.5 | 2.1 |
| 90 | 5.8 | 5.4 | 3.2 | 3.1 |
| 120 | 6.0 | 6.6 | | |
| 150 | 6.0 | 7.0 | | |
| 180 | 6.2 | 7.8 | | |

After setting for the required length of time, the cracker batter is sliced into convenient sized slices. Circular dehydrator screens are now placed in dehydrator trays and the slices of batter are carefully lifted and placed on the dehydrator screens. The trays are then placed on the dehydrator base unit, the insulated cover is placed on the top tray, the dehydrator temperature dial is set to 104° F., and the dehydrator power switch is turned on. In order to minimize dehydration time:
1) the relative humidity of the area in which the batter is being dehydrated should be below 45% and as much lower than that as is feasible, and
2) the velocity of air flow over both the upper and lower drying surfaces should be as high as is feasible. It should be noted that if a high enough air velocity over the drying surfaces is maintained, a dehydration temperature of room temperature will be sufficient to obtain a greatly reduced dehydration time. Further, if a high enough air velocity over the drying surfaces is maintained, it can be found advantageous to lower the temperature of the drying area to about 33° F., this low a temperature serving to greatly impede fermentative souring of the batter.

Thirty minutes later, the cracker batter in each tray is sliced into squares, a half inch or less in width and length. Every 30 minutes thereafter for the next three hours, the batter in each tray is resliced along the original slice marks. The water activity of the drying batter should be carefully monitored. When the water activity of the drying batter has been reduced below 0.60 and preferably below 0.45, the dehydration process is complete, and the resultant crackers can be removed from their dehydrator screens and refrigerated.

For those products prepared with a syrupy type of water activity depressant, it is advantageous to refrigerate the dehydrator trays for a half hour before attempting to remove the screens from the dried crackers in order to give the water activity depressant syrup in the crackers a chance to congeal. This has been found to greatly facilitate the removal of the dehydrator screens from the dried cracker batter.

After the batter has been dehydrated to a water activity of 0.45, a 2:1 slurry is prepared from two ounces of distilled water and one ounce of the dried batter, and the pH of the 2:1 slurry is measured. This pH value is denoted $pH_f$. Then $\delta pH_{LA}$ for this product=$pH_o$–$pH_f$. (Please note that if carbonated distilled water was used to make the batter from which the product is to be made, then a certain portion of the "w" percent water of the batter is carbonated distilled water. If "c" percent of the distilled water of the batter is carbonated distilled water, then the two ounces of water to be used in this step to make the 2:1 slurry should have the following composition:

$$\text{carbonated water: } C = \frac{(c/100)*(w/100)}{1-(w/100)} \text{ ounces}$$

distilled water: $D=2-C$ ounces

Further details are given in §5.5.4.3, "Dehydrating the Batter")

5.5.3 Overview of the Preferred Method for Making the Non-Preferred Species, Liquefied Sprouts Based NP CLASS Crackers 5.5.3.1 Sprouting the Seeds The seeds are sprouted as in §5.5.2.1. In order to prepare a cracker batter comparable to that of §5.5.2.2, it will be necessary to sprout slightly more than F ounces of seeds inasmuch as some of the mass of each seed is consumed during the sprouting process. For example, when 8 ounces of wheat is sprouted for 18 hours, the yield is 14.2 ounces of wheat sprouts. When these wheat sprouts are dehydrated to a water activity of 0.45, the end result is only 7.5 ounces of dehydrated sprouts, not the 8 ounces we started with, the other 0.5 ounces having been consumed during the sprouting process. Likewise when 3 pounds of millet is sprouted for 30 hours, the yield is 4 pounds 9.9 ounces of millet sprouts. When these millet sprouts are dehydrated to a water activity of 0.45, the end result is only 2 pounds 12.8 ounces of dehydrated sprouts, not the 3 pounds of millet we started with, the other 3.2 ounces having been consumed during the sprouting process. Hence to obtain an amount of wheat sprouts which will be the equivalent of 1 pound of wheat sprout flour, one must sprout 8.0/7.5=1.067 pounds of wheat seeds for the 18 hours. Likewise, to obtain an amount of millet sprouts which will be the equivalent of 1 pound of millet sprout flour, one must sprout 48/44.8=1.071 pounds of millet seeds for the 30 hours. Thus, in the terminology of §5.5.3.2, it is necessary to sprout $F*(W_u/W_d)$ ounces of seeds in order to obtain the equivalent of F ounces of sprouts after dehydration, where $W_u$=weight of the unsprouted seeds, and $W_d$=weight of sprouted and dehydrated seeds.

5.5.3.2 Preparing the Cracker Batter

First, the sprouted seeds are liquefied in a food processor. Since these sprouts contain a good amount of water (for example, 18 hour wheat sprouts are 47% water), less carbonated water need be added to form the slurry into which the pieces of absorbent vegetal matter are stirred. If a syrupy type of water activity depressant is mixed with the sprouts before liquefying them, no additional water need be added due to the extra liquid which the water activity depressant contributes to the batter.

Similar to the method for making the Preferred Species, whether or not the batter has been prepared with a water activity depressant, the pH of the batter before dehydration should be determined in order that $\delta pH_{LA}$ for the resultant product can be computed. Where the batter has been prepared without a water activity depressant, let us assume that the batter was prepared from C parts carbonated distilled water, L parts of the liquefied sprouts resulting from having sprouted and liquefied $F*(W_u/W_d)$ parts of seeds, and S parts of absorbent vegetal matter, where $W_u$=weight of the unsprouted seeds, and Wd=weight of sprouted and dehydrated seeds. Now the $F*(W_u/W_d)$ parts of seeds became L parts of sprouts after sprouting. If the L parts of sprouts were dehydrated to a water activity of 0.45, we would have F parts of sprout solids (assuming that the remaining water in dehydrated sprouts is negligible). So the L parts of sprouts really consist of F parts sprout solids and L–F parts water. An ounce of batter will then consist of (C+L–F)/(C+L+S) ounces of water, F/(C+L+S) ounces of sprout solids, and S/(C+L+S) ounces of absorbent vegetal matter. The one ounce of batter, therefore, can be considered as consisting of (F+S)/(C+L+S) ounces of solids and (C+L–F)/(C+L+S) ounces of water. In order to make a 2:1 slurry from one ounce of batter, it will be necessary to mix the one ounce of batter with [3*(F+S)/(C+L+S)]–1 ounces of distilled water. The pH of this 2:1 slurry is then measured and called $pH_o$.

Where a batter with a water activity depressant has been prepared, let us assume that the batter additionally consists of D parts of the water activity depressant. And let us assume that the D parts of water activity depressant is W percent water and (100–W) percent solids. The water activity depressant is therefore contributing an additional D*W/100 parts water and D*(100–W)/100 parts solids. An ounce of batter, therefore, can be considered as consisting of [F+S+ D*((100–w)/100)]/(C+L+S+D) parts of solids and [C+L–

F+(D*W/100)]/(C+L+S+D) parts of water. In order to make a 2:1 slurry from an ounce of batter, it will be necessary to mix the one ounce of batter with [(3*(F+S+D−(D*W/100)))/(C+L+S+D)]−1 ounces of distilled pH water. The pH of this 2:1 slurry is then measured and called $pH_o$.

5.5.3.3 Dehydrating the Cracker Batter

The method for dehydrating the cracker batter is identical to the method used for Sprout Flour Based NP CLASS Crackers. (See §5.5.2.3.)

After the batter has been dehydrated to a water activity of 0.45, a 2:1 slurry is prepared from two ounces of distilled water and one ounce of the dried batter, and the pH of the 2:1 slurry is measured. This pH value is called $pHf$. Then $\delta pH_{LA}$ for this product=$pH_o$−$pH_f$. (Please note that if carbonated distilled water was used to make the batter from which the product is to be made, then a certain portion of the "w" percent water of the batter is carbonated distilled water. If "c" percent of the distilled water of the batter is carbonated distilled water, then the two ounces of water to be used in this step to make the 2:1 slurry should have the following composition:

$$\text{carbonated water: } C = \frac{(c/100)*(w/100)}{1-(w/100)} \text{ ounces}$$

distilled water: D=2−C ounces

Further details are given in §5.5.4.3, "Dehydrating the Batter")

Although the process of the present invention can be used for processing most edible sprouts, such as fruit pit sprouts, nut sprouts, vegetable seed sprouts, grain sprouts, etc., the Detailed Views of the Preferred Methods for making each of the two species in accordance with the present invention will be described for convenience with respect to unhulled millet sprouts (gluten free) and wheat sprouts (high in gluten). The absorbent vegetal matter used (for reasons of taste, softness of seed, ease of preparation, and general availability) are whole hulled sesame seeds, dehydrated carrot pieces, and dehydrated shredded cured olives (for added moistness). (It should be noted here that whenever the methods of this invention are used to process edible sprouts containing little or no gluten, then gluten or a gluten like substance such as honey, fruit syrup, or grain syrup must be stirred into the batter prior to dehydrating the batter, or the resultant product will not hold together.) Further since honey has been found to produce a somewhat softer cracker than the other syrupy type water activity depressants which Applicant has used (which are barley malt syrup, grape concentrate, and apple concentrate), the process in accordance with the present invention will be described for convenience with respect to honey. (Using a strong aqueous sugar solution for the water activity depressant has been found to give equally good results.)

Note: The following detailed views of the preferred methods are intended to be read as one continuous discourse. When actually practicing a method, it will be necessary to skip around a bit.

5.5.4 Detailed View of the Preferred Method for Making the Preferred Species, Sprout Flour Based NP CLASS Crackers The method for making Sprout Flour-Based NP CLASS Crackers is shown below:

5.5.4.1 Sprout at least (14+28)*1.071=44.98 ounces of millet seeds for 30 hours and at least 14*1.067=14.94 ounces of wheat seeds for 18 hours by the method described in §5.3.1, except that at step 15 of that section, after removing the twine holding the trays together, leave the sprouts in the trays so that they can be dehydrated in the trays (at Step 3 of §5.5.4.2.1). (14 ounces of dehydrated millet sprouts and 14 ounces of dehydrated wheat sprouts will be used at Step 2 of §5.5.4.2.2.1. Twenty-eight more ounces of dehydrated millet sprouts will be used at Step 3 of §5.5.4.2.2.2.)

5.5.4.2 Preparation of the Cracker Batter

Proceed as follows to prepare the cracker batter:

5.5.4.2.1 Dehydrating the Sprouts:

(1) At this point, ensure that the temperature of the atmosphere in the Preparation Room is above 90° F. Lower temperatures unduly lengthen drying time. Also use a dehumidifier to reduce the relative humidity of the atmosphere in the Preparation Room to less than 45% to speed up the drying of the sprouts and to reduce the possibility of fungal growths while the sprouts are drying.

(2) Make sure that the sprouts are still spread evenly on each tray. If they are not spread evenly, clumps of sprouts will still be moist on the inside after the sprouts surrounding them have dried.

(3) Place the stack of dehydrator trays (minus the top tray which contained the wet napkins) on the dehydrator base unit which contains the heater and fan. Put the insulated dehydrator cover back on top of the stack of trays.

(4) Using the rotary temperature selection dial of the dehydrator, select a temperature of 104° F. (40° C.), turn on dehydrator power, and dehydrate the sprouts until their water activity has been reduced below 0.60, and preferably below 0.45. It is preferred to use a dehydrator which has means for varying the velocity of air over the drying surfaces of the batter. This velocity varying means should be set to its highest feasible setting in order to minimize dehydration time. The dehydrator which applicant used does not have means for raising the air velocity above its preset level.

(5) Prepare a 2:1 slurry from 2 ounces of distilled water and 1 ounce of dried millet sprouts. Measure and record the pH of the 2:1 slurry. In a similar manner, prepare a 2:1 slurry from 2 ounces of distilled water and 1 ounce of dried wheat sprouts. Measure and record the pH of the 2:1 slurry.

(6) Transfer the sprouts into covered storage containers and refrigerate until ready to be used. As long as the dried sprouts are adequately refrigerated, they should keep for a year or more with little, if any, deterioration.

5.5.4.2.2 Milling the Sprouts to Flour and Mixing the Batter Ingredients:

If it is desired to make the Cheesy Variety proceed at §5.5.4.2.2.1. If, on the other hand, it is desired to make the Sweet Variety, proceed at §5.5.4.2.2.2.

5.5.4.2.2.1 The Cheesy Variety of Sprout Flour-Based NP CLASS Crackers

NOTE: This method calls for measuring the water activity of the drying batter every 12 hours in order to demonstrate that the water activity of the drying batter has been reduced below 0.60 before the 48th hour of dehydration has elapsed. Therefore, the cracker batter should only be made at a time when it will be convenient to measure its water activity every 12 hours thereafter. (In this method and the following methods, if it is inconvenient to measure water activity at a given 12 hour point, it is acceptable to obtain readings at times which are on either side of the 12 hour point and to interpolate to obtain the desired reading.)

(1) Set up the Kitchen Mill™ electric flour mill with a thermometer mounted across the flour pan as specified in the "Setup of Equipment Used in Manufacture of Invention" section (§5.3.2) of this patent application.

(2) Using the method for milling sprouts as described in the "Operation of Equipment Used in Manufacture of Invention" section (§5.4.1) of this application, mill 14 ounces of dried millet sprouts and 14 ounces of dried wheat sprouts. (For a somewhat firmer cracker, mill 7 ounces of dried millet sprouts and 21 ounces of dried wheat sprouts instead. Since glutinous ingredients require somewhat more water to form an easy to stir batter than nonglutinous ingredients, between 29 and 30 ounces of carbonated distilled water will be required at step 4 rather than 28 ounces in order to make an easy to stir batter.)

(3) Ensure that the temperature of the atmosphere in the Preparation Room is between 90° F. and 104° F. Lower temperatures unduly lengthen drying time. Also use a dehumidifier to reduce the relative humidity of the atmosphere in the Preparation Room to less than 45% to speed up the drying of the sprout batter and to reduce the possibility of fungal growths while the sprouts are drying.

(4) Dilute 32 ounces of carbonated distilled water with distilled water until its pH value is 4.0. Pour 28 ounces of carbonated distilled water into a suitably sized round stainless steel or plastic container (the mixing container) which complies with FDA regulations. Pour the unused carbonated distilled water into an open container; its pH value will be measured at step 8 of this section.

(5) Stir the sprout flour made at Step 2 into the container of step 4. Continue stirring until all the sprout flour is thoroughly wet. The result at this point should be a somewhat easy to stir sprout mixture. (The absorption of this solution by the dried sprout flour is called rehydration.) The sprout solids to water ratio (SS/H2O) here is 28/28=1.000.

(6) While stirring vigorously in a circular motion, slowly pour 28 ounces of whole hulled and preferably soaked and dried sesame seeds into the mixing container near its inside wall, and continue to stir vigorously for several minutes more to ensure that the sesame seeds are uniformly distributed throughout the batter. (The total weight of this mixture is 84 ounces=5 pounds 4 ounces.) Heat this batter to 104° F.

(7) The batter for the Cheesy Variety consists of 14 ounces of dried millet sprouts, 14 ounces of dried wheat sprouts,. 28 ounces of carbonated distilled water, and 28 ounces of sesame seeds. Thus, total solids is 56 ounces, and the total water is 28 ounces. (Thus the batter is two-thirds solids and one-third water, and this water is 100% carbonated distilled water.) Remove 2.5 ounces of batter. Determine the pH value of a 2:1 slurry of this batter as follows: 2.5 ounces of this batter consists of 0.833 ounces dried sprouts, 0.833 ounces sesame seeds, and 0.833 ounces carbonated distilled water. In other words, this batter consists of 1.667 ounces of solids and 0.833 ounces of water. Add 2.5 ounces of distilled water to the 2.5 ounces of batter to make a 2:1 slurry, and stir well. Its composition, is now 3.333 ounces water and 1.667 ounces of solids. Measure the pH value of this slurry. It should be about 6.0. Call the measured pH of this 2:1 slurry $pH_o$.

(8). Now measure the pH value of the unused portion of diluted carbonated distilled water set aside at step 4. The carbonated distilled water to be used at step 12 of §5.5.4.3 should first be diluted with distilled water until it has the same pH value as the unused portion whose pH value was just measured in this step.

(9) At this point, proceed to §5.5.4.3, "Dehydrating the Batter".

5.5.4.2.2.2 The Sweet Variety of Sprout Flour-Based NP CLASS Crackers

NOTE: This method calls for checking the water activity of the drying batter every 12 hours in order to demonstrate that the water activity of the drying batter has been reduced below 0.60 before the 48th hour of dehydration has elapsed. Therefore, the cracker batter should only be made at a time when it will be convenient to check its water activity every 12 hours thereafter.

(1) Preheat raw unfiltered honey to 104° F. to reduce its viscosity. Dilute 20.1 ounces of carbonated distilled water with distilled water until its pH value is 4.0. Pour 16.1 ounces (=(28* 0.575)) of carbonated distilled water into a suitably sized round stainless steel or plastic container (the mixing container) which complies with FDA regulations. Pour the unused carbonated distilled water into a separate open container; its pH value will be measured at step 9 of this section.

(2) Pour 16.1 ounces of honey into the mixing container, and stir until the honey is completely dissolved. (Since Nickabood's Sage Honey is 12% water, 16.1 ounces of honey contains 0.88*16.1=14.168 ounces of honey solids. Therefore, the solution made in this step is 44% honey which seems high. The weight of the dehydrated crackers will be about 70 ounces of which 14.168 ounces or about 20% is honey solids, which is low! That is one of the surprising things about this invention: Although the initial preparation solution is 44% honey, thus crippling bacterial souring, the final product contains surprisingly little honey percentagewise (only about 20%).)

Now check the water activity of this aqueous honey mixture. If the water activity is greater than 0.85, the honey has a high moisture content and should not be used. If it is still desired, however, to use this honey, add additional honey until the water activity of the liquid drops below 0.85. Now remove liquid from the mixing container until 32.2 ounces of liquid remain in the mixing container.

(3) Set up the Kitchen Mill™ electric flour mill with a thermometer mounted across the flour pan as specified in the "Setup of Equipment Used in Manufacture of Invention" Section (§5.3.2) of this patent application.

(4) Using the method for milling sprouts as described in the "Operation of Equipment Used in Manufacture of Invention" Section of this application (§5.4.1), mill 28 ounces of the dried millet sprouts from §5.5.4.2.1 step 6.

(5) At this point, ensure that the temperature of the atmosphere in the Preparation Room is between 900 F and 104° F.. Lower temperatures unduly lengthen drying time. Also use a dehumidifier to reduce the relative humidity of the atmosphere in the Preparation Room to less than 45% to speed up the drying of the sprouts and to reduce the possibility of fungal growths while the sprouts are drying.

(6) Stir the sprout flour made at step 4 into the container of step 2. Continue stirring until all the sprout flour is thoroughly wet with the solution. The result at this point should be a somewhat easy to stir sprout mixture. (The absorption of this solution by the dried sprout flour is called rehydration.) The sprout solids to water ratio (SS/H2O) here is 28/(16.1+0.12*16.1)=1.553.

(7) While stirring vigorously in a circular motion, slowly pour 28 ounces of whole hulled and preferably soaked and dried sesame seeds into the mixing container near its inside wall, and continue to stir vigorously for several minutes more to ensure that the sesame seeds are uniformly distributed or dispersed throughout the batter. (The total weight of this mixture is 88.2 ounces=5 pounds 8.2 ounces.) Heat this batter to 104° F.

(8) The batter for the Sweet Variety of crackers consists of 28 ounces of dried millet sprouts, 14.168 ounces honey solids, 16.1 ounces of carbonated water, 1.932 ounces of water contributed by the honey, and 28 ounces of sesame seeds. Thus, the total solids is 70.168 ounces, and the total water is 18.032 ounces. (Thus the batter is 79.556% solids and 20.444% water of which 89.29% is carbonated distilled water.) Remove 2.0 ounces of batter. Determine the pH value of a 2:1 slurry of this batter as follows: 2.0 ounces of this batter consists of 0.635 ounces dried sprouts, 0.635 ounces sesame seeds, and 0.365 ounces carbonated distilled water, and 0.365 ounces of sage honey. Since sage honey is 12% water, the 0.365 ounces of honey contributes 0.0438 ounces of water and 0.32 ounces of honey solids to the 2.0 ounces of cracker batter. Or, in other words, the 2.0 ounces of cracker batter consists of 1.59 ounces of solids and 0.41 ounces water. Add 2.77 ounces of distilled water to the 2.0 ounces of batter to make a 2:1 slurry, and stir well. Its composition, is now 3.18 ounces of water and 1.59 ounces of solids. Measure the pH value of this 2:1 slurry. It should be about 5.8. Call this measured value $pH_o$.

(9) Now measure the pH value of the unused portion of diluted carbonated distilled water set aside at step 1. The carbonated distilled water to be used at step 12 of §5.5.4.3 should first be diluted with distilled water until it has the same pH value as the unused portion whose pH value was just measured in this step.

(10) Proceed to §5.5.4.3, "Dehydrating the Batter".

5.5.4.3 Dehydrating the Batter (1) Place an 18 by 18 inch sheet of white paper on a flat surface. Place the screen-form made by the "Method of Manufacture of Despoked Trays and Screen Forms" described in §5.3.3 of this specification in the center of the white sheet of paper. Place a ¼th inch thick flat sheet of transparent lead-free glass or FDA approved plastic over the pieces of paper. The outline of the black screen-form can now be seen through the glass or plastic sheet.

(2) Record the time. Pour 5 pounds of batter on the glass or plastic transparent sheet just over the place where the screen-form can be seen through the transparent sheet. Contour the batter to the shape of the screen-form as seen through the transparent sheet. Spread the batter smoothly to a uniform thickness on the transparent sheet avoiding the central hole of the screen-form as seen through the transparent sheet. (Or, the batter may be spread uniformly within the outer circumference of the screen-form as seen through the transparent sheet even covering up the central hole. Then a hole can be formed in the middle of the batter the same size as the central hole as seen through the transparent sheet.)

(3) Record the time. Remove 2 ounces of batter, and measure and record its water activity. It should be about 0.92 for the Cheesy Varieties of NP CLASS Crackers and about 0.80 for the Sweet Varieties of NP CLASS Crackers.

(4) As the batter rests on the transparent sheet, the sesame seeds in the batter gradually absorb liquid from the batter making the batter firmer and sturdier. Eventually a point in time is reached where the batter is sufficiently sturdy that it can be sliced and lifted off of the transparent sheet without breaking apart. Therefore, let the batter on the transparent sheet set until it is firm enough to be sliced and lifted off the transparent sheet with a spatula without breaking. (This time should be in the order of about 45 minutes, but no longer than about 90 minutes (from the time recorded at step 2), or significant souring will take place when the Cheesy Varieties of NP CLASS Crackers are being made.) When the batter has become sturdy enough to be lifted off of the transparent sheet without falling apart, it is also of sufficient firmness to be placed on a screen without significant leakage through the screen apertures.

(5) Slice the batter lengthwise into long slices (no more than about 2 inches wide). Measure the length of the blade of the spatula to be used at step 6 to lift the slices of batter off of the transparent sheet, and slice the batter crosswise into pieces of that length.

(6) Place a circular screen in a dehydrator tray. Using a spatula, lift the slices of batter off the transparent drying sheet and place on the circular screen, so that the slices are parallel to one another with slight spaces between the individual slices (for ventilation purposes). These long slices of batter should fit perfectly onto a single dehydrator screen. Now, slice the 2 inch wide batter slices into ½ inch by ½ inch squares—substantially bigger pieces will allow significant souring to take place (in the Cheesy Varieties) before the water activity of the pieces has been reduced below 0.60.

(7) Place the dehydrator tray with its slices of batter onto the dehydrator base unit. Place the despoked tray made by the "Method of Manufacture of Despoked Trays and Screen Forms" described in §5.3.3 of this Specification above the dehydrator tray having the batter. Now place an empty dehydrator tray on the despoked dehydrator tray. (This provides additional "head room" and ventilation for the drying batter.)

(8) Place the insulated dehydrator cover on the top tray to minimize loss of heat during the dehydration process. Set the rotary temperature selection dial to indicate a temperature of 104° F. (40° C.). Turn on the dehydrator, and record the time. It is preferred to use a dehydrator which has means for varying the velocity of air over the drying surfaces of the batter. This velocity varying means should be set to its highest feasible setting in order to minimize dehydration time. The dehydrator which applicant used does not have means for raising the air velocity above its preset level.

(9) Thirty minutes after the completion of step 8, and every 30 minutes thereafter for the next 3 hours, reslice the drying batter along the slice marks of steps 5 and 6, and put the tray back on the dehydrator base unit. Replace the insulated dehydrator cover.

(10) Twelve hours after the time recorded in Step 3 and every 12 hours thereafter, remove 2 ounces of the drying batter, and measure and record its water activity. (Since the drying pieces of batter become somewhat "case-hardened" as they dry, it is recommended that these pieces be pulverized before measuring their water activity.) When the water activity of the drying batter drops to about 0.65, the batter should be dry enough to be flipped and the screen to be removed. Doing so will further facilitate drying of the batter.

(11) Continue to measure and record the water activity of the drying batter every 12 hours. Record the time at which the water activity of the drying batter drops below 0.60. Continue to dehydrate the drying batter until its water activity has been reduced below 0.45.

(12) After the batter has been dehydrated to a water activity of 0.45, prepare a 2:1 slurry from two ounces of water and one ounce of the dried batter. Since each of the 2:1 slurries made from the original batter prior to dehydrating it, had different percentages of carbonated water (which is acidic) in them, the 2:1 slurries made from the dehydrated batters should have the same percentages of carbonated water in them so that the pH readings of these 2:1 slurries will properly correspond.

The following considerations can be used to determine the composition of the two ounces of water to be used to make the 2:1 slurry: The batter is "w" percent water. A certain portion of this water in the batter is carbonated distilled water. If "cp" percent of the distilled water of the batter is carbonated distilled water, then the two ounces of water to be used in this step to make the 2:1 slurry should have the following composition:

$$\text{carbonated water: } C_w = \frac{(cp/100)*(w/100)}{1-(w/100)} \text{ ounces}$$

distilled water: $d_w = 2 - c_w$ ounces

These relationships can be used to determine the required composition of the two ounces of water from which the instant 2:1 slurry for each of the various crackers is to be made: (The carbonated water to be used should first be diluted with distilled water until it has the same pH value as recorded in the last step of §5.5.4.2.2.2, 5.5.4.2.2.2, 5.5.5.1, or 5.5.5.2 depending on the kind of cracker being made.)

| Cracker Type | Amount of Non-carbonated Distilled Water in the 2:1 Slurry | Amount of Carbonated Distilled Water in the 2:1 Slurry |
|---|---|---|
| Sprout Flour Based - Cheesy Variety | 1.50 ounces | 0.50 ounces |
| Sprout Flour Based - Sweet Variety | 1.77 ounces | 0.23 ounces |
| Liquefied Sprout Based - Cheesy Variety | 1.867 ounces | 0.133 ounces |
| Liquefied Sprout Based - Sweet Variety | 2.00 ounces | 0.00 ounces |

Measure and record the pH of this 2:1 slurry. This pH value is called $pH_f$. Then $\delta pH_{LA} = pH_o - pH_f$.

(13) Package the rest of the product and refrigerate until ready to be used.

(14) At this point, proceed to §5.7, Verification of Product Vitality.

5.5.5 Detailed View of the Preferred Method for Making the Non-Preferred Species, Liquefied Sprouts Based NP CLASS Crackers If it is desired to make the Cheesy Variety proceed at §5.5.5.1. If, on the other hand, it is desired to make the Sweet Variety, proceed at §5.5.5.2.

5.5.5.1 The Cheesy Variety of Liquefied Sprouts Based NP CLASS Crackers

NOTE: This method calls for measuring the water activity of the drying batter every 12 hours in order to demonstrate that its water activity has been reduced below 0.60 before the 48th hour of dehydration has elapsed. Therefore, the cracker batter should only be made at a time when it will be convenient to measure its water activity every 12 hours thereafter.

(1) Sprout 14.994 ounces of millet seeds until their weight is 22.05 ounces (about 26 hours) and 14.938 ounces of wheat seeds until their weight is 26.5 ounces (about 18 hours) by the method described in §5.3.1. (If 22.05 ounces of millet sprouts were dehydrated, the result would be 14 ounces of dried millet sprouts. If 26.5 ounces of wheat sprouts were dehydrated, the result would be 14 ounces of dried wheat sprouts.)

(2) Ensure that the temperature of the atmosphere in the Preparation Room is between 90° F. and 104° F. Lower temperatures unduly lengthen drying time. Also use a dehumidifier to reduce the relative humidity of the atmosphere in the Preparation Room to less than 45% to speed up the drying of the sprout batter and to reduce the possibility of fungal growths while the sprouts are drying.

(3) Dilute 11.45 ounces of carbonated distilled water with distilled water until its pH value is 4.0.

(4) Place ⅓ of the millet sprouts (7.35 ounces) and ⅓ of the wheat sprouts (8.833 ounces) in the bowl of the Panasonic Food Processor set up with the knife blade attachment. Add 2.483 ounces of the diluted carbonated distilled water from step 3. Press the ON button of the food processor, and set the variable slide control lever to HIGH. Let the food processor run for 10 minutes, stopping occasionally to manually push the sprouts below the level of the knife blade in the bowl of the food processor. (After 10 minutes of liquefying, there should be no discernible sprout pieces; if sprout pieces can still be seen, continue liquefying until such pieces can no longer be seen.) Pour the liquefied sprout mixture from the bowl of the food processor into a suitably sized round glass, stainless steel, or plastic container (the mixing container) which complies with FDA regulations.

(5) Process the other two thirds of the sprouts in the same way (each time adding 2.483 ounces of the diluted carbonated distilled water to the sprouts in the bowl of the food processor). (The water of this step which is added to the sprouts prior to liquefying them provides sufficient lubrication as the sprouts are being liquefied so that the sprouts will not overheat, and there is no need to monitor temperature.) The sprout solids to water ratio (SS/H20) here is $28/((22.05-14)+(26.5-14)+3*2.483)=28/28=1.000$.

(6) Pour the unused carbonated distilled water into a separate open container; its pH value will be measured at step 9 of this section.

(7) Stir 28 ounces of whole hulled and preferably soaked and dried sesame seeds into the liquefied sprouts in the mixing container. Heat the mixture in the mixing container to a temperature of 104° F.. Heating the batter to a temperature of 104° F. before pouring it onto the dehydrator trays leads to a shorter dehydration time for the product batter thus giving fermentative organisms less time for their souring activity, thus yielding a better tasting product with a significantly smaller $\delta pH_{LA}$. (The total weight of this mixture is 84 ounces=5 pounds 4 ounces.)

(8) The batter for the Cheesy Variety consists of 14 ounces of millet sprout solids, 14 ounces of wheat sprout solids, 8.05 ounces of water contributed by the millet sprouts, 12.5 ounces of water contributed by the wheat sprouts, 28 ounces of sesame seeds, and 7.45 ounces of added carbonated water. Thus, the total solids is 56 ounces and the total water is 28 ounces. (Thus the batter is two-thirds solids and one-third water of which 26.61% is carbonated distilled water.) Remove 2.5 ounces of batter. Determine the pH value of a 2:1 slurry of this batter as follows: 2.5 ounces of this batter consists of 0.833 ounces of sprout solids, 0.833 ounces sesame seeds, 0.6116 ounces of water inherent in the sprouts, and 0.2217 ounces added carbonated water. In other words, this batter consists of 1.667 ounces of solids and 0.833 ounces of water. Add 2.5 ounces of distilled water to the 2.5 ounces of batter to make a 2:1 slurry, and stir well. Its composition, is now 3.333 ounces water and 1.667 ounces of solids. Measure the pH value of this 2:1 slurry. It should be about 6.0. Call the measured pH of this 2:1 slurry $pH_o$.

(9) Now measure the pH value of the unused portion of diluted carbonated distilled water set aside at step 6. The carbonated distilled water to be used at step 12 of §5.5.4.3 should first be diluted with distilled water until it has the same pH value as the unused portion whose pH value was just measured in this step.

(10) At this point, proceed to §5.5.4.3, "Dehydrating the Batter".

5.5.5.2 The Sweet Variety of Liquefied Sprouts Based NP CLASS Crackers

NOTE: This method calls for measuring the water activity of the drying batter every 12 hours in order to demonstrate that the water activity of the drying batter has been reduced below 0.60 before about the 48th hour of dehydration has elapsed. Therefore, the cracker batter should only be made at a time when it will be convenient to measure its water activity every 12 hours thereafter.

(1) Sprout 30 ounces of millet seeds until their weight is 44.1 ounces (about 26 hours) by the method described in §5.3.1.

(2) At this point, ensure that the temperature of the atmosphere in the Preparation Room is between 90° F. and 104° F. Lower temperatures unduly lengthen drying time. Also use a dehumidifier to reduce the relative humidity of the atmosphere in the Preparation Room to less than 45% to speed up the drying of the sprouts and to reduce the possibility of fungal growths while the sprouts are drying.

(3) Place ⅓ of the millet sprouts (14.7 ounces) and 5.367 ounces of honey in the bowl of the Panasonic Food Processor set up with the knife blade attachment. Press the ON button of the food processor, and set the variable slide control lever to HIGH. Let the food processor run for 10 minutes, stopping occasionally to manually push the sprouts below the level of the knife blade in the bowl of the food processor. (After 5 minutes of liquefying, there should be no discernible sprout pieces; if sprout pieces can still be seen, continue liquefying until such pieces can no longer be seen.) Empty the liquefied sprout mixture in the bowl of the food processor into a half gallon capacity glass, stainless steel, or plastic container (the mixing container) which complies with FDA regulations.

(4) Process the other two thirds of the millet sprouts in the same way (each time adding 5.367 ounces of honey to the sprouts in the food processor bowl). (The honey of this step which is added to the sprouts prior to liquefying them provides sufficient lubrication as the sprouts are being liquefied so that the sprouts will not overheat, and there is no need to monitor temperature.) The sprout solids to water ratio (SS/H2O) here is $28/((44.1-28)+0.12*3*5.367)=1.553$.

(5) While stirring vigorously in a circular motion, slowly pour 28 ounces of whole hulled and preferably soaked and dried sesame seeds into liquefied sprouts in the mixing container near its inside wall, and continue to stir vigorously for several minutes more to ensure that the sesame seeds are uniformly distributed or dispersed throughout the batter. (The total weight of this mixture is 88.2 ounces=5 pounds 8.2 ounces.) Heat this batter to 104° F.

(6) The batter for Honey-Sweet Liquefied Sprouts Based NP CLASS Crackers consists of 28 ounces millet sprout solids, 14.168 ounces honey solids, 16.1 ounces of water contributed by the sprouts, 1.932 ounces of water contributed by the honey, and 28 ounces of sesame seeds. Thus, the total solids is 70.168 ounces and the total water is 18.032 ounces. (Thus the batter is 79.555% solids and 20.444% water of which 0% is carbonated distilled water, since none was added.) Remove 2.0 ounces of batter. Determine the pH value of a 2:1 slurry of this batter as follows: 2.0 ounces of this batter consists of 0.635 ounces sprout solids, 0.635 ounces sesame seeds, 0.365 ounces of water inherent in the sprouts, and 0.365 ounces of sage honey. Since sage honey is 12% water, the 0.365 ounces of honey contributes 0.0438 ounces of water and 0.32 ounces of honey solids to the 2.0 ounces of cracker batter. Or, in other words, the 2.0 ounces of cracker batter consists of 1.59 ounces of solids and 0.41 ounces water. Add 2.77 ounces of distilled water to the 2.0 ounces of batter to make a 2:1 slurry, and stir well. Its composition, is now 3.18 ounces of water and 1.59 ounces of solids. Measure the pH value of this 2:1 slurry. It should be about 5.8. Call this measured value $pH_o$.

(7) At this point, proceed to §5.5.4.3, "Dehydrating the Batter".

5.5.6 Detailed View of the Preferred Method for Making the Preferred Species, Sprout Flour Based NP CLASS Crackers Wherein the Pieces of Absorbent Vegetal Matter are Dehydrated Diced Carrots (1) Wash, scrub, and remove bad spots from fresh raw carrots.

(2) Dice three pounds 14 ounces of carrots into cubes which are no longer than about three-sixteenths of an inch along each edge.

(3) Ensure that the temperature of the atmosphere in the Preparation Room is between 90° F. and 104° F. Lower temperatures unduly lengthen drying time. Also use a dehumidifier to reduce the relative humidity of the atmosphere in the Preparation Room to less than 45% to speed up the drying of the carrots and later the sprout batter and to reduce the possibility of fungal growths while the sprout batter is drying.

(4) Dehydrate the diced carrots until their water activity is less than 0.45. The three pounds 14 ounces of carrots will dehydrate to about 7 ounces.

Please note, if carrot flour or powder is used instead of diced carrots, the carrot flour will absorb water too quickly from the batter at step 11, and it will not be possible to stir all 7 ounces of dehydrated carrots into the batter. But by using approximately ³⁄₁₆th inch diced carrots, the carrot cubes will absorb water sufficiently slowly that it will be possible to stir all 7 ounces into the batter at step 11. These carrot cubes will then (over a period of about 20 minutes) absorb sufficient water from the sprout batter that it can be spread upon dehydrator screens without appreciably leaking through the screen openings. A key idea of this invention, is that the pieces of vegetal matter be sufficiently large that a large enough quantity of them can be stirred into the sprout batter without so quickly thickening the batter that stirring further pieces of vegetal matter into the batter becomes difficult. Then these pieces slowly absorb enough water from the batter that it becomes stiffer than if only a large quantity of carrot flour had been stirred in. If, however, the carrot pieces are too large, they will pull away from the batter during subsequent dehydration to such an extent so as to cause large cracks in the drying batter. The trick here is that the carrot pieces should not be too small (which leads to too rapid an absorption of water from the batter) and should not be too large (not only resulting in the carrot pieces absorbing water too slowly from the batter but also leading to large cracks forming in the batter as it dries). Also if the carrot pieces are too large, they will draw water from the batter only in their immediate vicinity, causing regions of wetness and dryness in the drying batter thus causing uneven drying of the batter and further leading to the formation of cracks in the batter. In conclusion, if cracks form in the drying batter, dice the carrots into smaller cubes when making the next batch of crackers; if the batter thickens too quickly when the carrot pieces are stirred in, dice the carrots into larger cubes when making the next batch of crackers.

(7) Measure out the proper amounts of the following ingredients:
   (a) 1 pound 2 ounces dried millet sprouts
   (b) 10 ounces dried wheat sprouts
   (c) 7 ounces dehydrated carrot cubes
   (Hence, these crackers will be 20 percent by weight dehydrated carrots.)

(8) Mill the millet sprouts and the wheat sprouts.

(9) Pour 2 pounds 8.5 ounces carbonated distilled water into a suitably sized round stainless steel or plastic container (the mixing container) which complies with FDA regulations.

(10) Stir the sprout flour made at Step 8 into the container of Step 9. Continue stirring until all the sprout flour is thoroughly wet. The result at this point should be a somewhat easy to stir sprout mixture.

(11) While stirring vigorously in a circular motion, slowly pour the dehydrated carrot cubes into the mixing container near its inside wall, and continue to stir vigorously for several minutes more to ensure that the carrot cubes are uniformly distributed throughout the batter.

(12) Place an 18 by 18 inch sheet of white paper on a flat surface. Place a screen-form in the center of the white sheet of paper. Place a ¼th inch thick flat sheet of transparent lead-free glass or FDA approved plastic over the pieces of paper. The outline of the black screen-form can now be seen through the glass or plastic sheet.

(13) Record the time. Pour a suitable amount of batter on the glass or plastic transparent sheet just over the place where the screen-form can be seen through the transparent sheet. Spread the batter smoothly to a uniform thickness within the outer circumference of the screen-form as seen through the transparent sheet. Contour the batter to the shape of this screen-form. Form a hole in the middle of the batter the same size as the central hole as seen through the transparent sheet.

(14) As the batter rests on the transparent sheet, the dehydrated carrot pieces in the batter gradually absorb liquid from the batter making the batter firmer and sturdier. Eventually a point in time is reached where the batter is sufficiently sturdy that it can be sliced and lifted off of the transparent sheet without breaking apart. Therefore, let the batter on the transparent sheet set until it is firm enough to be sliced and lifted off the transparent sheet with a spatula without breaking. This time should be no longer than about 20 minutes (from the time recorded at step 13).

(15) Slice the batter lengthwise into long slices (no more than about 2 inches wide). Measure the length of the blade of the spatula to be used at step 16 to lift the slices of batter off of the transparent sheet, and slice the batter crosswise into pieces of that length.

(16) Place a circular screen in a dehydrator tray. Using a spatula, lift the slices of batter off the transparent drying sheet and place on the circular screen, so that the slices are parallel to one another with slight spaces between the individual slices (for ventilation purposes). Now, slice the 2 inch wide batter slices into ¼ inch by ½ inch squares.

(17) Place the dehydrator tray with its slices of batter onto the dehydrator base unit. Place a despoked tray above the dehydrator tray having the batter. Now place an empty dehydrator tray on the despoked dehydrator tray.

(18) Place the insulated dehydrator cover on the top tray to minimize loss of heat during the dehydration process. Set the rotary temperature selection dial to indicate a temperature of 104° F. (40° C.). Turn on the dehydrator, and record the time. (It is preferred to use a dehydrator which has means for varying the velocity of air over the drying surfaces of the batter. This velocity varying means should be set to its highest feasible setting in order to minimize dehydration time. The dehydrator which applicant used does not have means for raising the air velocity above its preset level.)

(19) Thirty minutes after the completion of step 18, and every 30 minutes thereafter for the next 3 hours, reslice the drying batter along the slice marks of steps 15 and 16, and put the tray back on the dehydrator base unit. Replace the insulated dehydrator cover.

(20) Twelve hours after the time recorded in Step 13 and every 12 hours thereafter, remove 2 ounces of the drying batter, and measure and record its water activity. When the water activity of the drying batter drops to about 0.65, the batter should be dry enough to be flipped and the screen to be removed. Doing so will further facilitate drying of the batter.

(21) Continue to measure and record the water activity of the drying batter every 12 hours. Continue to dehydrate the drying batter until its water activity has been reduced below 0.45.

(22) Package the product and refrigerate until ready to be used.

5.5.7 Detailed View of the Preferred Method for Making the Preferred Species, Sprout Flour Based NP CLASS Crackers, Wherein the Pieces of Absorbent Vegetal Matter are Whole Hulled Sesame Seed, Dehydrated Diced Carrots and Dehydrated Raw Olive Shreds Although the preferred embodiment of sprout flour based NP CLASS Crackers is made with commercially available olives, the most preferred embodiment is made with raw enzyme-rich olives. Shown below are methods for preparing raw green and raw ripe olives. (Lacking the proper equipment for preparing raw olives, Applicant has only used commercially available olives in NP CLASS Crackers.)

Preparing Raw Green Olives:
(1) Submerge the olives in 0.9 to 2.0% lye solution at about 15 to 21 C until the lye has penetrated ¾ of way to pit.
(2) After washing the olives several times, and covering them with salt brine, allow the olives to ferment for six months at 24 C.
(3) Pit the olives. Now re-barrel and wash the olives.
(4) Immediately shred and dehydrate the olives according to steps 1, 3, and 4 of the Method of Making NP CLASS Crackers.

Preparing Raw Ripe Olives:
(1) Hold the olives in 5–10% brine.
(2) Treat the olives with 0.5 to 2.0% lye solution.
(3) Aerate and treat the olives with lye and more aeration.
(4) After allowing the lye to penetrate to the pit, leach the olives with water to remove the lye.
(5) Stabilize the ripe olives in 2–3% brine for two days.
(6) Immediately shred and dehydrate the olives according to steps 1, 3, and 4 of the following Method of Making NP CLASS Crackers.

Method of Making NP CLASS Crackers:
(1) Process 4 pounds 8.8 ounces of ripe pitted olives as follows:
   (a) Carefully inspect olives for pits and pit remnants removing the same when found.
   (b) Shred black pitted olives using the Presto Salad Shooter. Refrigerate shredded olives.
(2) Wash, scrub, and remove bad spots from fresh raw carrots. Dice two pounds 1.25 ounces of carrots into cubes which are no longer than about three-sixteenths of an inch along each edge.

(3) Ensure that the temperature of the atmosphere in the Preparation Room is between 90° F. and 104° F. Lower temperatures unduly lengthen drying time. Also use a dehumidifier to reduce the relative humidity of the atmosphere in the Preparation Room to less than 45% to speed up the drying of the carrot and olive pieces and later the sprout batter and to reduce the possibility of fungal growths while the sprout batter is drying.

(4) Dehydrate the diced carrots and shredded olives until their water activity is less than 0.45. The two pounds 1.25 ounces of carrots will dehydrate to about 3¾ ounces. The four pounds 8.8 ounces of olives will dehydrate to about 14.5 ounces.

(5) Measure out the proper amounts of the following ingredients:
 (a) 14 ounces dried millet sprouts
 (b) 14 ounces dried wheat sprouts
 (c) 3.5 ounces dehydrated carrot cubes
 (d) 14 ounces of dehydrated shredded olives
 (e) 1 pound 12 ounces of whole hulled sesame seeds (6) Mill the millet sprouts and the wheat sprouts.

(7) Pour 3 pounds 12.5 ounces carbonated distilled water into a suitably sized round stainless steel or plastic container (the mixing container) which complies with FDA regulations.

(8) Mix the dehydrated carrot and olive shreds with the sesame seed. Shake well in a closed container in order to form a substantially uniform mixture of carrot cubes, olive shreds, and sesame seeds.

(9) Stir the sprout flour made at Step 6 into the container of Step 7. Continue stirring until all the sprout flour is thoroughly wet. The result at this point should be a somewhat easy to stir sprout mixture.

(10) While stirring vigorously in a circular motion, slowly pour the carrot-olive-sesame seed mixture into the mixing container near its inside wall, and continue to stir vigorously for several minutes more to ensure that the carrot cubes, olive shreds, and sesame seeds are uniformly distributed throughout the batter.

(11) Place an 18 by 18 inch sheet of white paper on a flat surface. Place a screen-form in the center of the white sheet of paper. Place a ¼th inch thick flat sheet of transparent lead-free glass or FDA approved plastic over the pieces of paper. The outline of the black screen-form can now be seen through the glass or plastic sheet.

(12) Record the time. Pour a suitable amount of batter on the glass or plastic transparent sheet just over the place where the screen-form can be seen through the transparent sheet. Spread the batter smoothly to a uniform thickness within the outer circumference of the screen-form as seen through the transparent sheet. Contour the batter to the shape of this screen-form. Form a hole in the middle of the batter the same size as the central hole as seen through the transparent sheet.

(13) Repeat steps 11 and 12 until all the batter has been so spread.

(14) As the batter rests on the transparent sheet, the dehydrated carrot cubes, olive shreds, and sesame seeds in the batter gradually absorb liquid from the batter making the batter firmer and sturdier. Eventually a point in time is reached where the batter is sufficiently sturdy that it can be sliced and lifted off of the transparent sheet without breaking apart. Therefore, let the batter on the transparent sheet set until it is firm enough to be sliced and lifted off the transparent sheet with a spatula without breaking. This time should be no longer than about 20 minutes (from the time recorded at step 12).

(15) Slice the batter lengthwise into long slices (no more than about 2 inches wide). Measure the length of the blade of the spatula to be used at step 16 to lift the slices of batter off of the transparent sheet, and slice the batter crosswise into pieces of that length.

(16) Place a circular screen in a dehydrator tray. Using a spatula, lift the slices of batter off the transparent drying sheet and place on the circular screen, so that the slices are parallel to one another with slight spaces between the individual slices (for ventilation purposes). Now, slice the 2 inch wide batter slices into ¼ inch by ½ inch squares.

(17) Place the dehydrator tray with its slices of batter onto the dehydrator base unit. Place a despoked tray above the dehydrator tray having the batter. Now place an empty dehydrator tray on the despoked dehydrator tray.

(18) Place the insulated dehydrator cover on the top tray to minimize loss of heat during the dehydration process. Set the rotary temperature selection dial to indicate a temperature of 104° F. (40° C). Turn on the dehydrator, and record the time. (It is preferred to use a dehydrator which has means for varying the velocity of air over the drying surfaces of the batter. This velocity varying means should be set to its highest feasible setting in order to minimize dehydration time. The dehydrator which applicant used does not have means for raising the air velocity above its preset level.)

(19) Thirty minutes after the completion of step 18, and every 30 minutes thereafter for the next 3 hours, reslice the drying batter along the slice marks of steps 15 and 16, and put the tray back on the dehydrator base unit. Replace the insulated dehydrator cover.

(20) Twelve hours after the time recorded in Step 12 and every 12 hours thereafter, remove 2 ounces of the drying batter, and measure and record its water activity. When the water activity of the drying batter drops to about 0.65, the batter should be dry enough to be flipped and the screen to be removed. Doing so will further facilitate drying of the batter.

(21) Continue to measure and record the water activity of the drying batter every 12 hours. Continue to dehydrate the drying batter until its water activity has been reduced below 0.45.

(22) Package the product and refrigerate until ready to be used.

5.6 Description of Preferred Method to Manufacture Rustic Sprouted Grain Products

5.6.1 Introduction

A brief word on how I happened to invent my new RUSTIC Sprouted Seed product is in order: One time while feeding 24 hour sprouted wheat into the hopper of the Rolled Oats Crusher roller mill, I noticed that the rollers of the roller mill had difficulty catching the wet flexible wheat sprouts and that the wheat sprouts fed through slowly. After pondering my slow progress, the thought occurred to me that maybe the sprouts would feed through more quickly and with less gumming up of the rollers of the roller mill if the sprouts were first dehydrated. So I dehydrated the wheat sprouts for 5½ hours. Then they were reasonably dry, firm to the touch, and fed through the rollers of the roller mill much more easily. It then dawned upon me that if the sprouts were dehydrated until their water activity was reduced to below 0.60, there would be no need to treat them with a preservative solution either before or after compressing them. Eliminating the application of a preservative solution saves both time (there is no need to mix and apply preservative and, without preservative which adds extra liquid, dehydration proceeds more quickly) and money (the use of preservatives adds to the cost of production). Therefore, I came to the conclusion that the best way to make compressed sprouted grain is to sprout the grain; dehydrate the sprouted grain until the water activity thereof is less than 0.60; compress the sprouted grain using compressing means; and then further dehydrate the compressed sprouted grain until the desired degree of crispness is attained.

Further experimentation, however, revealed that an even better product is produced if:
(1) The grain is sprouted for 18 hours instead of 24 hours. After the grain sprouts have sprouted for 24 hours, they have grown sufficiently to become somewhat entangled. Consequently they feed through the roller mill with difficulty. Further, at about the twelfth hour of sprouting, the sprouts start developing a somewhat unusual sweet taste which becomes stronger the longer the sprouts are allowed to grow. Some people consider this unusual sweet taste objectionable.
(2) These sprouts are dehydrated until their water activity is reduced just below 0.91 instead of 0.60 before compressing them. When the sprouts are dehydrated to a water activity of below 0.60 and then compressed, they have a tendency to fracture rather than flatten. This fracturing results in a small amount of sprout flour being produced, which, because it resembles mold to the uninstructed eye of the consumer, tends to render the product somewhat unmarketable. Further, a flatter more easily chewed product results when the water activity is reduced to just below 0.91 instead of 0.60 before compressing them.

One time as an experiment, I decided to try to make sesame coated compressed wheat sprouts. Using a strainer, I dipped compressed wheat sprouts in a solution of honey, apple concentrate, and water. I then let the compressed wheat sprouts drain and mixed them with sesame seed. Then I placed this mixture on circular screens in dehydrator trays, placed the dehydrator trays on the dehydrator base unit, and started dehydrating this mixture. Later that day, I had to leave the house, and went to check on how the sprouts were drying. It was then that I made the sad discovery that I had inadvertently set the temperature selector of the dehydrator at its very lowest setting (about 85° F.) when I began dehydrating the sprouts, and, consequently, the compressed sprouts were still somewhat damp. Since I did not want the compressed wheat sprouts to over-dehydrate, I placed the dehydrator trays in the refrigerator which happens to be a frost-free model, intending to continue the dehydration process when I returned. Coming back about ten hours later, I found that the compressed wheat sprouts had formed a firm crisp solid layer in each tray, and I had no difficulty peeling off the circular drying screens, which left me with firm crisp circular layers of compressed wheat sprouts and sesame seed interspersed. The product held together well and looked like it would make an excellent snack food.

Later, in reflecting on this new product, it occurred to me that while the reduced temperature and humidity of the frost-free refrigerator were inhibiting the growth of microorganisms, the dehumidifying effect of the frost-free refrigerator was gradually lowering the water activity of the product below the lowest water activity at which such microbial growth could still occur. This being the case, products which are dried in a frost-free refrigerator need neither cooking nor preservative to inhibit microbial activity. And since the temperature in the refrigerator is above freezing, the valuable vitamin E in the product would not be damaged.

Somewhat later, in further reflecting on this new product, it occurred to me that this method can also be used to prepare compressed sprouted grain. After the grain is sprouted and compressed, it can be placed in a frost-free refrigerator until the water activity of the compressed sprouted grain is reduced below about 0.70. While the cold and reduced humidity of the refrigerator are preventing microbial growth, the dehydrating effect of the frost-free refrigerator is gradually lowering the water activity of the product below the lowest water activity at which such microbial growth could still occur. A dehydrator can then be safely used to obtain the desired degree of crispness.

Then what I later read on pages 5 and 124 of the fourth edition of "Food Microbiologyi" further strengthened my conviction that refrigerating my product in uncovered dehydrator trays in the refrigerator would indeed yield the desired result—a raw unsoured sprouted grain product successfully prepared without the use of cooking or preservatives.

Since the relative humidity of the air in a frost-free refrigerator is well below 85 percent (and normally below 50 percent except during the brief defrost cycle), all microbial activity will be suppressed while the products of this invention are drying in a frost-free refrigerator.

Although the methods of this application are applicable for any seeds which must be converted to a more easily masticated form before they would appeal to humans, the preferred seeds for the methods of this invention are those grains which have at least a 90% germination rate after having been hulled. Such grains include wheat, spelt, kamut, triticale, rye, and some types of rice. Such grains as oats, barley, and buckwheat will no longer sprout once their hulls have been removed. Most seeds other than the grains have neither the taste nor the consistency that one expects of breakfast cereals. Therefore, the rest of this application will address only hulled cereal grains and grains such as millet with very thin hulls. (Using grains which must be hulled after having been sprouted requires a large investment in hulling equipment.) That subset of RUSTIC Sprouted Seed Products which have been made from hulled cereal grains and grains with thin hulls shall henceforth be referred to as RUSTIC Sprouted Grain Products. The remainder of the application will address only RUSTIC Sprouted Grain Products.

5.6.2 Introduction to the Method

Inasmuch as RUSTIC Sprouted Grain Products has four species, I will give a single continuous method which teaches my preferred way of making about 1½ pounds of the first species, two pounds of the second species, and 3½ pounds of each of the two varieties of the third species. The fourth species, using a somewhat different method is given separately. The first three species are:
   (1) unflavored raw compressed sprouts
   (2) flavored raw compressed sprouts
   (3) raw compressed sprout cakes
       a. syrup sweetened variety
       b. plain variety The fourth species, Sprouted Wheat, "Puffed Wheat" style has two subspecies: Ultrathin Compressed wheat (which is really just a variation of species 1, unflavored compressed sprouts) and uncompressed wheat "puffed wheat" style.

Although the process of the present invention can be used in processing any sprouts which need to be converted in some way in order to be comfortably chewed by human beings, the process in accordance with the present invention will be described for convenience with respect to wheat sprouts.

Before I go into the steps of the method, I give a brief introduction to sprouting so that those who wish to practice the methods of this invention can do so successfully.

5.6.3 A Brief Introduction to Sprouting

First, one must select the grains to be sprouted. For the purposes of this invention, grains can be divided into two classes:

(1) Grains which will still sprout after their hulls have been removed (if the grain was not damaged in the process of removing the hulls). Some of the better known grains in this class are wheat, spelt, kamut, triticale, rye, and rice.

(2) Grains which will no longer sprout after their hulls have been removed. Some of the better known grains in this class are oats, buckwheat, millet, and barley.

With the exception of such grains as millet which have very thin hulls, it is preferred to use hulled grains for sprouting. As indicated above, many grains will no longer sprout once their hulls have been removed. Apparently the grains are sufficiently damaged during hulling that they will no longer sprout. If unhulled grains are sprouted, they must be dehydrated and then hulled before they can be used in the products of this invention. Otherwise the resultant products will be too tough and fibrous to be appealing to humans. Therefore, it is preferable to use hulled grains or grains with thin hulls for sprouting.

The first step in sprouting grain is to soak the selected grain for between five and ten hours in either filtered or distilled water at a temperature below 45° C. (Higher temperatures would destroy the grain's ability to sprout.) In general, this temperature is between 20° and 30° C. (The optimal soak times for many seeds can be found on pages 72–73 of *The UNcook Book* by Elizabeth and Dr. Elton Baker (Communication Creativity, Saguache, Colo. (1980)). Next, the selected grains are either dehydrated immediately (The Quick Sprouting Method) or sprouted for at least 18 hours in an environment whose temperature is between 15° and 30° C. (The Traditional Sprouting Method). (It should be noted that during the first few hours of any subsequent dehydration, the grain sprouts still retain sufficient moisture to continue growing which brings about a further increase in enzymes, especially alpha amylase, and a further decrease in enzyme inhibitors.) If some grains such as wheat, however, are sprouted for much longer than 24 hours, they begin to develop an objectionable sweet taste. Many grains if they are sprouted for longer than about 24 hours, due to the lengthening of their roots and shoots, tend to become tangled which makes it difficult to feed them into the hopper of the Rolled Oats Crusher roller mill. Both the Traditional and Quick Sprouting Methods yield compressed hydrated grains. The terms "compressed sprouts" and "compressed dried sprouts" are to be understood as meaning "compressed hydrated grains" and "dried compressed hydrated grains" respectively wherever they appear in this specification.

5.6.4 The Method

For grains to be sprouted by either the Traditional or the Quick Sprouting Method, perform the first six of the following steps.

(1) Measure out and inspect 10 pounds of organic hulled wheat grain. Remove all extraneous matter such as pebbles, dirt, staples, bits of metal, and badly discolored or otherwise defective wheat grain. This step is very important because a piece of metal or stone would not only contaminate the product but could also damage the cylindrical rolls of the roller mill when it is used to compress the dried sprouts at a later step.

(2) Rinse the wheat grain in a solution containing ½ ounce of 3% strength food grade hydrogen peroxide per gallon of rinse water. This rinsing will reduce the fungal population on the surface of the wheat grain.

(3) In a glass, stainless steel, or plastic container of at least three gallons capacity which complies with FDA regulations, prepare the solution in which the wheat grain will be soaked. This solution consists of:

(a) 1.5 gallons of 77° F. (25° C.) distilled water (b) 4.5 ounces of three percent strength food grade hydrogen peroxide. (Hydrogen peroxide inhibits fungal growths on the sprouts as they are growing, and also leads to a more abundant crop of sprouts.)

(4) Stir the wheat grain into the solution of step 3.

(5) Allow the wheat grain to soak in this solution for 10 hours. After ten hours, the wheat grain will have absorbed just about as much liquid as it is capable of absorbing.

(6) Place a large strainer over the mouth of the container used for soaking the sprouts, and, holding the strainer tightly against the mouth of the container, tip the container and drain all the solution from the container. The container now contains just wheat grain. Rinse the soaked wheat by filling the container with fresh filtered or distilled water and draining again. Record the time at which this step is completed.

If the Traditional Sprouting Method is being used, proceed to Step 7. And, in that event, please note that Step 8 should be performed six hours after step 6. If the Quick Sprouting Method is being used, perform steps (a) through (e) before proceeding to step 24 in the "Unflavored Compressed Sprouts by the Dehydration and Compression Method" section of this Specification.

(a) Place a circular screen in a circular food dehydrator tray of the Model FD-1000 Food Dehydrator. You will notice that the screen has two semi-circular cutouts on opposite edges of the screen to enable one to more easily lift the screen out of the tray. When grain is spread on the screen, some of the grain close to these cutouts may fall through. To remedy this situation, place a second screen in the tray so as to cover the cutouts of the first screen, thus preventing the grain from falling through.

(b) Place the dehydrator tray containing the two screens on a suitably sized pizza platter.

(c) Spread 2 pints of the soaked grain evenly over the surface of the upper circular screen in the dehydrator tray.

(d) Repeat steps (a) through (c), placing each newly prepared dehydrator tray on top of the last dehydrator tray (thus forming a stack of dehydrator trays on the pizza platter), until all of the soaked grain has been placed in dehydrator trays. There is now a stack of dehydrator trays on the pizza platter.

(e) Place the stack of dehydrator trays on the dehydrator base unit which contains the heater and fan. Put the insulated dehydrator cover on the top tray of the stack of trays.

(f) Now proceed to Step 24 in the "Unflavored Compressed Sprouts by the Dehydration and Compression Method" section of this Specification.

(7) In an area where the temperature is between 15° and 30° C., set up a grain sprouter to sprout the soaked wheat grain as described in the "Setup of Equipment Used in Manufacture of Invention" section of this patent application. Please note, however, that the circular screens of Step (b) of that section are only suitable for grains larger than the hole openings of the screens. For sprouting smaller grains, suitable screen material may be obtained from Alfa III Corporation, Chaska, Minn. (The grain sprouter as set up should have ten trays of soaked wheat. The eleventh tray on top contains just the wet napkins.)

(8) Six hours after performing step 6, fill a large stainless steel drum with enough water to cover the top tray of the grain sprouter set up in step 7 when it is submerged in the stainless steel drum. If you are using Freund Can Company's 16" Inside Diameter 20 gallon stainless steel drum, 9½ gallons of water will be required to cover the top tray of the grain sprouter. It is very important that this water be either distilled or filtered water; the chemicals added to municipal water may retard the growth of the sprouts.

(9) Remove the insulated dehydrator cover. Using a good quality butchers twine, tightly tie together the stack of trays from top to bottom such that it will hold together when you immerse this stack of trays in the water in the drum.

(10) Using the portion of the butchers twine stretched across the top tray as a handle, slowly lower the stack of trays minus the insulated cover into the stainless steel drum until the top tray of the stack of trays is submerged. Wait 10 seconds while the sprouts soak.

(11) Slowly raise the stack of trays from the drum of water, tip the stack of trays to facilitate drainage, allow to drain for 10 seconds or so, and place the stack of trays back in the stainless steel pan. Replace the insulated cover.

(12) Six hours later, remove the dehydrator cover, and repeat steps 10 and 11.

(13) Three hours later, remove the dehydrator cover, and again repeat steps 10 and 11.

(14) Three hours later, remove the twine holding the stack of trays together, and remove the top tray which contains the napkins. (The sprouts have now been growing for a total of 18 hours since step 6.)

(15) The next step is to make compressed sprouts. There are two methods for producing compressed sprouts. The first method is entitled the "Compression and Refrigeration Method". In this method, the sprouts are compressed with a roller mill and dried in a frost-free refrigerator until their water activity has fallen below 0.70. The second method is entitled the "Dehydration and Compression Method". In this method, the sprouts are dehydrated until their water activity has fallen below 0.91, compressed with a roller mill, and then further dehydrated until their water activity has fallen below 0.60. Each method has certain advantages.

The advantages of the first method are:

(1) Since the sprouts are compressed before they are dried, they are still soft, and their moisture level is fairly high. Consequently there will be considerably less heat buildup when undried sprouts are compressed by the rollers of a roller mill than would be the case if the sprouts were dried before compressing them.

(2) Since the growing sprouts are soft and flexible, they compress more easily, and a thinner more easily masticated product results than is the case when the sprouts are dried before compressing them.

The advantages of the second method are:

(1) When the sprouts are dried before compressing them, the gumming up of the rollers of the roller mill which is common when moist sprouts are compressed is eliminated thus facilitating cleanup.

(2) Sprouts dry a lot quicker in a dehydrator than in a frost-free refrigerator.

If it is desired to make compressed sprouts by the "Compression and Refrigeration Method", continue at step 16. If, on the other hand, it is desired to make compressed sprouts by the "Dehydration and Compression Method", continue at step 22.

5.6.5 Unflavored Compressed Sprouts by the Compression and Refrigeration Method.

The following steps teach the method for making unflavored compressed sprouts by the compression and refrigeration method.

(16) Empty the dehydrator trays containing the sprouts into an 18½" diameter stainless steel basin. Place 4 ounces of these sprouts in an uncovered jar in a frost-free refrigerator.

Note: In order to eliminate the possibility of bacterial souring, steps 17 and 18 should be performed at a location where the temperature is between 40 and 45° F. (4–7° C.) and the relative humidity is less than 45%.

(17) Fill the hopper of the Rolled Oats Crusher roller mill with sprouts from the stainless steel basin, and turn the handle of the roller mill until the sprouts have fed through. Repeat until all of the sprouts have fed through, stopping occasionally to empty the tray beneath the rollers of the roller mill. Please note that these sprouts need not be treated with preservative either before or after this step inasmuch as bacterial souring and fungal growth will be inhibited by the cold and reduced humidity of the frost-free refrigerator at step 19. (Applicant has found that the rollers of the Rolled Oats Crusher roller mill are close enough together to compress sprouted wheat to less than its MMT.)

(18) Place a dehydrator tray on a pizza platter and place a circular screen in the dehydrator tray. Evenly spread 2 pints of the compressed sprouts over the circular screen. Repeat this step until all the sprouts have been placed in trays and stacked on the pizza platter. There should now be 14 trays stacked on the pizza platter. Do not cover the top tray in any way. Place the pizza platter with its stack of trays in a frost-free refrigerator whose interior temperature is 40° F. (4° C.).

(19) Leave the sprouts in the refrigerator until their water activity is less than 0.70 (36–40 hours). To speed the drying process the following can be done:

a. The soak water remaining on the sprouts will drip onto the pizza platter and, by evaporation, tend to raise the humidity in the refrigerator thus slowing the drying process. After one hour of drying, replace the pizza platter under the stack of trays with a dry pizza platter.

b. A small fan can be placed in the refrigerator to improve circulation and facilitate drying.

c. To further facilitate drying, place suitable plastic or wooden spacers or separators between the trays in order to separate the trays somewhat from one another.

As mentioned in the introduction to the "Description of Preferred Method to Manufacture Invention" section of this patent application, micro-organisms will grow at refrigerator temperature if the relative humidity inside the refrigerator exceeds 85 percent. Therefore it is wise to monitor relative humidity within the refrigerator while the sprouts are drying, making sure that it never climbs this high.

If crisper compressed sprouts are desired perform step 20; otherwise go to step 21.

(20) Mount the 14 trays of sprouts on the dehydrator base unit. Pour the 4 ounce jar of sprouts which was placed in the refrigerator at step 16 into a separate tray, and place it on top of the other trays. Replace the insulated cover, and set the dehydrator temperature to 104° F. (400 C), and dehydrate the sprouts until the desired degree of crispness is obtained. (It is recommended that the sprouts be dehydrated until their water activity is less than 0.60.)

(21) Record the weight of the product obtained. Set aside 4 ounces of these compressed dried sprouts and also the 4 ounces of uncompressed sprouts placed in the refrigerator at step 16 for the pH measurement to be performed at step 75. At this point proceed to step 33.

5.6.6 Unflavored Compressed Sprouts by the Dehydration and Compression Method.

The following steps teach the method for making unflavored compressed sprouts by the dehydration and compression method.

(22) Make sure that the sprouts are still spread evenly on each tray. If they are not spread evenly, clumps of sprouts will still be moist on the inside after the sprouts surrounding them have dried.

(23) Place the stack of dehydrator trays (minus the top tray which contained the wet napkins) on the dehydrator base unit which contains the heater and fan. Put the insulated cover back on top of the stack of trays.

(24) Using the rotary temperature selection dial of the dehydrator, select a temperature of 104° F. (40° C.), turn on dehydrator power, and dehydrate the sprouts until their water activity has been reduced below 0.91. (It is preferred to use a dehydrator which has means for varying the velocity of air over the drying sprouts. This velocity varying means should be set to its highest feasible setting in order to minimize dehydration time. The dehydrator which applicant used does not have means for raising the air velocity above its preset level.) Drying time will depend on the temperature and relative humidity in the room in which drying is done.

At a temperature of 104° F. (40° C.), most of the enzymes of the sprouts should be retained in the final product, inasmuch as temperatures below 118° F. (48° C.) do not destroy enzymes under normal conditions. One key test for preservation of enzyme activity is the test for diastatic or amylase activity. If a product during the course of processing has retained most of its amylase activity, it most likely has retained other enzyme activity as well. Most of the enzyme activity in growing sprouts is diastatic activity which converts starches to sugars. Furthermore, the temperature of 104° F. (40° C.) is well below 161° F. (72° C.), the temperature at which proteins begin to be denatured (to have their natural qualities and characteristics undergo change for the worse). Another key test is the determination of the product's DV, the Percentage Destruction of Viability Due to Heat, and DG, the Percentage Decrease in Growth Potential Due to Heat. Please see the "Verification of Product Vitality" section following step 75 for a discussion of this second key test.

(25) When the sprouts have dried to a water activity of 0.90, empty the trays into an 18½" diameter stainless steel basin.

(26) Set aside 4 ounces of these dried sprouts for the pH measurement to be performed at step 75.

(27) Fill the hopper of the Rolled Oats Crusher roller mill with these dehydrated sprouts, and turn the handle of the roller mill until the sprouts have fed through. Repeat until all of the sprouts have fed through, stopping occasionally to empty the tray beneath the rollers of the roller mill. Please note that the dehydrated sprouts need not be treated with a preservative either before or after this step inasmuch as their water activity was reduced below the point at which bacterial souring can occur at step 25 above. (Applicant has found that the rollers of the Rolled Oats Crusher roller mill are close enough together to produce compress sprouted grain with an MD of less than 1.)

(28) Place a circular screen in a dehydrator tray and evenly spread 1½ pints of the compressed dehydrated sprouts over the circular screen. Place the tray on the circular base unit of the dehydrator. Repeat this step until all of the compressed dehydrated sprouts have been placed in trays on the circular base unit. There should now be 12 or 13 trays stacked on the dehydrator's circular base.

(29) Place the insulated dehydrator cover on the top dehydrator tray.

(30) Set the rotary selection dial of the dehydrator to 104° F. (40° C.), and dehydrate the sprouts until the water activity of the sprouts is reduced below 0.60. If crisper compressed sprouts are desired perform step 31; otherwise go to step 32.

(31) Further dehydrate the sprouts until the desired degree of crispness is obtained.

(32) Record the weight of the product obtained. Set aside 4 ounces of these compressed dried sprouts for the pH measurement to be performed at step 75.

(33) Transfer the sprouts into covered storage containers and refrigerate until ready to be used. As long as the dried sprouts are adequately refrigerated, they should keep for a year or more with little, if any, deterioration.

NOTE: Throughout the rest of this description, neutral pH water (water with a pH of 7) should be used in order that the values obtained for the pH of the various products will be comparable to the pH values given for these products in the Examples at the end of this description.

5.6.7 Flavored Compressed Sprouts

The following steps teach the method for making apple flavored compressed sprouts.

(34) Measure out 2 pounds (about 3¼ pints) of sprouts from the sprouts of step 33.

Note: In order to eliminate the possibility of bacterial souring, steps 35 through 37 should be performed at a location where the temperature is between 40 and 45° F. (4–7° C.) and the relative humidity is less than 45%. In addition, set the temperature of the refrigerator to be used at step 39 to 40° F. (4° C.).

(35) In a bowl of suitable size, thoroughly mix together the following ingredients:

(a) 1 pint of cold (40° F.) neutral pH water (b) 4 ounces of cold (40° F.) apple concentrate In order that the results obtained will be comparable to the results given at step 75, apple concentrate with a pH of 3.9 should be used. Please note that there is no need to include a preservative with the above ingredients inasmuch as bacterial souring and fungal growth will be inhibited by the cold and reduced humidity of the frost-free refrigerator at step 39.

(36) Fill a small strainer with some of the compressed sprouts from step 34, dip the strainer into the bowl of step 35 until the sprouts therein are covered with the mixture of step 35 (stirring if necessary). Then raise the strainer, allow the mixture to drain from the sprouts for about five seconds, and pour the sprouts into a larger bowl. Repeat this step until 2 pounds of sprouts have been so treated.

(37) Weigh these sprouts in order to determine how much of the mixture of step 35 they have on them. Record this weight in ounces. From this weighing, compute the number of ounces of apple concentrate on the product to be set aside at step 42 as follows: (all amounts are expressed in ounces)

Apple Concentrate on Sprouts (oz.)=0.2*(Weight of Sprouts−32)

Apple Concentrate on ¹⁄₁₆th of product to be set aside at Step 42=(Apple Concentrate on Sprouts)/16

(38) Place a dehydrator tray on a pizza platter and place a circular screen in the dehydrator tray. Evenly spread 1 pint of the compressed sprouts over the circular screen. Repeat this step until all the sprouts have been placed in trays and stacked on the pizza platter. There should now be 4 trays stacked on the pizza platter. Do not cover the top tray in any way.

(39) Place the pizza platter with its stack of trays in a frost-free refrigerator whose interior temperature is 40° F. (4° C.)

(40) Leave the sprouts in the refrigerator until the water activity of the sprouts is less than 0.70 (36–40 hours). To speed the drying process the following can be done:

a. The mixture covering the sprouts will drip onto the pizza platter and, by evaporation, tend to raise the humidity in the refrigerator thus slowing the drying process. Every hour or so for the first few hours of drying and every 6 hours thereafter, replace the pizza platter under the stack of trays with a dry pizza platter.

b. A small fan can be placed in the refrigerator to improve circulation and facilitate drying.

c. To further facilitate drying, place suitable plastic or wooden spacers or separators between the trays in order to separate the trays somewhat from one another.

As mentioned in the introduction to the "Description of Preferred Method to Manufacture Invention" section of this patent application, micro-organisms will grow at refrigerator temperature if the relative humidity inside the refrigerator exceeds 85 percent. Therefore it is wise to monitor relative humidity within the refrigerator while the sprouts are drying, making sure that it never climbs this high. It is now recommended that the compressed sprouts be dehydrated until their water activity is less than 0.60. If it is desired to do this, mount the 4 trays of sprouts on the dehydrator base unit, set dehydrator temperature to 104° F. (40° C.), and dehydrate the sprouts until the desired degree of crispness is obtained. (Please note that if the dehydrator is used before water activity has been reduced below 0.75, microbial growth may occur, thus ruining the taste of the product.) (It is preferred to use a dehydrator which has means for varying the velocity of air over the drying sprouts. This velocity varying means should be set to its highest feasible setting in order to minimize dehydration time. The dehydrator which applicant used does not have means for raising the air velocity above its preset level.)

(41) Pour these sprouts into a large stainless steel basin.

(42) Record the weight of these sprouts, and set aside 1/16th of these sprouts for the pH measurement to be performed at step 75. Package the rest of the dried compressed sprouts and refrigerate until ready to be used.

5.6.8 Compressed Sprout Cakes

A. Honey-Sweetened Compressed Sprout Cakes

The following steps teach the method for making compressed sprout cakes wherein the agglutinant is a sweet syrup such as honey, a fruit syrup, molasses, maple syrup, or a grain syrup. (When mixed with the compressed sprouts, an agglutinant will cause them to adhere to one another.) For convenience, the below method utilizes honey, but any sweet syrup can be used if the amount of water used is adjusted accordingly.

(43) Measure out 2½ pounds of sprouts from the sprouts of step 33 (about 4¼ pints).

Note: In order to eliminate the possibility of bacterial souring, steps 44 through 46 should be performed at a location where the temperature is between 40 and 45° F. (4–7° C.) and the relative humidity is less than 45%.

(44) In a bowl of suitable size, thoroughly mix together the following ingredients:

(a) cup of cold (40° F.) neutral pH water (b) 2 pounds of cold (40–45° F.) honey

(45) Fill a small strainer with some of the compressed sprouts from step 43, dip the strainer into the bowl of step 44 until the sprouts therein are covered with the mixture of step 44 (stirring if necessary). Then raise the strainer, allow the mixture to drain from the sprouts for about five seconds, and pour the sprouts into a larger bowl. Repeat this step until 2½ pounds of sprouts have been so treated. Weigh these sprouts in order to determine how much of the mixture of step 44 they have on them. Record this weight in ounces. From this weighing, compute the number of ounces of honey on the product to be set aside at step 50 as follows: (all amounts are in ounces)

Honey on Sprouts (oz.)=0.8*(Weight of Sprouts−40)

Honey on 1/20th of product set aside at step 40=(Honey on Sprouts)/20

(46) Place a dehydrator tray on a pizza platter and place a circular screen in the dehydrator tray. Evenly spread 2½ pints of the compressed sprouts from step 45 over the circular screen. Place a circular screen on top of the compressed sprouts in the dehydrator tray, and evenly apply pressure on all parts of this circular screen to form a compacted layer of sprouts in the dehydrator tray. Remove this circular screen. Repeat this step until all the sprouts have been placed in trays and stacked on the pizza platter. There should now be 2 trays stacked on the pizza platter. Place the pizza platter with its stack of trays in a frost-free refrigerator whose interior temperature is 40° F. (4° C.). Do not cover the top dehydrator tray in any way.

(47) Allow the trays of compressed sprouts to dry in the refrigerator until the water activity of the compressed sprouts is reduced to below 0.70. To speed the drying process, the following can be done:

a. Slice the drying layers of compressed sprouts into half-inch squares.

b. The mixture covering the sprouts will drip onto the pizza platter and, by evaporation, tend to raise the humidity in the refrigerator thus slowing the drying process. Every hour or so for the first few hours of drying and every 6 hours thereafter, replace the pizza platter under the stack of trays with a dry pizza platter.

c. A small fan can be placed in the refrigerator to improve circulation and facilitate drying.

d. To further facilitate drying, place suitable plastic or wooden spacers or separators between the trays in order to separate the trays somewhat from one another.

(48) Now that the water activity of the sprouts has been reduced below 0.70, the dehydrator can be used to obtain the desired degree of crispness. (If the dehydrator is used before water activity has been reduced below 0.75, microbial growth may occur, thus ruining the taste of the product.) Remove the two dehydrator trays from the refrigerator and place them on the circular base unit of the food dehydrator. Place the circular insulated cover on the top tray, set the rotary temperature selection dial of the dehydrator to 104° F. (40° C.), and dehydrate the sprouts until the desired degree of crispness is obtained. (It is preferred to use a dehydrator which has means for varying the velocity of air over the drying sprouts. This velocity varying means should be set to its highest feasible setting in order to minimize dehydration time. The dehydrator which applicant used does not have means for raising the air velocity above its preset level.)

(49) Place the two dehydrator trays back in the refrigerator and allow the products therein to chill until the honey in the layers of compressed sprouts has congealed, and the layers of compressed sprouts are firm to the touch.

(50) Remove the 2 dehydrator trays from the refrigerator. Remove the solidified layer of compressed sprouts from each tray, and peel off the circular screen. Break these solidified layers of compressed sprouts into half inch squares along the slice marks made at Step 47, package them, and refrigerate until ready to be used. Record the weight of the product obtained. Set aside 1/20th of this product for the pH measurement to be performed at step 75.

Please note that the cold of the refrigerator caused the honey to congeal while the cold and reduced humidity of the refrigerator were inhibiting microbial activity. It should be noted, however, that the compressed sprout cake pieces will remain firm only if kept cool; if allowed to become warm, they will soften again.

B. Unflavored Compressed Sprout Cakes

The following steps teach the method for making compressed sprout cakes wherein the agglutinant is sprouted wheat flour. (The agglutinant used here could be any gluten containing sprouted or unsprouted grain flour. Some of the grains containing gluten are wheat, oats, barley, rye, teff, quinoa, triticale, buckwheat (although technically not a grain, is used as one and is often listed with them), and sprouted or unsprouted sunflower seeds (although not a grain, contains the glutinous protein alpha gliadin). If other than wheat flour is used, more than 1 pound of flour will be required at step 53 inasmuch as other grains do not have as much gluten as wheat.)

(51) Measure out 2½ pounds of dehydrated compressed sprouts from the sprouts of step 33 (about 4¼ pints).

(52) Measure out an additional 1 pound of dehydrated compressed sprouts from the sprouts of step 33. Mill this 1 pound of dehydrated compressed sprouts to flour as taught by steps 1 through 5 of the "Operation of Equipment Used in Manufacture of Invention" section of this patent application.

CAUTION: In order to eliminate the possibility of bacterial souring, steps 53 through 55 should be performed at a location where the temperature is between 40 and 45° F. (4–7° C.), and the relative humidity is less than 45%.

(53) In a bowl of suitable size, thoroughly mix together the following ingredients:
   (a) 4 cups of cold (40° F.) neutral pH water
   (b) 1 pound of cold (40° F.) milled sprouts

(54) Stir in the compressed sprouts from step 51, until the sprouts are thoroughly covered with the mixture of step 53.

(55) Place a dehydrator tray on a pizza platter, and place a circular screen in the dehydrator tray. Evenly spread 1 pint of the mixture-coated compressed sprouts over the circular screen. Place a circular screen on top of the compressed sprouts in the dehydrator tray, and evenly apply pressure on all parts of this circular screen to form a compacted layer of compressed sprouts in the dehydrator tray. Remove this circular screen. Repeat this step, stacking each tray, as it is completed, on the pizza platter until all the compressed sprouts have been placed in trays. There should now be 5 trays stacked on the pizza platter.

(56) Place the pizza platter with its stack of trays in a frost-free refrigerator whose interior temperature is 40° F. (4° C.). Do not cover the top dehydrator tray in any way.

(57) Allow the trays of compacted compressed sprouts to dry in the refrigerator until the water activity of the layers of compacted compressed sprouts has been reduced to below 0.70.

To speed the drying process, the following can be done:
   a. Slice the drying layers of compressed sprouts into half-inch squares.
   b. The mixture covering the sprouts will drip onto the pizza platter and, by evaporation, tend to raise the humidity in the refrigerator thus slowing the drying process. After the first hour of drying, replace the pizza platter under the stack of trays with a dry pizza platter. There should be no more dripping after this.
   c. A small fan can be placed in the refrigerator to improve circulation and facilitate drying.
   d. To further facilitate drying, place suitable plastic or wooden spacers or separators between the trays in order to separate the trays somewhat from one another.

(58) Now that the water activity of the sprouts has been reduced below 0.70, the dehydrator can be used to obtain the desired degree of crispness. (If the dehydrator is used before water activity has been reduced below 0.75, microbial growth may occur, thus ruining the taste of the product.) Remove the five dehydrator trays from the refrigerator and mount them on the circular base unit of the food dehydrator. Place the insulated dehydrator cover on the top tray. Set the rotary temperature selection dial of the dehydrator to 104° F. (40° C.), and dehydrate the compressed sprouts until the desired degree of crispness is obtained. (It is preferred to use a dehydrator which has means for varying the velocity of air over the drying surfaces of the compressed sprouts. This velocity varying means should be set to its highest feasible setting in order to minimize dehydration time. The dehydrator which applicant used does not have means for raising the air velocity above its preset level.)

(59) Remove the solidified layer of compressed sprouts from each 1 tray, and peel off the circular screen. Record the weight of the product obtained. Break these solidified layers of compressed sprouts into half inch squares along the slice marks made at Step 57, package them, and refrigerate until ready to be used. Set aside 2 ounces of this product for the pH measurement to be performed at step 75.

5.6.9 Ultrathin Compressed Sprouted Wheat and Sprouted Wheat "Puffed Wheat" Style

(60) Measure out and inspect 10 pounds of organic hulled wheat grain. Remove all extraneous matter such as pebbles, dirt, staples, bits of metal, and badly discolored or otherwise defective wheat grain.

(61) Rinse the wheat grain in a solution containing ½ ounce of 3% strength food grade hydrogen peroxide per gallon of rinse water. This rinsing will reduce the fungal population on the surface of the wheat grain.

(62) In a glass, stainless steel, or plastic container of at least three gallons capacity which complies with FDA regulations, prepare the solution in which the wheat grain will be soaked. This solution consists of:
   (a) 1.5 gallons of 77° F. (25° C.) distilled water
   (b) 4.5 ounces of three percent strength food grade hydrogen peroxide. (Hydrogen peroxide inhibits fungal growths on the sprouts as they are growing, and also leads to a more abundant crop of sprouts.)

(63) Stir the wheat grain into the solution of step 3.

(64) Allow the wheat grain to soak in this solution for 12 hours.

(65) Place a large strainer over the mouth of the container used for soaking the sprouts, and, holding the strainer tightly against the mouth of the container, tip the container and drain all the solution from the container. The container now contains just wheat grain. Again fill the container with fresh filtered or distilled water. Add two ounce of three percent strength hydrogen peroxide per gallon of soak water.

(66) Every 12 hours for the two days, rinse the wheat and replace the soak water. It is preferred to add two ounces of hydrogen peroxide to every gallon of soak water.

(67) At the end of this soaking for two days, rinse the wheat one more time and allow excess water to drain from the wheat for a few minutes.

To make ultrathin compressed wheat, continue at step 68. To make uncompressed wheat, "puffed wheat" style, continue at step 73.

If a roller mill is now used to compress this soaked grain, it will quickly become clogged with the crushed sprouts, and much time will be spent cleaning the sprouts from the rollers. It is better to use a press with suitably sized stainless steel surfaces. Applicant has already described a mechanical version of what he believes to be the ideal type of press to crush these waterlogged and very soft sprouts. Therefore, when performing steps 68 through 72, please refer to the drawings and description for the RUSTIC Press given earlier.

(68) Adjust the six bolts along the smaller upper plate of the RUSTIC Press so that there is no more than about 1/32nd of an inch between the upper and lower sheets of stainless steel when the press is fully closed.

(69) Evenly spread soaked wheat on the lower sheet of stainless steel of the RUSTIC Press, such that the wheat is no more than one layer of grains thick anywhere on the sheet of stainless steel.

(70) Step down on the platform of the RUSTIC Press, thus compressing the grain in the RUSTIC Press. Hold the pressure for about a minute to ensure that the wheat is fully compressed.

(71) Raise the platform, thus opening the RUSTIC Press. Scrape the compressed wheat into a suitable container.

(72) Repeat steps 69 through 71 until all the grain has been compressed.

(73) Dehydrate the grain from either step 67 or step 72 until its water activity has fallen below 0.40.

(74) Refrigerate the dehydrated grain until it is ready to be used.

(75) Determine the pH of each of the various products set aside in the above steps as shown below. From these pH values, compute $\delta pH_{Ia}$ for each of the end-products.

A. Uncompressed Dried Sprouts Set Aside at Step 26 (or step 21) Plain, and Then With Apple Concentrate, and Then With Honey:

(a) Mill 2 ounces of the uncompressed dried sprouts set aside at step 26 (or step 21), and stir well into 4 ounces of neutral pH water.

(b) Let settle for 30 seconds, and measure and record the pH of this mixture. This is $PH_{A.(b)}$.

(c) Add the number of ounces of apple concentrate computed by the second equation of step 37 and stir well.

(d) Measure and record the pH of this mixture. This is $pH_{A.(d)}$.

(e) Mill another 2 ounces of the uncompressed dried sprouts set aside at step 26 (or step 21), and stir well into 4 ounces of neutral pH water.

(f) Add the number of ounces of honey computed by the second equation of step 45 and stir well.

(g) Measure and record the pH of this mixture. This is $pH_{A.(g)}$.

B. Compressed Dried Sprouts Set Aside at Step 32 (or step 21):

(a) Mill 2 ounces of the compressed dried sprouts set aside at step 32 (or step 21), and stir well into 4 ounces of neutral pH water.

(b) Let settle for 30 seconds, and measure and record the pH of this mixture. This is $pH_{B.(b)}$. Compute $\delta pH_{Ia}$ as follows: $\delta pH_{Ia} = pH_{A.(b)} - pH_{B.(b)}$. $\delta pH_{Ia}$ should be less than 0.1.

C. Flavored Compressed Sprouts Set Aside at Step 42:

(a) Mill the product set aside at step 42, and stir well into 4 ounces of neutral pH water.

(b) Let settle for 30 seconds, and measure and record the pH of this mixture. This is $pH_{C.(b)}$. Compute $\delta pH_{Ia}$ as follows: $\delta pH_{Ia} = pH_{A.(d)} - pH_{C.(b)}$. $\delta pH_{Ia}$ should be less than 0.1.

D. Honey-Sweetened Compressed Sprout Cake Set Aside at Step 50:

(a) Mill the product set aside at step 50, and stir well into 4 ounces of neutral pH water.

(b) Let settle for 30 seconds, and measure and record the pH of this mixture. This is $pH_{D.(b)}$. Compute $\delta pH_{Ia}$ as follows: $\delta pH_{Ia} = pH_{A.(g)} - pH_{D.(b)}$. $\delta pH_{Ia}$ should be less than 0.1.

E. Unflavored Compressed Sprout Cake Set Aside at Step 59:

(a) Mill the 2 ounces of unflavored sprout cake set aside at step 59, and stir well into 4 ounces of neutral pH water.

(b) Let settle for 30 seconds, and measure and record the pH of this mixture. This is $PH_{E.(b)}$. Compute $\delta pH_{Ia}$ as follows: $\delta pH_{Ia} = PH_{A.(b)} - PH_{E.(b)}$. $\delta pH_{Ia}$ should be less than 0.1.

5.7 Verification of Product Vitality

In order to demonstrate that NP CLASS Crackers and RUSTIC Sprouted Seed Products have not been processed at such temperatures and times which would damage the vitality of my products, I present two methods for measuring the degree of damage a product has experienced due to excessive heat.

The first method measures DV, the Percentage Destruction of Viability Due to Heat. Essentially, DV is a measure of the degree to which the seeds in a product would fail to sprout due to thermal damage if they had been held in water prior to sprouting at the various temperatures and times of the process which produced the product.

The second method measures DG, the Percentage Decrease in Growth Potential Due to Heat. Essentially, DG is a measure of the degree to which the seeds in a product would have had their rate of growth decreased due to thermal damage if they had been held in water prior to sprouting at the various temperatures and times of the process which produced the product.

For a completely undamaged product, DV and DG are both zero. For a completely damaged product, DV and DG are both 100%. A product with a DV or DG near zero means that the product has not been significantly affected by heat, and, unless it was subjected to other destructive influences, it still possesses the bulk of its valuable nutrients. A product with a DV or DG near 100% has had most of its valuable nutrients damaged or destroyed by heat. It is the better part of wisdom to avoid such products.

A. Computation of DV, the Percentage Destruction of Viability Due to Heat:

(1) Compute the total time that a product is exposed to temperatures above 30° C., i.e., somewhat above what is normally considered room temperature. (Temperatures below 30° C. are not known to damage any of the known nutrients in food.)

(2) Compute the average temperature, $T_{av}$, during those periods when the product is exposed to such elevated temperatures.

(3) Compute Elevated Temperature Soak Time, $R_e$, as the lesser of:

(a) Total time product was exposed to temperatures above 30° C.
(b) Eight hours.
(4) Compute Room Temperature Soak Time: $R_o$=8 hours–$R_e$
(5) Carefully select $n_t$ ($n_t \geq 50$) plump seeds which are not damaged, discolored, or shriveled. Soak these seeds in distilled water in a sealed thermally conductive container for $R_e$ hours at a temperature of $T_{av}$. (The container is sealed to prevent evaporation and resultant cooling.)
(6) At the end of $R_e$ hours, continue to soak the seeds for a further $R_o$ hours at a temperature of 20–30° C. (i.e., room temperature).
(7) Between the start of step 5 and the end of step 6, the seeds will have soaked for a total of 8 hours.
(8) Soak a second lot of $n_t$ (same as the $n_t$ of step 5) seeds of the same kind in distilled water for eight hours at 20–30° C.
(9) Sprout the seeds of step 7 for 48 hours. Let $n_e$ be the number of seeds out of $n_t$ which sprout.
(10) Sprout the seeds of step 8 for 48 hours. Let $n_r$ be the number of seeds out of $n_t$ which sprout.
(11) Compute DV for this product as follows:

$$DV=[1/n_r)*(n_r-n_e)\pm 2/n_t]*100\%$$

(By definition, a product which was never subjected to a temperature greater than 30° C. has a DV of 0 percent. One's diet should consist primarily of such foods.)

B. Computation of DG, the Percentage Decrease in Growth Potential Due to Heat:
(1) Compute the total time that a product is exposed to temperatures above 30° C.
(2) Compute the average temperature, $T_{av}$, during those periods when the product is exposed to such elevated temperatures.
(3) Compute Elevated Temperature Soak Time, $R_e$, as the lesser of:
(a) Total time product was exposed to temperatures above 30° C.
(b) Eight hours.
(4) Compute Room Temperature Soak Time, $R_o$:

$$R_o=8 \text{ hours}-R_e$$

(5) Carefully select one pound of plump seeds which are not damaged, discolored, or shriveled. Soak this grain in distilled water in a sealed thermally conductive container for $R_e$ hours at a temperature of $T_{av}$. (The container is sealed to prevent evaporation and resultant cooling.)
(6) At the end of $R_e$ hours, continue to soak the seeds for a further $R_o$ hours at a temperature of 20–30° C.
(7) Between the start of step 5 and the end of step 6, the seeds will have soaked for a total of 8 hours. Weigh the seeds. Let $W_{eo}$ be the weight of these soaked seeds.
(8) Soak another pound of similarly selected seeds for eight hours at 20–30° C. Weigh these soaked seeds. Let $W_{ro}$ be the weight of these soaked seeds after 8 hours of soaking.
(9) Sprout the seeds of step 7 for 48 hours. Let $W_e$ be the weight of these seeds after 48 hours. Compute $\delta W_e$, the weight gain of these seeds during the 48 hours of sprouting. (Thus $\delta W_e$ does not include the weight of the water absorbed as a result of soaking for 8 hours.) $\delta W_e = W_e - W_{eo}$.
(10) Sprout the seeds of step 8 for 48 hours. Let $W_r$ be the weight of these seeds after 48 hours. Compute $\delta W_r$, the weight gain of these seeds during the 48 hours of sprouting. (Thus $\delta W_e$ does not include the weight of the water absorbed as a result of soaking for 8 hours.) $\delta W_r = W_r - W_{ro}$.

(11) Compute DG for this product as follows:

$$DG=[(\delta W_r - \delta W_e)/\delta W_r]*100\%$$

(By definition, a product which was never subjected to a temperature greater than 30° C. has a DG of 0 percent.)

5.8 Results of Enzymatic Analysis of Products of This Invention

In September of 1990, various samples of low temperature sprouted wheat products were submitted to Winston Laboratories, Inc., Ridgefield Park, N.J. for enzymatic analysis. Their October 8 letter gives the results of their analysis of some of Applicant's sprouted wheat products for alpha amylase enzymatic activity. Alpha amylase is the dominant enzyme in sprouting wheat. The first sample was wheat sprouts which were dehydrated just enough so that they could be sent via UPS to Winston Laboratories. A temperature of 104 F was used to dry these for only a few hours so that any loss of enzymatic activity would be minimal. These slightly dried sprouts should have essentially the same enzymatic activity as they had while they were still growing.

The second sample was from the same batch of wheat sprouts but was partially dried, compressed, and then thoroughly dried to remove nearly all moisture. Thoroughly dried wheat sprouts are used to make NP CLASS Crackers. Since considerable moisture was removed which decreased the weight of the sprouts but did not decrease their alpha amylase enzymatic activity, the "on an as—is moisture basis" alpha amylase activity of the sprouts after drying is considerably higher than the activity of the slightly dried sprouts. In other words, the weight of the sprouts decreased due to the removal of moisture but the enzymatic activity did not, thus giving the higher reading after thorough drying. This establishes that dehydrating sprouts at 104 F does not significantly lessen their alpha amylase enzymatic activity.

The third sample was also from the same batch of wheat sprouts and also was partially dried, compressed, and then thoroughly dried to remove nearly all moisture. Winston Laboratories was instructed to heat the third sample to 85 C (185 F) for 30 minutes before conducting their enzymatic analysis on this sample.

Therefore, these thoroughly dried wheat sprouts were heated to 85 C (185 F) for 30 minutes. As can be seen, this destroyed over 9% of the alpha amylase enzymatic activity of the wheat sprouts. If these sprouts had been placed in 185 F water for 30 minutes, over 95% of the alpha amylase activity would have been destroyed. Research has shown that wet heat is much more destructive to enzymatic activity than dry heat.

The fourth sample is raw sprouted wheat crackers made from the sprouted wheat of sample 2. The alpha amylase enzymatic activity of the resultant crackers is essentially the same as that of the dried wheat sprouts from which they were made. This result shows that the methods of Applicant's invention do not damage the alpha amylase enzymatic activity of the wheat sprouts used to make the products of Applicant's invention.

Following is a quote from a portion of the letter from Winston Laboratories:

"We have analyzed 4 samples of wheat and cereal ingredients for enzyme activity. The enzyme tested was alpha amylase, the testing procedure utilized an enzymatic hydrolysis of substrate followed by spectrophotometric determination of released dye marker. The samples were ground prior to extraction of the enzyme, one sample: (1c)

Breakfast cereal, was heated to 85 C for 30 minutes to test the thermal sensitivity of the enzyme. The samples were analyzed using a spectrophotometric method which does provide meaningful data. The units of activity are specific for the substrate, BPNG7* (Biocon Ceralpha) but can be converted to activity on a starch substrate (1% w/v) (Nelson-Somogyi Units) readily. The results are expressed in both units. On an as—is moisture basis the alpha amylase activities in Units/gram are as follows:

| Description | Units/g) (BPNPG7) | Units/g (Nelson/Somogyi) (1% soluble starch) |
|---|---|---|
| 1a. unrolled wheat sprouts | 11.9 | 35.7 |
| 1b. breakfast cereal (rolled wheat sprouts) | 16.0 | 48.0 |
| 1c. breakfast cereal (rolled wheat sprouts) | 14.5 | 43.5 |
| 1d. Plain Flavored Chips | 17.9 | 53.7 |

* BPNG = Blocked p-nitrophenyl maltoheptaoside"

Another letter Applicant received from Winston Laboratories (October 22, 1990) shows that the alpha amylase enzymatic activity of unsprouted wheat flour is 0.310 BPNPG7 units per gram or 0.930 Nelson Somogyi units per gram. By comparison, the alpha amylase enzymatic activity of Applicant's Plain Flavored Chips is 17.9 units per gram, which is over 57 times higher. And by comparison, the alpha amylase enzymatic activity of Applicant's sprouted wheat breakfast cereal is 16.0 units per gram, which is over 51 times higher. These increases are solely due to the sprouting process. Of course, when a bakery heats unsprouted wheat flour in their bread-making process, or when commercially available sprouted grain breakfast cereals are manufactured, every last trace of alpha amylase enzymatic activity is thoroughly destroyed. In other words, one ounce of either Plain Flavored Chips or RUSTIC Sprouted Grain products has more enzymatic activity than the total of enzymatic activity of all the loaves of bread baked since the dawn of creation.

Finally, the Jan. 31, 1990 letter Applicant received from Winston Laboratories records results from their analysis of some raw sprouted wheat products for PBG Deaminase enzymatic activity. Although in this case there was no reference standard, the results indicate that there is other enzymatic activity in the products of Applicant's invention besides Alpha Amylase.

5.9 EXAMPLES

5.9.1 Example 1

Sour Sprout Chips Prepared Without Souring Limitation Methods

The recipe for "Wheat Crackers" found on page 111 of *The UNcook Book* by Elizabeth and Dr. Elton Baker (Communication Creativity, Saguache, Colo. (1980)) was followed in order to determine $\delta pH_{LA}$ for products prepared without the souring limitation methods of this invention.

| Ingredients | Method |
|---|---|
| 2 cups wheat berries | Grind fine, work into a dough, |
| 1 teaspoon salt (optional) | with or without salt, and then |

-continued

| Ingredients | Method |
|---|---|
| Soak water or plain water Sprout wheat berries for 24 hours (yields approximately 4 cups sprouted wheat). | add soak water or water to make a very thick cream. (This can be made in a blender.) Cover a large cookie sheet with wax paper, or cellophane and spread dough over all. Dehydrate at 100° F. in a dehydrator or in preheated, turned off oven. Mark in squares when half dry. When crisp, break into squares and stored in sealed container in a cool, dry place. Wheat crackers are more sturdy because of the gluten in the grain. |

The two cups of wheat berries weighed 14 ounces. The above method does not state how much water to add to make the very thick cream. In order to obtain the least amount of souring with this method, no extra water was added. One (heaping) teaspoon of salt which weighed 0.17 ounces was added.

The batter for the Wheat Crackers consisted of 14 ounces of wheat sprout solids and 11.4 ounces of water contributed by the wheat sprouts. Two ounces of batter was removed. The pH value of a 2:1 slurry of this batter was determined as follows: 2 ounces of this batter consisted of 1.1 ounces of sprout solids, and 0.833 ounces of water inherent in the sprouts. 1.3 ounces of neutral pH water was added to the 2 ounces of batter to make a 2:1 slurry, and the slurry was stirred well. Its composition, therefore, was 2.2 ounces water and 1.1 ounces of solids. The pH value of this 2:1 slurry ($pH_o$) was measured and was found to be 6.0.

Other than that the batter was spread about 1.1 cm thick directly on a dehydrator solid sheet, placed in a dehydrator tray and then dehydrated, rather than being first spread on a cookie sheet, the above method was followed as given. The batter was dehydrated until its water activity was reduced to less than 0.45. The average thickness of the final wheat crackers was about 0.9 cm.

The weight of the dehydrated crackers was 11.5 ounces. A 2:1 slurry was prepared from two ounces of neutral pH water and one ounce of the product. The pH of the 2:1 slurry ($pH_f$) was measured and found to be 4.65. Thus $\delta pH_{LA} = pH_o - pH_f = 1.35$. The product had a decidedly sour and somewhat unpleasant taste.

5.9.2 Example 2

NP CLASS Crackers

Note: The pH readings given below were obtained with an analog pH meter with a resolution of 0.1 pH. In those cases where the meter needle fell between two tenths markings, I have attempted to give my best estimation of the reading.

Using the seed sprouter described in the "Construction and Use of a Seed Sprouter to Sprout Seeds" section of this patent application (§5.3.1), ten pounds of wheat grain were sprouted for 18 hours. Then using the methods described in the "Description of Preferred Method to Manufacture Invention" section of this application (§5.5), NP CLASS Crackers were made. Other than not heating the batter to 104° F. before dehydrating it, the methods were followed as given. In order that one may more easily correlate the results I obtained with the steps of my method, I list the steps that had measurable outputs and the results obtained for those steps:

5.9.2.1 The Millet and Wheat Sprouts:

| Section | Step | Results Obtained |
|---|---|---|
| 5.5.4.2.1 | (5) | The pH of the 2:1 slurry prepared from millet sprouts was 5.88. The pH of the 2:1 slurry prepared from wheat sprouts was 6.0. |

5.9.2.2 Sprout Flour Based NP CLASS Crackers
1) The Cheesy Variety:

| Section | Step | Results Obtained | |
|---|---|---|---|
| 5.5.4.2.2.1 | (7) | $pH_o = 6.03$. | |
| 5.5.4.3 | (3) | $a_w = 0.918$. | |
| | (4) | The batter was allowed to set for 108 minutes. | |
| | (10) | Time Since Step (3) | $a_w$ |
| | | 11 hrs. 19 min. | 0.880 |
| | | 22 hrs. 37 min. | 0.593 |
| | | 35 hrs. 07 min. | 0.370 |
| | (12) | $pH_f = 4.91$; Therefore $\delta pH_{LA} = 1.12$. | |
| | (13) | The resultant crackers were 1/16th inches thick and half an inch wide. | |

2) The Sweet Variety:
  i. Using only 18 ounces of sesame seeds in batter:

| Section | Step | Results Obtained | |
|---|---|---|---|
| 5.5.4.2.2.2 | (2) | $a_w$ of aqueous honey mixture = 0.81 | |
| | (7) | Due to using only 18 ounces of sesame seeds in the batter, weight of batter was 4 pounds 12 ounces | |
| | (8) | $pH_o = 5.79$. | |
| 5.5.4.3 | (3) | $a_w = 0.80$. | |
| | (4) | The batter was allowed to set for 72 minutes. | |
| | (10) | Time Since Step (3) | $a_w$ |
| | | 11 hrs. 22 min. | 0.75 |
| | | 23 hrs. 7 min. | 0.57 |
| | | 34 hrs. 37 min. | 0.42 |
| | | 47 hrs. 22 min. | 0.40 |
| | (12) | $pH_f = 5.69$; Therefore $\delta pH_{LA} = 5.79 - 5.69 = 0.10$. | |
| | (13) | Due to having only used 18 ounces of sesame seed in the batter, insufficient water was absorbed from the batter at step 4, and there was considerable leakage through the screen. | | ii. A second batch using full 28 ounces of sesame seeds in the batter:

| Section | Step | Results Obtained | |
|---|---|---|---|
| 5.5.4.2.2.2 | (2) | $a_w$ of aqueous honey mixture = 0.81 | |
| | (7) | Weight of batter was 5 pounds 7.6 ounces | |
| | (8) | $pH_o = 5.79$. | |
| 5.5.4.3 | (3) | $a_w = 0.785$. | |
| | (4) | The batter set for 60 minutes. | |
| | (10) | Time Since Step (3) | $a_w$ |
| | | 10 hrs. 31 min. | 0.78 |
| | | 23 hrs. 16 min. | 0.668 |
| | | 34 hrs. 46 min. | 0.56 |
| | | 46 hrs. 46 min. | 0.453 |
| | | 59 hrs. 1 min. | 0.38 |
| | (12) | $pH_f = 5.69$; Therefore $\delta pH_{LA} = 0.10$. | |
| | (13) | There was negligible leakage through the screen. The resultant crackers were 1 inch thick and half an inch wide. | |

5.9.2.3 Liquefied Sprouts Based NP CLASS Crackers
1) The Cheesy Variety:

| Section | Step | Results Obtained | |
|---|---|---|---|
| 5.5.5.1 | (8) | $pH_o = 6.02$. | |
| 5.5.4.3 | (3) | $a_w = 0.918$. | |
| | (4) | The batter set for 45 minutes. | |
| | (10) | Time Since Step (3) | $a_w$ |
| | | 11 hrs. 19 min. | 0.880 |
| | | 22 hrs. 37 min. | 0.593 |
| | | 35 hrs. 07 min. | 0.370 |
| | (12) | $pH_f = 4.98$; Therefore $\delta pH_{LA} = 1.04$. | |
| | (13) | The resultant crackers were 1 1/16th inches thick and half an inch wide. | |

2) The Sweet Variety:

| Section | Step | Results Obtained | |
|---|---|---|---|
| 5.5.5.2 | (6) | $pH_o = 5.95$. | |
| 5.5.4.3 | (3) | $a_w = 0.805$. | |
| | (4) | The batter set for 108 minutes. | |
| | (10) | Time Since Step (3) | $a_w$ |
| | | 11 hrs. 44 min. | 0.687 |
| | | 23 hrs. 7 min. | 0.57 |
| | | 34 hrs. 37 min. | 0.42 |
| | | 47 hrs. 22 min. | 0.40 |
| | (12) | $pH_f = 5.97$; Therefore $\delta pH_{LA} = -0.02$. | |
| | (13) | The resultant crackers were about 15/16ths of an inch thick and half an inch wide. These crackers crumble easily. For a firmer cracker, either add more honey or a gluten-containing grain to the millet sprouts before liquefying them. | |

5.9.2.4 The Product Metrics attending the above results are:

| Product | (SG/H$_2$O) | (H$_2$O/In$^2$) | (PRD/In$^2$) | DPT | $\delta pH_{LA}$ |
|---|---|---|---|---|---|
| Wheat Crackers (Example 1) | 0.814 | 0.081 | 0.101 | 3/8 | 1.35 |
| Sprout Flour Based Cheesy | 1.000 | 0.199 | 0.397 | 1 1/16 | 1.12 |
| Sprout Flour Based Sweet | 1.553 | 0.128 | 0.498 | 1 | 0.10 |
| Liquefied Sprout Cheesy | 1.000 | 0.199 | 0.397 | 1 1/16 | 1.04 |
| Liquefied Sprout Sweet | 1.553 | 0.128 | 0.498 | 15/16 | 0.00 |

As can be seen, the $\delta pH_{LA}$ values for both the cheesy varieties of NP CLASS Crackers are less than 1.15. And the $\delta pH_{LA}$ values for both the sweet varieties of NP CLASS Crackers are less than 0.2. Therefore it can be concluded that only limited bacterial souring occurred during the manufacture of NP CLASS Crackers. Further the $\delta pH_{LA}$ of the sprouted wheat crackers prepared without the methods of my invention (see Example 1) is 1.35 (for a cracker only one-third as thick), thus demonstrating the kind of souring limited by the methods of my invention. Please note that although the sprouted wheat crackers had less than one-half the water per square inch of drying surface of the NP CLASS Cheesy Varieties and the final cracker was only about one-third as thick, they were 89% more sour. $(100\% * (10^{6-(pH \text{ of the sprouted wheat crackers})}$_ $10^{6-(pH \text{ of the sprout flour based NP CLASS cheesy variety})})/$ $(10^{6-(pH \text{ of the sprout flour based NP CLASS cheesy variety})})$_ $10^{6-(pH \text{ of unsoured sprouted wheat})})=89\%)$ 5.9.2.5 Computation of DV and DG for NP CLASS and Prior Art Products The values of DV, the Percentage Destruction of Viability Due to Heat, and DG, the Percentage Decrease in Growth Potential Due to Heat, of NP CLASS Crackers will now be compared with the corresponding values for a product whose process includes dehydration at 125° F. (52° C.) for eight hours. It will be shown that if soaking seeds had been subjected to the times and temperatures which the sprouts in NP CLASS Crackers experienced during their production process, neither their viability nor their growth potential would have experienced significant damage, whereas if they had been subjected to the times and temperatures of products prepared at 125° F. (52° C.), they would have had both their viability and growth potential severely damaged.

5.9.2.5.1 Computation of DV, the Percentage Destruction of Viability Due to Heat:

A. Computation of DV for NP CLASS Crackers.

The DV value for NP CLASS Crackers was computed as follows:

(1) During their processing, NP CLASS Crackers were exposed to the temperature of 104° F. (40° C.) for periods of time in excess of 8 hours.
(2) Therefore the average elevated temperature of exposure, $T_{av}$, is 104° F. (40° C.).
(3) Elevated Temperature Soak Time, $R_e$, is 8 hours.
(4) Room Temperature Soak Time, $R_o$, was computed as follows:

$R_o=8$ hours$-R_e=0$.

(5) 50 wheat grains were soaked in distilled water in a sealed container (to prevent evaporation) for 8 hours at a temperature of 104° F. (40° C.)
(6) 50 wheat grains were soaked in distilled water for eight hours at 30° C.
(7) The grain of step 5 was sprouted for 48 hours. 47 of the 50 grains sprouted. Therefore, $n_e=47$.
(8) The grain of step 6 was sprouted for 48 hours. 48 of the 50 grains sprouted. Therefore, $n_r=48$.
(9) DV was computed for this product as follows:

$DV=[(1/n_r)*(n_r-n_e)\pm 2/n_r]*100\%=2\%\pm 4\%=0$ to 6%.

B. Computation of DV for Heat Damaged Products.

The DV value of a product whose process included dehydration for 8 hours at 125° F. (52° C.) was computed as follows:

(1) The average elevated temperature of exposure, $T_{av}$, is 125° F. (52° C.)
(2) Elevated Temperature Soak Time, $R_e$, is 8 hours.
(3) Room Temperature Soak Time, $R_o$, was computed as follows:

$R_o=8$ hours$-R_e=0$.

(4) 50 wheat grains were soaked in distilled water in a sealed container (to prevent evaporation) for 8 hours at a temperature of 125° F. (52° C.)

(5) The grain of step 4 was sprouted for 48 hours. None of the 50 grains sprouted. Therefore, $n_e=0$.
(6) From §5.9.2.5.1A step (8), $n_r$ is 48.
(7) DV was computed for this product as follows:

$DV=[(1/n_r)*(n_r-n_e)\pm 2/n_r]*100\%=100\%\pm 4\%=96\%$ to 100%.

Therefore, it can be concluded that a temperature of 125° F. (52° C.) for eight hours is injurious to the sprouting capability of wheat and millet grain whereas a temperature of 104° F. (40° C.) for 8 hours is but slightly injurious to the sprouting capability of these grains.

The following table summarizes the results obtained in determining the DV values of various products:

| Soak Water Temperature | No. Out of 50 Sprouting | DV (%) |
|---|---|---|
| 70° F. | 48 | 0 |
| 104° F. | 47 | 0 to 6 |
| 125° F. | 0 | 96 to 100 |

5.9.2.5.2 Computation of DG, the Percentage Decrease in Growth Potential Due to Heat:

A. Computation of DG for NP CLASS Crackers.

The DG value for NP CLASS Crackers was computed as follows:

(1) The batter of NP CLASS crackers was exposed to a temperature of 104° F. (40° C.) for periods of time in excess of 8 hours.
(2) Therefore the average elevated temperature of exposure, $T_{av}$, is 104° F. (40° C.).
(3) Elevated Temperature Soak Time, $R_e$, is 8 hours.
(4) Room Temperature Soak Time, $R_o$,=8 hours$-R_e=0$.
(5) One pound each of wheat and millet were soaked in distilled water in a sealed thermally conductive container for 8 hours at a temperature of 104° F.
(6) After soaking for 8 hours, the wheat seeds weighed 1 pound 8.6 ounces. Thus $W_{eo}$ for the wheat=1.537 pounds. The millet seeds now weighed 1 pound 5.6 ounces. Thus $W_{eo}$ for the millet=1.35 pounds.
(7) One pound each of wheat and millet were soaked in distilled water for 8 hours at a temperature of 30° C.
(8) After soaking for a total of 8 hours, the wheat seeds weighed 1 pound 7.4 ounces. Thus $W_{ro}$ for the wheat= 1.462 pounds. The millet seeds now weighed 1 pound 6.1 ounces. Thus $W_{ro}$ for the millet=1.381 pounds.
(9) The seeds of step 6 were sprouted for 48 hours. $W_e$ for the wheat sprouts, $We_{wheat}$=2 pounds 4.5 ounces=2.281 pounds. We for the millet sprouts, $We_{millet}$=1 pound 15.4 ounces=1.963 pounds. $\delta We_{wheat}=We_{wheat}-Weo_{wheat}=$ 0.744 pounds. $\delta We_{millet}=We_{millet}-Weo_{millet}=0.613$ pounds. $\delta We_{comb}$, the combined weight gain of both wheat and millet sprouts,$=\delta We_{wheat}+\delta We_{millet}=1.357$ pounds. It should be noted that more than 95% of the wheat and millet seeds sprouted.
(10) The seeds of step 8 were sprouted for 48 hours. Wr for the wheat sprouts, $Wr_{wheat}$=2 pounds 6.9 ounces=2.431 pounds. Wr for the millet sprouts, $Wr_{millet}$=2 pounds 2.5 ounces=2.156 pounds. $\delta Wr_{wheat}=Wr_{wheat}-Wro_{wheat}=$ 0.969 pounds. $\delta Wr_{millet}=Wr_{millet}-Wro_{millet}=0.775$ pounds. $\delta Wr_{comb}$, the combined weight gain of both wheat and millet sprouts,$=\delta Wr_{wheat}+\delta Wr_{millet}=1.774$. More than 95% of the wheat and millet seeds sprouted.
(11) DG for this product was computed as follows:

$DG_{wheat\ sprouts}=[(\delta Wr_{wheat}-\delta We_{wheat})/\delta Wr_{wheat}]*100\%=23.2\%$.

$DG_{millet\ sprouts}=[(\delta Wr_{millet}-\delta We_{millet})/\delta Wr_{millet}]*100\%=20.9\%$.

$DG_{ave}=(DG_{wheat\ sprouts}+DG_{millet\ sprouts})/2=22.1\%$

B. Computation of DG for Heat Damaged Products.

The DG value of a product whose process included dehydration for 8 hours at 125° F. (52° C.) was computed as follows:
(1) The average elevated temperature of exposure, $T_{av}$, is 125° F. (52° C.)
(2) Elevated Temperature Soak Time, $R_e$, is 8 hours.
(3) Room Temperature Soak Time, $R_o$,=8 hours–$R_e$=0.
(4) One pound each of wheat and millet were soaked in distilled water in a sealed thermally conductive container for 8 hours at a temperature of 125° F.
(5) After soaking for a total of 8 hours, the wheat seeds weighed 1 pound 10.9 ounces. Thus $W_{eo}$ for the wheat= 1.681 pounds. The millet seeds now weighed 1 pound 6.6 ounces. Thus $W_{eo}$ for the millet=1.412 pounds.
(6) The seeds of step 5 were sprouted for 48 hours. We for the wheat sprouts, $We_{wheat}$=1 pound 13.3 ounces=1.831 pounds. We for the millet sprouts, $We_{millet}$=1 pound 7.4 ounces=1.462 pounds. $\delta We_{wheat}=We_{wheat}-Weo_{wheat}=$ 0.15 pounds. $\delta We_{millet}=We_{millet}-Weo_{millet}=0.05$ pounds. $\delta We_{comb}$, the combined weight gain of both wheat and millet sprouts,=$\delta We_{wheat}+\delta We_{millet}$=0.20 pounds. None of the wheat or millet seeds sprouted. The apparent gain in weight of the wheat and millet seeds over the 48 hour period is due to the wheat and millet seeds becoming more and more water-logged. (It should be noted that after 48 hours of attempting to sprout these seeds, both the wheat and millet seeds began to develop an offensive odor.)
(7) From 5.9.2.5.2A step (10), $W_r$ for the wheat sprouts is 2.431 pounds. Likewise, $W_r$ for the millet sprouts is 2.156 pounds.
(8) DG for this product was computed as follows:

$$DG_{wheat\ sprouts}=[(\delta Wr_{wheat}-\delta We_{wheat})/\delta Wr_{wheat}]*100\%=84.5\%.$$

$$DG_{millet\ sprouts}=[(\delta Wr_{millet}-\delta We_{millet})/\delta Wr_{millet}]*100\%=93.5\%.$$

$$DG_{ave}=(DG_{wheat\ sprouts}+DG_{millet\ sprouts})/2=89\%$$

Again, it can be concluded that a temperature of 125° F. (52° C.) for eight hours is injurious to the sprouting capability of wheat and millet grain whereas a temperature of 104° F. (40° C.) for 8 hours is only slightly injurious to the sprouting capability of those grains.

The following table summarizes the results obtained in determining the DG values of various products:

| Soak Water Temperature | Combined Weight Gain of 1 pound of Wheat and 1 pound of Millet as Result of Sprouting | DGave (%) |
| --- | --- | --- |
| 70° F. | 1.774 pounds | 0 |
| 104° F. | 1.357 pounds | 22 |
| 125° F. | 0.200 pounds | 89 |

The above discussions, the definitions of DG and DV, and the above results are the basis of my claim that both the DG and DV values of NP CLASS Crackers are less than 30%.

5.9.3 Example 3

Crackers Prepared With Honey But Without Soft Seeds

Various batters were prepared from 8 ounces of milled sprouts and solutions of honey in distilled water of varying percentages of honey. Sesame seeds were not included. The batters were poured on circular solid sheets and dehydrated. The resultant products were then milled and slurries were prepared consisting of 2 parts by weight the product and 4 parts by weight neutral pH water. The pH of these slurries were then measured. The results were as follows:

| Batch | Water | Honey | Honey as % of Solution | % Honey in Final Product | pH$_o$ | pH$_f$ | $\delta$pH$_{LA}$ |
| --- | --- | --- | --- | --- | --- | --- | --- |
| 1 | 15 oz. | 1 oz. | 6.25 | 11.1 | 6.09 | 4.7 | 1.39 |
| 2 | 13 oz. | 3 oz. | 18.75 | 27.3 | 5.99 | 4.82 | 1.17 |
| 3 | 12 oz. | 4 oz. | 25.00 | 33.3 | 5.88 | 5.03 | 0.85 |
| 4 | 10 oz. | 3 oz. | 23.07 | 33.3 | 5.88 | 5.22 | 0.66 |
| 5 | 11 oz. | 5 oz. | 31.25 | 38.5 | 5.78 | 5.42 | 0.36 |
| 6 | 10 oz. | 6 oz. | 37.50 | 42.9 | 5.70 | 5.70 | 0.00 |

From this we see that it is not obvious how to best use honey to limit souring in a sprouted grain product. The honey flavored products made by the methods of Applicant's invention are only 22% by weight honey and yet have a $\delta$pH$_{LA}$ of 0.1. The honey flavored sprout crackers of this example require almost twice as much honey in the final product to approach that value of $\delta$pH$_{LA}$.

5.9.4 Example 4

Crackers Prepared With Dried Teff Sprouts Instead of Sesame Seeds

Three batches of batter were made. The first batch contained 6 ounces of sprouted wheat flour and 10 ounces of distilled water. This batch was poured on a single dehydrator solid sheet and dehydrated. A slurry consisting of 0.5 ounces of the resultant crackers and 1.0 ounces of neutral pH water was prepared and the pH value of this slurry was measured. The pH value was 4.83.

The second batch had the same ingredients as the first plus 6 ounces of whole dried teff sprouts. (Whole dried teff sprouts are somewhat smaller than hulled sesame seeds but it would be expected that they would affect the batter in approximately the same way, i.e. making it thicker, and possibly taking some of the water away from the milled wheat sprouts.) The batter was poured onto a single dehydrator sheet and dehydrated. Again a slurry was prepared from the resultant cracker and the pH value measured. The pH value was 4.83.

The third batch had the same ingredients as the first plus 6 ounces of whole hulled sesame seeds. The batter was poured onto a single dehydrator sheet and dehydrated. Again a slurry was prepared from the resultant cracker and the pH value measured. The pH value was 4.99. As can be seen, whole hulled sesame affects the batter in a different way than whole teff sprouts. Apparently unsprouted seeds absorb much more water from the batter than dried sprouted seeds do.

5.9.5 Example 5

Crackers Made With Varying Amounts of Sesame Seed

Various batches of sprouted wheat and whole hulled sesame seed batter were made from 6 ounces of milled sprouted wheat, 10 ounces of distilled water and varying amounts of whole hulled sesame seeds. Each batch was poured onto a single dehydrator solid sheet and dehydrated. A slurry consisting of 0.5 ounces of the resultant crackers and 1.0 ounces of neutral pH water was prepared from each batch and the pH value of each slurry was measured. The following table correlates the amount of hulled sesame seeds in each batch with the pH value of the slurry prepared from that batch:

| Weight of Sesame Seed (ounces) | pH Value of Slurry | $\delta pH_{LA}$ |
|---|---|---|
| 0.0 | 4.61 | 1.4 |
| 3.0 | 4.75 | 1.3 |
| 6.0 | 4.84 | 1.2 |
| 9.0 | 4.88 | 1.15 |

Although the more whole hulled sesame seeds that are added, the deeper the batter on the dehydrator sheet, and the more this might be expected to interfere with dehydration, adding sesame seeds affects the resultant batter in a very positive way taste-wise.

5.9.6 Example 6

Crackers Prepared With 104° F. Water

Two batches of sprouted wheat and whole hulled sesame batter were prepared. Both batches consisted of 6 ounces of sprouted wheat, 6 ounces of whole hulled sesame, and 10 ounces of distilled water. The first batch was prepared with 66° F. water, and the second batch with 104° F. water. Both batches were poured onto single dehydrator trays and dehydrated. Slurries were prepared from the resultant crackers and the pH values measured. The pH value of the crackers prepared with 66° F. water was 4.72. The pH value of the crackers prepared with 104° F. water was 4.76, and these crackers did not taste as sour as the crackers prepared with 66° F. water.

5.9.7 Example 7

Crackers Made With Varying Amounts of Honey

Two batches of batter were made, each consisting of 6 ounces of milled sprouted wheat, 6 ounces of whole hulled sesame seeds, 10 ounces of distilled water and varying amounts of raw unfiltered honey. Each batch was poured onto a single dehydrator sheet and dehydrated. A slurry consisting of 0.5 ounces of the resultant crackers and 1.0 ounces of neutral pH water was prepared from each batch and the pH value of each slurry was measured. The following table correlates the amount of honey (in ounces) in each batch with the pH value of the slurry prepared from that batch:

| Weight of Honey | % By Weight Honey in Cracker | pH Value | $\delta pH_{LA}$ |
|---|---|---|---|
| 1.3 | 10 | 4.90 | 0.9 |
| 3.0 | 20 | 5.06 | 0.7 |

Although the more honey that is added, the deeper the batter on the dehydrator sheet, and the more this might be expected to interfere with dehydration, adding honey affects the resultant batter in a very positive way taste-wise.

5.9.8 Example 8

Crackers Made With Soaked and Dried Sesame Seed

"Cheesy" Sprout Chips were made from milled sprouted wheat and whole hulled sesame seeds. Twenty-two ounces of batter was poured onto a dehydrator solid sheet. The batter was then dehydrated. A slurry consisting of 1.0 ounces of the resultant crackers and 2.0 ounces of neutral pH water was prepared, and the pH value of the slurry was measured. The pH value of the slurry was 4.79.

"Cheesy" Sprout Chips were again made as above but this time soaked and dried whole hulled sesame seeds were used instead of unsoaked hulled sesame seeds. Again a slurry was prepared from the resultant crackers, and the pH value of the slurry was measured. The pH value of this slurry was 4.80. Apparently it does not matter (as far as ability to affect bacterial souring is concerned) whether soaked and dried or unsoaked hulled sesame seeds are used.

5.9.9 Example 9

Sprout Flour Based NP CLASS Crackers Made With Fructose

Using the methods described in the "Description of Preferred Method to Manufacture Invention" section of this application (§5.5), Sprout Flour Based NP CLASS Crackers were made with an 44% strength aqueous fructose solution as the water activity depressant. A batter was prepared consisting of 7 ounces of dried millet sprouts, 3.542 ounces of fructose, 4.508 ounces of distilled water, and 7 ounces of sesame seeds. Other than not heating the batter to 104° F. before dehydrating it, the methods were followed as given. The resultant crackers not only held together exceptionally well, but they were also very soft. Fructose is an exceptionally attractive agglutinant. In order that one may more easily correlate the results I obtained with the steps of my method, I list the steps that had measurable outputs and the results obtained for those steps:

| Section | Step | Results Obtained |
|---|---|---|
| 5.5.4.2.2.2 | (2) | $a_w$ of aqueous sugar solution = 0.832 |
| | (7) | Weight of batter was 22.05 ounces |
| | (8) | $pH_o = 6.03$. |
| 5.5.4.3 | (12) | $pH_f = 6.02$; Therefore $\delta pH_{LA} = 0.01$. |
| | (13) | There was negligible leakage of the batter through the screen. |

5.9.10 Example 10

Sprout Based NP CLASS Crackers Made With a 22% Strength Noniodized Salt Solution.

Using the methods described in the "Description of Preferred Method to Manufacture Invention" section of this application (§5.5), Sprout Based NP CLASS Crackers were made with a 22% strength aqueous salt solution as the water activity depressant. A batter was prepared consisting of 3.5 ounces of dried millet sprouts, 3.5 ounces of dried wheat sprouts, 1.779 ounces of salt, 6.311 ounces of distilled water, and 7 ounces of sesame seeds. Other than not heating the batter to 104° F. before dehydrating it, the methods were followed as given. In order that one may more easily correlate the results I obtained with the steps of my method, I list the steps that had measurable outputs and the results obtained for those steps:

| Section | Step | Results Obtained |
|---|---|---|
| 5.5.4.2.2.2 | (2) | $a_w$ of 22% strength aqueous salt solution = 0.770. |
|  | (7) | Weight of batter was 22.09 ounces |
|  | (8) | $pH_o$ = 5.99. |
| 5.5.4.3 | (12) | $pH_f$ = 5.69; Therefore $\delta pH_{LA}$ = 0.30. |
|  | (13) | There was minor leakage of the batter through the screen. |

17. 5.9.11 Example 11

Sprout Based NP CLASS Crackers Made With a 25% Strength Noniodized Salt Solution Using the methods described in the "Description of Preferred Method to Manufacture Invention" section of this application (§5.5), Sprout Based NP CLASS Crackers were made with a 25% strength aqueous salt solution as the water activity depressant. It should be noted that this is near saturation, as 100 parts by weight of water will dissolve 35.87 parts of salt at 200 C (this would be a 26.4% strength solution). A batter was prepared consisting of 3.5 ounces of dried millet sprouts, 3.5 ounces of dried wheat sprouts, 2.02 ounces of salt, 6.06 ounces of distilled water, and 7 ounces of sesame seeds. Other than not heating the batter to 104° F. before dehydrating it, the methods were followed as given. In order that one may more easily correlate the results I obtained with the steps of my method, I list the steps that had measurable outputs and the results obtained for those steps:

| Section | Step | Results Obtained |
|---|---|---|
| 5.5.4.2.2.2 | (2) | $a_w$ of 25% strength aqueous salt solution = 0.766. |
|  | (7) | Weight of batter was 22.08 ounces |
|  | (8) | $pH_o$ = 5.75. |
| 5.5.4.3 | (12) | $pH_f$ =5.65; Therefore $\delta pH_{LA}$ = 0.10. |
|  | (13) | There was minor leakage of the batter through the screen. |

As can be seen, the $\delta pH_{LA}$ values for both the NP CLASS Crackers prepared with the aqueous fructose solution and with the 25% strength aqueous salt solution as the water activity depressants are less than 0.15. Therefore it can be concluded that negligible bacterial souring (if any) occurred during the processing of the NP CLASS Crackers prepared with the aqueous fructose solution, and a small amount of bacterial souring occurred during the processing of the NP CLASS Crackers prepared with the aqueous salt solution. As was previously mentioned, the $\delta pH_{LA}$ of the sprouted wheat crackers prepared without the methods of this invention (see Example 1) was 1.35, thus demonstrating again the kind of souring limited by the methods of this invention.

5.9.12 Example 12

The Absorbent Power of Dehydrated Sliced Carrots 14.1 ounces of fresh carrots were shredded with the Presto shredder-slicer. The shredded carrots were then dehydrated at 105° F. After 11½ hours of dehydration, the carrots weighed 1.6 ounces. Therefore, the carrots had lost 12.5 ounces of water while they were being dehydrated. Hence these carrots were at least 88.6% water. One pint (16 ounces) of water was added to these carrots, and the carrots were weighed every 30 minutes. The amount of water absorbed by these carrots versus time is shown in the following table:

| Elapsed Time | Amount of Water Absorbed by 1.6 Ounces Dehydrated Carrots |
|---|---|
| 0 minutes | 0 ounces |
| 15 minutes | 7.9 ounces |
| 30 minutes | 9.1 ounces |
| 60 minutes | 10.1 ounces |

Therefore, 1 ounce of dehydrated carrots will absorb 6.25 ounces of water in 60 minutes. As was noted previously, 16 ounces of whole hulled sesame seed will absorb 6.2 ounces of water in 3 hours. Hence the absorptive power of dehydrated shredded carrots is over $(6.25/(6.2/16))=16$ times greater than that of hulled sesame seed.

5.9.13 Example 13

Sprout Flour Based NP CLASS Crackers Wherein the Pieces of Absorbent Vegetal Matter are Dehydrated Sliced Carrots Sprout Flour Based NP CLASS Crackers were made by the method of §5.5.6. The shredded dehydrated carrots stirred easily into the sprout flour batter. The batter was spread on a flat glass sheet. After 20 minutes the batter was stiff enough to be sliced and placed on dehydrator screens. After dehydrating to a water activity of 0.45 the crackers had a very mild carrot-like taste with not even the slightest trace of sourness.

5.9.14 Example 14

RUSTIC Sprouted Grain Products

Note: The pH readings given below were obtained with an analog pH meter with a resolution of 0.1 pH. In those cases where the meter needle fell between two tenths markings, I have attempted to give my best estimation of the reading.

Raw sprouted wheat crackers were made without using special methods of any kind to prevent bacterial souring in order to determine the level of acidity of such products. Two ounces of these crackers were milled and mixed with 4 ounces of water. After allowing suspended particles to settle, the pH of this mixture was measured and was found to be 4.5. The product had a decidedly sour and somewhat unpleasant taste.

Using the seed sprouter described in the §5.3.1, Construction and Use of a Seed Sprouter to Sprout Seeds", ten pounds of wheat grain were sprouted for 18 hours. The sprouts were then dehydrated for 10 hours at a temperature of 104° F. After 10 hours of dehydration, the water activity of the sprouts was about 0.9. In order that one may more easily correlate the results I obtained for this example with the steps of my method, the steps that had measurable outputs and the results obtained for those steps are shown below:

| Section | Step | Results Obtained |
|---|---|---|
| 5.6.6 | (32) | 27 oz. of unflavored compressed sprouts were obtained. An X-ACTO Knife was used to slice 10 sprouts. The average force needed to slice a sprout in half was 2 lbs. 12.9 oz. |

| | | -continued |
|---|---|---|
| 5.6.7 | (35) | The pH of Bernard Jensen's Apple Concentrate is 3.9. |
| | (37) | The flavored compressed sprouts weigh 45.5 ounces. Apple Concentrate on Sprouts (oz.) = 0.2* (45.5 − 32) = 2.7 ounces. Apple Concentrate on $1/16$th of product = $(1/16)*(2.7) = 0.169$ ounces. |
| | (42) | The flavored compressed sprouts weigh 32 ounces. Two ounces was set aside for the pH measurement of step 75. |
| 5.6.8 | (45) | The honey covered sprouts weigh 70 oz. Honey on Sprouts (oz.) = 0.8*(70 − 40) = 24 oz. Honey on $1/20$th of product = $(1/20)*(24) = 1.2$ oz. |
| | (50) | The solidified layers of compressed sprouts weigh 60 ounces. Three ounces was set aside for the pH measurement of step 75. |
| | (59) | The solidified layers of compressed sprouts weigh 53 ounces. Two ounces of this product was set aside for the pH measurement of step 75. The sprout cakes are very thin after their water activity is reduced below 0.70. It was found in previous experimentation, however, that if thicker sprout cakes are made, the outer surfaces of the cakes become dry while the interior is still moist. A week of drying in the refrigerator was not found sufficient to dry the moist interior of a thick sprout cake to a water activity of less than 0.70. And it is very difficult to measure the water activity of the interior of a sprout cake after the outer surfaces have dried. The instructions of my above method, however, result in a very thin product which dries more satisfactorily. |
| 5.6.9 | (60) | The pH values of the products set aside at the various steps were then measured at the various substeps under step 75. The results are as follows: |

| Substep | Product | pH |
|---|---|---|
| A. (b) | Aqueous mixture of uncompressed dried sprouts set aside at step 26. | 5.97 |
| A. (d) | Aqueous mixture of uncompressed dried sprouts plus apple concentrate | 5.4 |
| A. (g) | Aqueous mixture of uncompressed dried sprouts plus honey | 5.88 |
| B. (b) | Aqueous mixture of compressed dried sprouts set aside at step 32 | 6.0 |
| C. (b) | Aqueous mixture of flavored compressed sprouts set aside at step 42 | 5.36 |
| D. (b) | Aqueous mixture of honey-sweetened compressed sprout cake set aside at step 50 | 5.5 |
| E. (b) | Aqueous mixture of unflavored compressed sprout cake set aside at step 59 | 6.0 |

From these values, $\delta pH_{la}$, the drop in the pH value of a product which occurs when lactic acid bacteria convert the sugars of that product to lactic acid during the preparation of that product, can be computed for the end-products set aside at the various steps. The results are as follows:

| Substep | End Product/Computation | $\delta pH_{la}$ |
|---|---|---|
| B. (b) | Compressed dried sprouts set aside at step 32. $pH_{A.(b)} - pH_{B.(b)} =$ | −0.03 |
| C. (b) | Flavored compressed sprouts set aside at step 42. $pH_{A.(d)} - pH_{C.(b)} =$ | 0.04 |
| D. (b) | Honey-sweetened compressed sprout cake set aside at step 50. $pH_{A.(g)} - pH_{D.(b)} =$ | 0.35 |
| E. (b) | Unflavored compressed sprout cake set aside at step 59. $pH_{A.(b)} - pH_{E.(b)} =$ | −0.03 |

Note: The computation at Substeps B. (b) and E. (b) resulted in slightly negative values of $\delta pH_{la}$ probably due to small errors in reading the pH meter.

As can be seen, $\delta pH_{la}$ for the compressed dried sprouts, the flavored compressed sprouts, and the unflavored compressed sprout cake are all less than 0.1. The reason for the somewhat low pH reading at D.(b), and thus the somewhat high value of $\delta pH_{la}$ for the honey-sweetened compressed sprout cake is that I was not able to mill the honey-sweetened compressed sprout cake to as fine a flour as in the other substeps due to the high concentration of honey which caused particles of sprouted wheat to cling together and coat the inside of the coffee-mill before milling was complete. Consequently the sprouted wheat did not contribute as strongly to the pH reading as in the other substeps. But the honey of the product which is more acidic than the sprouted wheat made the same acid contribution to pH as in the other substeps involving honey. Consequently the honey which has an acid pH when mixed with water contributed unduly to the pH reading when compared to the contribution of the sprouted wheat. I believe that if I had access to more suitable milling equipment, the pH reading at substep D.(b) would more closely approximate the pH reading at substep A.(g). At any rate the honey-sweetened compressed sprout cake tasted very sweet and not at all sour. (Please see Example 2 for a repeat of the manufacture of honey-sweetened compressed sprout cake with a lesser amount of honey. As will be shown there, $\delta pH_{la}$ for the remanufactured honey-sweetened compressed sprout cake is 0.0.) Therefore, when the recomputation of $\delta pH_{la}$ in Example 2 is taken into consideration, it can then be concluded that no discernible bacterial souring occurred during the processing of the products of this invention.

Computation of DV and DG for RUSTIC Sprouted Grain Products and Background Art Products The values of DV, the Percentage Destruction of Viability Due to Heat, and DG, the Percentage Decrease in Growth Potential Due to Heat, of RUSTIC Sprouted Grain Products will now be compared with the corresponding values for a product whose process includes dehydration at 125° F. (52° C.) for eight hours. It will be shown that if soaking seeds had been subjected to the times and temperatures which the sprouts in RUSTIC Sprouted Grain Products experienced during their production process, neither their viability nor their growth potential would have experienced significant damage, whereas if they had been subjected to the times and temperatures of products prepared at 1250 F (52° C.), they would have had both their viability and growth potential severely damaged.

Computation of DV, the Percentage Destruction of Viability Due to Heat:

A. Computation of DV for RUSTIC Sprouted Grain Products.

The DV value for RUSTIC Sprouted Grain Products was computed as follows:

(1) During their processing, RUSTIC Sprouted Grain Products were exposed to the temperature of 104° F. (40° C.) for periods of time in excess of 8 hours.

(2) Therefore the average elevated temperature of exposure, $T_{av}$, is 104° F. (40° C.).

(3) Elevated Temperature Soak Time, $R_e$, is 8 hours.
(4) Room Temperature Soak Time, $R_o$, was computed as follows:

$$R_o = 8 \text{ hours} - R_e = 0.$$

(5) 50 wheat grains were soaked in distilled water in a sealed container (to prevent evaporation) for 8 hours at a temperature of 104° F. (40° C.)
(6) 50 wheat grains were soaked in distilled water for eight hours at 30° C.
(7) The grain of step 5 was sprouted for 48 hours. 47 of the 50 grains sprouted. Therefore, $n_e = 47$.
(8) The grain of step 6 was sprouted for 48 hours. 48 of the 50 grains sprouted. Therefore, $n_r = 48$.
(9) DV was computed for this product as follows:

$$DV = [(1/n_r)*(n_r - n_e) \pm 2/n_r]*100\% = 2\% \pm 4\% = 0 \text{ to } 6\%.$$

B. Computation of DV for Heat Damaged Products.

The DV value of a product whose process included dehydration for 8 hours at 125° F. (52° C.) was computed as follows:
(1) The average elevated temperature of exposure, $T_{av}$, is 125° F. (52° C.)
(2) Elevated Temperature Soak Time, $R_e$, is 8 hours.
(3) Room Temperature Soak Time, $R_o$, was computed as follows:

$$R_o = 8 \text{ hours} - R_e = 0.$$

(4) 50 wheat grains were soaked in distilled water in a sealed container (to prevent evaporation) for 8 hours at a temperature of 125° F. (52° C.)
(5) The grain of step 4 was sprouted for 48 hours. None of the 50 grains sprouted. Therefore, $n_e = 0$.
(6) From Section A step (8) above, $n_r$ is 48.
(7) DV was computed for this product as follows:

$$DV = [(1/n_r)*(n_r - n_e) + 2/n_r]*100\% = 100\% \pm 4\% = 96\% \text{ to } 100\%.$$

Therefore, it can be concluded that a temperature of 125° F. (52° C.) for eight hours is injurious to the sprouting capability of wheat and millet grain whereas a temperature of 104° F. (40° C.) for 8 hours is but slightly injurious to the sprouting capability of these grains.

The below table summarizes the results obtained in determining the DV values of various products:

| Soak Water Temperature | No. Out of 50 Sprouting | DV (%) |
|---|---|---|
| 70° F. | 48 | 0 |
| 104° F. | 47 | 0 to 6 |
| 125° F. | 0 | 96 to 100 |

Computation of DG, the Percentage Decrease in Growth Potential Due to Heat:

A. Computation of DG for RUSTIC Sprouted Grain Products.

The DG value for RUSTIC Sprouted Grain Products was computed as follows:
(1) During their preparation RUSTIC Sprouted Grain Products were exposed to a temperature of 104° F. (40° C.) for periods of time in excess of 8 hours.
(2) Therefore the average elevated temperature of exposure, $T_{av}$, is 104° F.. (40° C.).
(3) Elevated Temperature Soak Time, $R_e$, is 8 hours.
(4) Room Temperature Soak Time, $R_o$, = 8 hours – $R_e$ = 0.
(5) One pound each of wheat and millet were soaked in distilled water in a sealed thermally conductive container for 8 hours at a temperature of 104° F.
(6) After soaking for 8 hours, the wheat seeds weighed 1 lb. 8.6 oz. Thus $W_{eo}$ for the wheat=1.537 lbs. The millet seeds now weighed 1 lb. 5.6 oz. Thus $W_{eo}$ for the millet=1.35 lbs.
(7) One pound each of wheat and millet were soaked in distilled water for 8 hours at a temperature of 30° C.
(8) After soaking for a total of 8 hours, the wheat seeds weighed 1 lb. 7.4 oz. Thus Wro for the wheat=1.462 lbs. The millet seeds now weighed 1 lb. 6.1 oz. Thus $W_{ro}$ for the millet=1.381 lbs.
(9) The seeds of step 6 were sprouted for 48 hours. We for the wheat sprouts, $We_{wheat}$=2 lbs. 4.5 oz.=2.281 lbs. We for the millet sprouts, $We_{millet}$=1 lb. 15.4 oz.=1.963 lbs. $\delta We_{wheat} = We_{wheat} - Weo_{wheat} = 0.744$ lbs. $\delta We_{millet} = We_{millet} - Weo_{millet} = 0.613$. $\delta We_{comb}$, the combined weight gain of both wheat and millet sprouts,$= \delta We_{wheat} + \delta We_{millet} = 1.357$ lbs. It should be noted that more than 95% of the wheat and millet seeds sprouted.
(10) The seeds of step 8 were sprouted for 48 hours. Wr for the wheat sprouts, $Wr_{wheat}$=2 lbs. 6.9 oz.=2.431 lbs. Wr for the millet sprouts, $Wr_{millet}$=2 lbs. 2.5 oz.=2.156 lbs. $\delta Wr_{wheat} = Wr_{wheat} - Wro_{wheat} = 0.969$ lbs. $\delta Wr_{millet} = Wr_{millet} - Wro_{millet} = 0.775$ lbs. $\delta Wr_{comb}$, the combined weight gain of both wheat and millet sprouts,$= \delta Wr_{wheat} + \delta Wr_{millet} = 1.774$. More than 95% of the wheat and millet seeds sprouted.
(11) DG for this product was computed as follows:

$$DG_{wheat\ sprouts} = [(\delta Wr_{wheat} - We_{wheat})/\delta Wr_{wheat}]*100\% = 23.2\%.$$

$$DG_{millet\ sprouts} = [(\delta Wr_{millet} - \delta We_{millet})/\delta Wr_{millet}]*100\% = 20.9\%.$$

$$DG_{ave} = (DG_{wheat\ sprouts} + DG_{millet\ sprouts})/2 = 22.1\%.$$

B. Computation of DG for Heat Damaged Products.

The DG value of a product whose process included dehydration for 8 hours at 1250 F (52° C.) was computed as follows:
(1) The average elevated temperature of exposure, $T_{av}$, is 125° F. (52° C.)
(2) Elevated Temperature Soak Time, $R_e$, is 8 hours.
(3) Room Temperature Soak Time, $R_o$,=8 hours–$R_e$=0.
(4) One pound each of wheat and millet were soaked in distilled water in a sealed thermally conductive container for 8 hours at a temperature of 125° F.
(5) After soaking for a total of 8 hours, the wheat seeds weighed 1 lb. 10.9 oz. Thus $W_{eo}$ for the wheat=1.681 lbs. The millet seeds now weighed 1 lb. 6.6 oz. Thus $W_{eo}$ for the millet=1.412 lbs.
(6) The seeds of step 5 were sprouted for 48 hours. $W_e$ for the wheat sprouts, $We_{wheat}$=1 lb. 13.3 oz.=1.831. We for the millet sprouts, $We_{millet}$=1 lb. 7.4 oz.=1.462. $\delta We_{wheat} = We_{wheat} - Weo_{wheat} = 0.15$ lbs. $\delta We_{millet} = We_{millet} - Weo_{millet} = 0.05$ lbs. $\delta We_{comb}$, the combined weight gain of both wheat and millet sprouts,$= \delta We_{wheat} + \delta We_{millet} = 0.20$ lbs. None of the wheat or millet seeds sprouted. The apparent gain in weight of the wheat and millet seeds over the 48 hour period is due to the wheat and millet seeds becoming more and more water-logged. (It should be noted that after 48 hours of attempting to sprout, both the wheat and millet seeds began to develop an offensive odor.)
(7) From step (10) of the Computation of DG for RUSTIC Sprouted Grain Products, $W_r$ for the wheat sprouts is 2.431 lbs. Likewise, $W_r$ for the millet sprouts is 2.156 lbs.

(8) DG for this product was computed as follows:

$$DG_{wheat\ sprouts} = [(\delta Wr_{wheat} - \delta We_{wheat})/\delta Wr_{wheat}] * 100\% = 84.5\%.$$

$$DG_{millet\ sprouts} = [(\delta Wr_{millet} - \delta We_{millet})/\delta Wr_{millet}] * 100\% = 93.5\%.$$

$$DG_{ave} = (DG_{wheat\ sprouts} + DG_{millet\ sprouts})/2 = 89\%$$

Again, it can be concluded that a temperature of 125° F. (52° C.) for eight hours is highly injurious to the sprouting capability of wheat and millet grain whereas a temperature of 104° F. (40° C.) for 8 hours is only slightly injurious to the sprouting capability of those grains.

The below table summarizes the results obtained in determining the DG values of various products:

| Soak Water Temperature | Combined Weight Gain of 1 lb. of Wheat and 1 lb. of Millet as Result of Sprouting | DGave (%) |
|---|---|---|
| 70° F. | 1.774 lbs. | 0 |
| 104° F. | 1.357 lbs. | 22 |
| 125° F. | 0.200 lbs. | 89 |

The above discussions, the definitions of DG and DV, and the above results are the basis of my claim that both the DG and DV values for RUSTIC Sprouted Grain Products are less than 30%.

Example 15

RUSTIC Sprouted Grain Products

As mentioned in Example 1, when it was attempted at step 75 D.(a) to mill the three ounces of honey-sweetened compressed sprout cake set aside at Step 50, lumps of partially ground product stuck to each other and to the sides of the coffee-mill thus preventing a thorough grinding of the product. It was, therefore, decided to prepare a second batch of honey-sweetened compressed sprout cake with a lesser percentage of honey so that a more finely milled product could be obtained and a pH reading obtained which would more fully reflect the presence of the sprouted wheat in the product. Inasmuch as the honey content of the honey-sweetened compressed sprout cake made in Example 1 was 34.3%, it was decided that the batch of this product made in Example 2 should have a honey content of only about 30% and that the product should be drier before it is milled prior to measuring its pH.

1¼ pounds of compressed dried sprouts was dipped a pint at a time into a solution consisting of 6 ounces of neutral pH water and 12 ounces of honey. These honey dipped sprouts weighed 32 ounces. The first equation of Step 45, modified to reflect 1¼ pounds rather than 2½ pounds of compressed dried sprouts being used, becomes:

Honey on Sprouts=(⅔)*(Weight of Sprouts−20)=8 ounces.

The second equation of Step 45 then gives 0.40 ounces for the amount of honey on ¹⁄₂₀th of the product to be set aside at Step 40.

The honey dipped sprouts were spread on a screen in a dehydrator tray, evenly pressed down, and placed in a frost-free refrigerator. After 50 hours of drying, their water activity was 0.65. This tray of honey dipped compressed dried sprouts was then mounted on a dehydrator and dehydrated at 104° F. (40° C.) until its water activity was 0.40. The resulting tray of honey-sweetened compressed sprout cake was then placed in the refrigerator until solid and firm to the touch. At this time (Step 50), the product weighed 26.5 ounces, and 1.33 ounces of this product was set aside for the pH measurement of Step 75.

At Step 75 B.(e), one ounce of compressed dried sprouts was milled and stirred into two ounces of neutral pH water. 0.4 ounces of honey was then added and the mixture was stirred. At Step 75 B.(g), the pH of this mixture was measured and found to be 5.9. Then at Step 75 D.(a), 1.33 ounces of honey-sweetened compressed sprout cake was milled. Due to the lesser concentration of honey in the product, it was possible to mill the product much more finely than in Example 1. The resultant flour was then mixed with 2 ounces of neutral pH water. At Step 75 D.(b), the pH of this mixture was measured and found to be 5.73. After half an hour of stirring, the pH was again measured and found to be 5.9. Apparently it takes a while for the honey in this product to release the sprouted wheat. As can be seen, the pH of the aqueous mixture of honey-sweetened compressed sprout cake (Step 75 D.(b)) is substantially the same as the pH of the aqueous mixture of compressed dried sprouts plus honey (Step 75 B.(g)). Thus, $\delta pH_{Ia}$ for the honey-sweetened sprout cake is 0.0. Therefore, it can now be concluded that no discernible bacterial souring has occurred during the preparation of the products of this invention.

Example 15 (Prophetic Example)

The High Air Velocity Method of Making Sprout Flour Based NP CLASS Crackers

Applicant recently conceived a method for making an agglutinated nonpasteurized sprouted food product from edible plant seeds which should virtually eliminate any souring of the cracker batter while it is drying.

This method comprises the following steps:

1) Sprout the seeds.
2) Dehydrate the sprouts.
3) Mill the dehydrated sprouts to flour.
4) Mix the resultant sprout flour with water thus forming a mixture.
5) Mix, if necessary, a sufficient amount of an agglutinant with the above mixture so that the resultant product will be agglutinated.
6) Into the above mixture, stir pieces of pieces of absorbent vegetal matter selected from the group consisting of dehydrated fruits, dehydrated vegetables, and seeds selected from the group consisting of whole sesame seeds, hulled sesame seeds, whole poppy seeds, hulled sunflower seeds, steel cut hulled oats, and teff seeds, whereby a mixture of milled sprouts, pieces of absorbent vegetal matter, and any added agglutinant is formed.
7) Allow the pieces of absorbent vegetal matter in the mixture to absorb liquid from the mixture.
8) Spread this mixture onto a drying surface.
9) Dehydrate the mixture to a water activity below 60 percent with an air flow with the following characteristics:
   (i) the temperature of the air flow is less than 125° F., so that most of the enzymatic activity of the product is preserved.
   (ii) the relative humidity of the air flow is less than 60 percent.
   (iii) the velocity of the air flow over the surface of the mixture is maintained high enough to dehydrate the product in less than 4 hours, whereby souring of the drying product is virtually eliminated;
   (iv) contains sound waves with the proper amplitude and frequency to so vibrate the surfaces of the drying batter so as to cause them to more quickly relinquish the moisture they contain.

Preferably the drying surface is a double-access drying surface, whereby the lower surface of the drying mixture (which is in contact with the upper surface of the double-access drying surface) and the upper surface of the drying mixture are both exposed to the drying effects of dehydration. Most preferably, the temperature, relative humidity, and velocity of the air flow will be set to such values as are required to dehydrate the drying mixture in the minimum amount of time possible, so as to, if possible, eliminate bacterial souring altogether.

6.0 CONCLUSION, RAMIFICATIONS, AND SCOPE OF INVENTION

6.1 NP CLASS Crackers

Thus the reader will see that NP CLASS Crackers supply a long felt need for snacks and breads which are made from raw germinated seeds, grains, and nuts and yet are tasty and with excellent shelf life. When compared with the best such products currently for sale in this country, it will be seen that these new sprouted food products excel in many categories. Here are some categories for comparison:

(1) Natural Enzyme Activity. The only close competitors are the sprouted sunflower seed products made by the method of the Douglass Patent. None of the other similar products currently found in health food stores have any significant enzyme activity, all of them having been damaged by high temperatures. This is a serious matter; we were meant to be at one with and a part of a natural organic environment. Heat damaged foods are alien to every living creature's diet; studies tend to indicate that our own digestive system does not handle heat damaged foods in the same way as raw foods, and this possibly leads to abnormally high weight gain, and, with the passing of years, various degenerative conditions which are totally foreign to creatures that eat a raw, wholesome, natural diet.

(2) Vitamin E. There is no competition here; although sprouting brings about large increases in Vitamin E, other similar products (with the exception of the sprouted sunflower seed products and some sprouted breakfast cereals) have been frozen which largely destroys Vitamin E.

(3) Other Vitamins. Sprouting brings about such significant increases in most vitamins that similar unsprouted products pale by comparison. Furthermore all other similar products with the exception of the sprouted sunflower seed products have suffered vitamin loss due to excessive heat.

(4) Proteins. The sprouting process dramatically improves the amino acid profile over the unsprouted seeds.

(5) Fiber. NP CLASS Crackers have fiber as nature intended it: undamaged by heat, not separated from the foods nature intended it to be with (unlike the various brans currently available which are in such concentrated form that they occasionally cause more problems than they cure), and coupled with the enzymes which aid in its digestion.

(6) Ease of Storage. Unlike the commercial sprout breads, NP CLASS Crackers need not be frozen, and therefore they should retain most of their vitamin E. In addition NP CLASS Crackers can be kept at room temperature without significant deterioration due having a water activity of less than 0.60.

(7) Taste. Due to stopping bacterial souring at the peak of taste perfection in the two cheesy varieties of NP CLASS Crackers, my invention has a much better taste and far longer shelf life than the traditional homemade Essene sprouted breads. The methods for the two sweet varieties of NP CLASS Crackers limit bacterial souring to a $\delta pH_{LA}$ of 0.1, resulting in a sweet pleasant tasting cracker.

(8) Shelf-Stability. Due to their low water activity, NP CLASS Crackers resist mold, fermentation, and fungal growths, much better than any of their competitors (with the exception of sprouted sunflower seed products).

(9) Health Promoting. By being prepared well below 160° F., the temperature at which proteins are denatured and possibly become carcinogenic, and by containing all the fiber of the original sprouts, NP CLASS Crackers should not be a contributing factor to our country's current cancer epidemic. (As reported in Science Digest of May 1979, Drs. Chiu-Nan Lai, Betty J. Dabney and Charles R. Shaw of the University of Texas (Houston) suggested that some sprouts may have distinct cancer-preventive properties. When they applied extracts of wheat sprouts to certain known chemical mutagens, the activity of the chemicals diminished radically, by 99% in some instances. Mung bean and lentil sprouts performed similarly, while extracts of carrots and parsley did not do very well).

(10) Economical Production. Due to the greater amount of batter which can be placed on each dehydrator tray, fewer trays and screens are required to process a given amount of batter. Further due to using minimal water in the cracker batter and spreading the batter on double access drying surfaces rather than upon solid drying surfaces, dehydration is greatly accelerated with attendant energy savings. The resultant NP CLASS Crackers can be made over four times thicker (over an inch thick without mold or fungal growths) than comparable dehydrated background art products and with a comparable or lower $\delta pH_{LA}$.

6.2 RUSTIC Sprouted Seed Products

Thus the reader will see that the sprouted food products of my invention supply a long felt need for snacks and breakfast cereals which are made without either cooking or preservatives from raw germinated grains, and yet are tasty and have excellent shelf life. When compared with the best of such products currently for sale in this country, it will be seen that these new sprouted food products excel in many categories. My new food products excel in the following categories:

(a) Neither preservatives nor nutrient-damaging heat is required to make these products. They are truly raw and additive free.

(b) Due to the low temperature water activity reduction methods used to produce these products, bacterial souring and fungal growth is inhibited without resorting to either preservatives or nutrient damaging heat. Further, due to their low water activity, RUSTIC Sprouted Seed Products are shelf-stable.

(c) By subjecting the compressed sprouts to be used in making either flavored compressed sprouts or compressed sprout cakes to reduced temperature and humidity after treating them with flavoring or agglutinant respectively, bacterial souring and fungal growth is inhibited while the water activity of the compressed sprouts is being reduced below the lowest water activity at which such microbial growth could still occur. Thus the methods taught in this specification solve a problem previously thought unsolvable: How to prepare raw sprouted food products without cooking or preservatives yet with excellent taste and shelf-life. Dr. Edward Howell sought for years to develop such products yet failed.

(d) Due to exposing only a small portion of the interior of the seed to the air, the nutrients of the compressed sprouted seed are afforded far more protection than is the case with any products of the background art.

(e) The compressed sprouted seeds of the sprouted seed products described herein are not only of substantially uniform thickness and consistency throughout but also have and MD of less than 1. (The compressed sprouts of Example 1 had an MD of (2 lbs. 12.9 oz.)/(3 lbs. 8.2 oz.)=0.8.) Consequently, these products are very easily chewed. One need not be concerned about chipping a tooth while eating these products.

(f) The compressed sprouted seed cakes of this patent application are simple to prepare. Since the discrete seeds of the compressed sprouted seed cakes are larger than the openings of the screen material used in the dehydrator trays, screens can be used instead of solid roll-up sheets. This facilitates drying of the product, as air can pass through the holes of the screens thus allowing both sides of the product to dry simultaneously. Further it is much easier to peel a dehydrator screen from the final product than it is to peel a solid roll-up sheet. This being the case, an oil is not required to prevent sticking, thus eliminating the only possible source of rancidity from my methods and greatly facilitating cleanup.

(g) Natural enzyme activity. The only close competitors are the sprouted sunflower seed products made by the method of the Douglass Patent. None of the other similar products currently found in health food stores have any significant enzyme activity, all of-them having been damaged by high temperatures.

(h) The ultrathin sprouted seed products produced via the long soak method followed by compression with the RUSTIC Press are very thin and thus rival anything found in the super market for consistency and mouth feel.

(i) Sprouted Wheat, "puffed wheat" style, the result of soaking wheat for several days with periodic rinsings every 12 hours, followed by freezing results in a somewhat fragile structure, no doubt due a bursting of cell walls. As a result, when this soaked wheat is subsequently dehydrated, the result is a very tender and easily masticated product, closely resembling puffed wheat in consistency and crunchiness. So tender is the resultant product, that it hardly even needs to be compressed.

The use of the RUSTIC Press to compress seeds which have been soaked for several days has several important advantages over the use of a roller mill:

(a) The RUSTIC Press is much easier to use in continuous operation, for it does not clog up with crushed sprouts as a roller mill does.

(b) It is more easily cleaned at the end of the compressing operation.

(c) It can be used to exert a pressure for a given period of time.

(d) It is much cheaper to manufacture and service.

(e) With the RUSTIC Press, it is much easier to vary the amount by which sprouts are compressed.

Applicant wishes to close this description by pointing out a fact which the reader may not have fully appreciated. The definition of pH given by "Webster's Third New International Dictionary of the English Language Unabridged" (G&C Merriam Co, Springfield, Mass, 1961) is: "the negative logarithm of the effective hydrogen-ion concentration or hydrogen-ion activity in gram equivalents per liter . . . and used for convenience in expressing both acidity and alkalinity usually on a scale of 0 to 14 on which 7 represents the value for pure water at 25° C. or neutrality . . . " Gram equivalent is defined as "the quantity of a chemical element . . . which has a weight in grams equal to the equivalent." A gram equivalent of hydrogen weighs 1 gram. Therefore, let:

$\alpha_H$=effective hydrogen-ion concentration in grams per liter.

Then pH=$-\log_{10}\alpha_H$. Therefore $\alpha_H=10^{-pH}$ grams/liter=$10^{6-pH}$ mg/kiloliter From the above considerations, the first two columns of the following table can be constructed:

| pH | $\alpha_H$ Expressed in Units of Mg of H$^+$per Kiloliter | Mg of H$^+$per Kiloliter Above that of an Unsoured Product |
|---|---|---|
| 6.0 | 1.0000 (The amount of Mg/Kl of H$^+$ in unsoured sprouted wheat) | 0.0000 (The Amount of Mg/Kl of H$^+$due to lactic acid souring in unsoured sprouted wheat, i.e., none) |
| 5.9 | 1.2589 | 0.2589 |
| 5.8 | 1.5849 | 0.5849 |
| 5.79 | 1.6218 | 0.6218 |
| 5.7 | 1.9952 | 0.9952 |
| 5.69 | 2.0417 | 1.0417 |
| 5.6 | 2.5119 | 1.5119 |
| 5.5 | 3.1623 | 2.1623 |
| 5.4 | 3.9810 | 2.9810 |
| 5.36 | 4.3652 | 3.3652 |
| 5.3 | 5.0119 | 4.0119 |
| 5.2 | 6.3096 | 5.3096 |
| 5.1 | 7.9433 | 6.9433 |
| 5.0 | 10.0000 | 9.0000 |
| 4.99 | 10.2329 | 9.2329 |
| 4.91 | 12.3027 | 11.3027 |
| 4.9 | 12.5893 | 11.5893 |
| 4.6 | 25.1189 | 24.1189 |
| 4.5 | 31.6228 | 30.6228 |

NOTE: gms/liter = 10 mg/kiloliter

The pH of a 2:1 slurry prepared from sprouted wheat grain is about 6.0 which represents 1 Mg of H$^+$ per kiloliter. Sprouted grain does not contain lactic acid. Therefore this value of 1 Mg of H$^+$ per kiloliter is due solely to the other components of the sprouted wheat. It can therefore be said that 1 Mg of H$^+$ per kiloliter is the value expected for a 2:1 slurry of unsoured sprouted wheat. It is therefore the value expected for a 2:1 slurry prepared from a sprouted wheat product which contains 0 Mg of lactic acid. So we will call this value of 1 Mg of H$^+$ per kiloliter the value which would be obtained if a completely unsoured sprouted wheat product were made. Then any difference between this value and the value obtained for a soured product would be due to the lactic acid content of the soured product.

Raw sprouted grain products prepared without special methods to limit bacterial souring exhibit a pH of about 4.6 when prepared as a 2:1 slurry. As can be seen from the above table, this pH of 4.6 represents 25.1189 Mg of H+per kiloliter, of which 24.1189 Mg of H$^+$ per kiloliter is due solely to lactic acid in the product. Applicant's Cheesy Variety of NP CLASS Crackers exhibits a pH of 4.91 (pH meter reading accuracy) which represents no more than 12.3027 Mg of H+per kiloliter. Of that 12.3027 Mg of H$^+$ per kiloliter, 11.3027 Mg of H$^+$ per kiloliter is due to lactic acid in the product. From 24.1189 Mg of H+per kiloliter (due to lactic acid in a soured product) to 11.3027 Mg per kiloliter (due to lactic acid in the Cheesy Variety of NP CLASS Crackers) is a decrease in acidity due to lactic acid formation of over 53 percent. Applicant's Sweet Variety of NP CLASS Crackers exhibits a pH of 5.69 (pH meter reading accuracy) which represents 2.0417 Mg of H+per kiloliter. The batter from which this variety is made exhibits a pH of 5.79 which represents 1.6218 Mg of H+per kiloliter. Thus of the 2.0417 Mg of H+ per kiloliter in the final product, less than 2.0417−1.6218=0.4199 Mg of H+ per kiloliter is due to lactic acid in the product. From 30.6228 Mg of H+ per kiloliter (due to lactic acid in a soured product) to 0.4199 Mg per kiloliter (due to lactic acid formation in the Sweet Variety of NP CLASS Crackers) is a decrease in acidity due to lactic acid formation of more than 98 percent. And that is why NP CLASS Crackers taste so good, and products prepared without special souring limitation methods taste so sour and bitter.

Applicant's Compressed Sprouted Grain Breakfast Cereal exhibits a pH of at least 5.9 (pH meter reading accuracy) which represents no more than 1.2589 Mg of H+ per kiloliter. Of that 1.2589 Mg of H+per kiloliter, less than 0.2589 Mg of H+per kiloliter is due to lactic acid in the product. From 24.1189 Mg of H+per kiloliter (due to lactic acid in a soured product) to 0.2589 Mg per kiloliter (due to possible lactic acid in RUSTIC Sprouted Grain Products) is a decrease in acidity due to lactic acid formation of more than 98 percent. And that is why RUSTIC Sprouted Grain Products taste so good, and products prepared without special anti-souring methods taste so sour and bitter.

Raw sprouted grain products prepared without souring limitation methods are almost universally disliked because of their sour bitter taste. The few who make these sour-tasting products for health reasons, drench them with honey and other sweeteners in a futile attempt to mask their sour taste. But even with sweeteners, they still taste sour and bitter. If one should aver that methods of making raw sprouted grain products with limited souring are obvious to those skilled in the art, then one is hard put to explain why such skilled artisans continue to endure the bitter taste of these products, when methods of making good-tasting unsoured raw sprouted grain products are obvious. Such methods are not found in the background art.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

While the present invention has been described in terms of preferred embodiments and generally associated methods, the inventor contemplates that alterations and permutations of the preferred embodiments and method will become apparent to those skilled in the art upon a reading of the specification and a study of the drawings. For example, my invention can also be used to make pretzels and biscuits. And the seeds sprouted for later processing could include nuts, fruit pits, and such vegetable seeds as alfalfa and clover (as long as the agglutinated products were made with sufficient agglutinants to hold the products together). In addition, although my preferred methods for making the various embodiments of the instant invention utilize a dehydrator and a frost-free refrigerator to reduce water activity, other equipment and methods could also be used alone or in combination with one another, such as spray drying, utilization of reverse osmosis, vacuum chamber drying, dehumidification equipment, ultrafiltration equipment, foam-mat drying, tower drying at low temperatures in dehumidified air, and pressure-gun puffing of the partially dried product. In addition, although my preferred methods for making unflavored compressed sprout cakes use honey and sprouted wheat flour as agglutinants many other agglutinants could be used such as any sprouted or unsprouted gluten-containing grain and various kinds of fruit, vegetable, and grain and tree syrups.

Accordingly, the above description of preferred exemplary embodiments does not define or constrain the present invention. Rather, the issued claims variously define the present invention. Each variation of the present invention is limited only by the recited limitations of its respective claim, and equivalents thereof, without limitation by other terms not present in the claim. Further, aspects of the present invention are particularly pointed out below using terminology that the inventor regards as having its broadest reasonable interpretation; the more specific interpretations of 35 U.S.C. .sctn. 112(6) are only intended in those instances where the term "means" is actually recited.

I claim:

1. An agglutinated sprouted food product prepared from sprouts and pieces of dehydrated vegetables or dehydrated fruit, wherein:
   (a) the sprouts are nonpasteurized;
   (b) the DG and DV values for the sprouts are both less than 50%;
   (c) the dried sprouts of the product retain at least 50 percent of diastase activity after drying;
   (d) the water activity of said sprouted food product is less than 0.80;
   (e) said sprouts have broken seed coats whereby mastication and digestion of the product are facilitated;
   (f) the $\delta pH_{LA}$ for the product is less than 1.25; and
   (g) the pieces of dehydrated vegetables or dehydrated fruit are substantially evenly dispersed throughout the food product.

2. The sprouted food product of claim 1, wherein the dehydrated vegetables are dehydrated raw carrots.

3. The sprouted food product of claim 1, wherein the dehydrated vegetables are selected from the group consisting of dehydrated cured olives and dehydrated cured raw olives.

4. The sprouted food product of claim 1, wherein the sprouts are milled dried sprouts.

5. The sprouted food product of claim 1, further comprising a water activity depressant in an amount sufficient to limit the $\delta pH_{LA}$ for the product to a value less than 0.6.

6. The sprouted food product of claim 1, wherein:
   (a) the DG and DV values for the sprouts in the product are both less than 30%;
   (b) the dried sprouts of the product retain at least 75 percent of diastase activity after drying;
   (c) the final form of the sprouted food product is crackers, and the area of the largest side of a cracker is less than 2 square inches; and
   (d) the water activity of the sprouted food product is less than 0.60.

7. The sprouted food product of claim 6, further comprising a water activity depressant in an amount sufficient to limit the $\delta pH_{LA}$ for the product to a value less than 0.6.

8. The sprouted food product of claim 6, wherein the sprouts are milled dried sprouts.

9. The sprouted food product of claim 8, further comprising a water activity depressant in an amount sufficient to limit the $\delta pH_{LA}$ for the product to a value less than 0.6.

10. An agglutinated sprouted food product comprising milled dried edible sprouts, wherein:
    (a) the sprouts are nonpasteurized;
    (b) the dried sprouts of the product retain at least 50 percent of diastase activity after drying; and
    (c) the water activity of said sprouted food product is less than 0.80.

11. A method for making an agglutinated nonpasteurized sprouted food product with a $\delta pH_{LA}$ of less than 1.25 from edible plant seeds, the method comprising the steps of
  (a) sprouting the seeds;
  (b) liquefying the sprouts;
  (c) adding, if necessary, a sufficient amount of agglutinant to agglutinate the product;
  (d) adding pieces of pieces of absorbent vegetal matter selected from the group consisting of dehydrated fruits, dehydrated vegetables, and seeds selected from the group consisting of whole sesame seeds, hulled sesame seeds, whole poppy seeds, hulled sunflower seeds, steel cut hulled oats, and teff seeds, whereby a mixture of ground sprouts, pieces of absorbent vegetal matter, and any added agglutinant is formed;
  (e) spreading the mixture on a drying surface; and
  (f) reducing the water activity of the mixture.

12. The method of claim 11, further comprising the step of reducing the relative humidity of the atmosphere about the mixture to less than 60 percent prior to reducing the water activity of the mixture.

13. The method of claim 11, further comprising the step of adding a water activity depressant in an amount sufficient to limit the $\delta pH_{LA}$ for the product to a value less than 0.6.

14. The method of claim 11, further comprising the step of allowing the pieces of absorbent vegetal matter in the mixture to absorb liquid from the mixture before spreading the mixture on a drying surface.

15. The method of claim 11, wherein the drying surface is a double-access drying surface, and the water activity of the mixture is reduced by dehydration, whereby the lower surface of the mixture which is in contact with the upper surface of the double-access drying surface is exposed to the drying effects of dehydration.

16. A method for making an agglutinated nonpasteurized sprouted food product from edible plant seeds, the method comprising the steps of:
  (a) sprouting the seeds;
  (b) reducing the water activity of the sprouts;
  (c) milling the water activity reduced sprouts;
  (d) rehydrating the milled sprouts;
  (e) adding, if necessary, a sufficient amount of agglutinant to agglutinate the product;
  (f) spreading the mixture on a drying surface; and
  (g) reducing the water activity of the mixture.

17. The method of claim 16, wherein the step of reducing the water activity of the mixture comprises dehydrating the mixture to a water activity below 60 percent with an air flow with the following characteristics:
  (i) the temperature of the air flow is less than 125° F., whereby the majority of the enzyme activity of the product is preserved;
  (ii) the relative humidity of the air flow is less than 60 percent; and
  (iii) the velocity of the air flow is maintained high enough to dehydrate the mixture in less than 4 hours, whereby souring of the drying mixture is virtually eliminated.

18. The method of claim 16 further comprising the steps of:
  (a) adding pieces of pieces of absorbent vegetal matter selected from the group consisting of dehydrated fruits, dehydrated vegetables, and seeds selected from the group consisting of whole sesame seeds, hulled sesame seeds, whole poppy seeds, hulled sunflower seeds, steel cut hulled oats, and teff seeds, whereby a mixture of ground sprouts, pieces of absorbent vegetal matter, and any added agglutinant is formed; and
  (b) allowing the pieces of absorbent vegetal matter in the mixture to absorb liquid from the mixture,
both of said steps being performed before spreading the mixture on a drying surface.

19. The method of claim 18, wherein the weight of the pieces of absorbent vegetal matter added is more than $P_{avm}$ percent by weight of the food product.

20. The method of claim 16, wherein the drying surface is a double-access drying surface, and the water activity of the mixture is reduced by dehydration whereby the lower surface of the mixture which is in contact with the upper surface of the double-access drying surface is exposed to the drying effects of dehydration.

21. The method of claim 16, further comprising the step of reducing the relative humidity of the atmosphere about the mixture to less than 60 percent prior to reducing the water activity of the mixture.

22. The method of claim 16, further comprising the step of adding a water activity depressant in an amount sufficient to limit the $\delta pH_{LA}$ for the product to a value less than 0.6.

23. A sprouted food product comprising edible compressed hydrated seeds with seed coats, wherein:
  (a) the compressed hydrated seeds are nonpasteurized;
  (b) the water activity of said sprouted food product is less than 0.80;
  (c) The $\delta pH_{LA}$ of said sprouted food product is less than 0.3;
  (d) the compressed hydrated seeds are discrete; and
  (e) the seed coats of the compressed hydrated seeds are broken.

24. The sprouted food product of claim 23, wherein:
  (a) both the DV and DG values for the compressed hydrated seeds are less than 50%, whereby this product retains most of its vital nutrients;
  (b) the compressed hydrated seeds of the product retain at least 50 percent of diastase activity after drying; and
  (c) the water activity of said sprouted food product is less than 0.60, whereby any spoilage by microorganisms is made impossible.

25. The sprouted food product of claim 23, wherein:
  (a) both the DV and DG values for the compressed hydrated seeds in the product are less than 20%, whereby this product retains most of its vital nutrients;
  (b) the compressed hydrated seeds of the product retain at least 80 percent of diastase activity after drying;
  (c) the water activity of said sprouted food product is less than 0.60, whereby any spoilage by microorganisms is made impossible, and
  (d) The $\delta pH_{LA}$ for this sprouted food product is less than 0.1.

26. The sprouted food product of claim 24, wherein
  (a) the compressed hydrated seeds are selected from the group consisting of compressed hydrated millet, compressed hydrated hulled grain, compressed hydrated hulled buckwheat, and hybrids thereof; and
  (b) the MD of the compressed hydrated seeds is less than 1.

27. A method for making a nonpasteurized food product with a $\delta pH_{LA}$ of less than 0.1 from edible compressed hydrated seeds with an MD of less than 1, the method comprising the steps of:
  (a) selecting seeds from the group consisting of grain, buckwheat, and hybrids thereof;
  (b) soaking the selected seeds in a liquid comprising water, yielding hydrated seeds;

(c) compressing the hydrated seeds until their seed coats are broken and their MD is less than 1; and (d) reducing the water activity of the compressed hydrated seeds to below 0.60, whereby spoilage by microorganisms is prevented.

28. The method of claim 27 wherein the selected seeds are soaked in a liquid comprising water for a length of time in excess of 2 days.

29. The method of claim 27 further comprising the step of rinsing and airing the hydrated seeds to maturity.

30. The method of claim 27 further comprising the step of reducing the water activity of the hydrated seeds to below 0.91 before compressing them at step (c), whereby fracturing of the hydrated seeds is minimized, and bacterial souring is inhibited.

31. The method of claim 27 further comprising the step of refrigerating the hydrated seeds after compressing them, until their water activity is reduced to below 0.91.

* * * * *